(12) United States Patent
Park et al.

(10) Patent No.: US 8,345,755 B2
(45) Date of Patent: Jan. 1, 2013

(54) INTER-LAYER PREDICTION METHOD FOR VIDEO SIGNAL

(75) Inventors: Seung Wook Park, Seoul (KR); Byeong Moon Jeon, Seoul (KR); Ji Ho Park, Seoul (KR)

(73) Assignee: LG Electronics, Inc., Seoul (KR)

( * ) Notice: Subject to any disclaimer, the term of this patent is extended or adjusted under 35 U.S.C. 154(b) by 874 days.

(21) Appl. No.: 12/087,515

(22) PCT Filed: Jan. 9, 2007

(86) PCT No.: PCT/KR2007/000142
§ 371 (c)(1),
(2), (4) Date: Nov. 19, 2008

(87) PCT Pub. No.: WO2007/100187
PCT Pub. Date: Sep. 7, 2007

(65) Prior Publication Data
US 2009/0168875 A1    Jul. 2, 2009

Related U.S. Application Data

(60) Provisional application No. 60/757,009, filed on Jan. 9, 2006, provisional application No. 60/758,235, filed on Jan. 12, 2006, provisional application No. 60/776,935, filed on Feb. 28, 2006, provisional application No. 60/783,395, filed on Mar. 20, 2006, provisional application No. 60/786,741, filed on Mar. 29, 2006, provisional application No. 60/787,496, filed on Mar. 31, 2006, provisional application No. 60/816,340, filed on Jun. 26, 2006, provisional application No. 60/830,600, filed on Jul. 14, 2006.

(30) Foreign Application Priority Data

| Nov. 13, 2006 | (KR) | 10-2006-0111893 |
| Nov. 13, 2006 | (KR) | 10-2006-0111894 |
| Nov. 13, 2006 | (KR) | 10-2006-0111895 |
| Nov. 13, 2006 | (KR) | 10-2006-0111897 |
| Jan. 5, 2007 | (KR) | 10-2007-0001582 |
| Jan. 5, 2007 | (KR) | 10-2007-0001587 |

(51) Int. Cl.
*H04N 7/12* (2006.01)

(52) U.S. Cl. .................................................. 375/240.12

(58) Field of Classification Search ............. 375/240.12, 375/240.13, 240.14, 240.15, 240.16, 240.17
See application file for complete search history.

(56) References Cited

U.S. PATENT DOCUMENTS
5,349,383 A    9/1994    Parke et al.
(Continued)

FOREIGN PATENT DOCUMENTS
CN    1455600    11/2003
(Continued)

OTHER PUBLICATIONS

Chinese Patent Gazette dated Dec. 8, 2010 issued in corresponding Chinese Publication No. CN101385354.

(Continued)

*Primary Examiner* — Eleni Shiferaw
*Assistant Examiner* — Hilary Branske
(74) *Attorney, Agent, or Firm* — Harness, Dickey & Pierce, P.L.

(57) ABSTRACT

The present invention relates to a method for using interlaced video signal of a base layer in interlayer texture prediction. The present method constructs a pair of frame macro blocks from vertically-adjacent two field macro blocks pertaining to interlaced video signal of a base layer, separates video signal containing the pair of frame macro blocks into even-field and odd-field components, interpolates the even-field and the odd-field components respectively in vertical and/or horizontal direction, and constructs a combined video data by interleaving the interpolated even-field and odd-field components.

6 Claims, 41 Drawing Sheets

U.S. PATENT DOCUMENTS

| | | |
|---|---|---|
| 5,557,332 A | 9/1996 | Koyanagi et al. |
| 5,731,840 A | 3/1998 | Kikuchi et al. |
| 5,821,986 A | 10/1998 | Yuan et al. |
| 5,912,706 A | 6/1999 | Kikuchi et al. |
| 5,991,447 A | 11/1999 | Eifrig et al. |
| 6,041,361 A | 3/2000 | Wilson et al. |
| 6,084,914 A | 7/2000 | Katata et al. |
| 6,097,756 A | 8/2000 | Han |
| 6,148,027 A | 11/2000 | Song et al. |
| 6,151,413 A * | 11/2000 | Jang ............................ 382/243 |
| 6,173,013 B1 | 1/2001 | Suzuki et al. |
| 6,295,089 B1 * | 9/2001 | Hoang ........................ 348/390.1 |
| 6,330,280 B1 | 12/2001 | Suzuki et al. |
| 6,332,002 B1 | 12/2001 | Lim et al. |
| 6,400,768 B1 | 6/2002 | Nagumo et al. |
| 6,445,828 B1 * | 9/2002 | Yim ............................. 382/250 |
| 6,639,943 B1 | 10/2003 | Radha et al. |
| 6,647,061 B1 | 11/2003 | Panusopone et al. |
| 6,829,299 B1 | 12/2004 | Chujoh et al. |
| 6,961,383 B1 | 11/2005 | Reibman et al. |
| 6,975,680 B2 | 12/2005 | Demos |
| 6,980,667 B2 | 12/2005 | Hamanaka |
| 7,092,442 B2 | 8/2006 | Zhang et al. |
| 7,206,345 B2 | 4/2007 | Barrau et al. |
| 7,317,759 B1 | 1/2008 | Turaga et al. |
| 7,320,804 B2 | 1/2008 | Hong et al. |
| 7,379,608 B2 | 5/2008 | Marpe et al. |
| 7,447,264 B2 | 11/2008 | Sugiyama |
| 7,583,730 B2 | 9/2009 | Wu et al. |
| 7,617,436 B2 | 11/2009 | Wenger et al. |
| 7,738,554 B2 | 6/2010 | Lin et al. |
| 7,817,866 B2 | 10/2010 | Yang |
| 7,876,830 B2 | 1/2011 | Katayama et al. |
| 7,876,833 B2 | 1/2011 | Segall et al. |
| 7,881,387 B2 | 2/2011 | Han et al. |
| 8,045,618 B2 | 10/2011 | Cote et al. |
| 8,046,039 B2 | 10/2011 | Lee et al. |
| 8,081,680 B2 | 12/2011 | Xu et al. |
| 8,094,720 B2 | 1/2012 | Lim et al. |
| 8,155,194 B2 | 4/2012 | Winger et al. |
| 8,175,157 B2 | 5/2012 | Lee et al. |
| 8,208,540 B2 | 6/2012 | Cote |
| 2002/0118742 A1 | 8/2002 | Puri et al. |
| 2003/0185456 A1 * | 10/2003 | Sato et al. .................... 382/250 |
| 2003/0231711 A1 * | 12/2003 | Zhang et al. ............. 375/240.16 |
| 2004/0005095 A1 | 1/2004 | Wu et al. |
| 2004/0076237 A1 | 4/2004 | Kadono et al. |
| 2004/0101049 A1 * | 5/2004 | Sugiyama ................ 375/240.12 |
| 2004/0114688 A1 | 6/2004 | Kang |
| 2004/0207754 A1 | 10/2004 | Choi et al. |
| 2005/0013376 A1 * | 1/2005 | Dattani et al. ........... 375/240.24 |
| 2005/0041742 A1 * | 2/2005 | Abe et al. ................. 375/240.24 |
| 2005/0053293 A1 * | 3/2005 | Lin et al. ........................ 382/236 |
| 2005/0074176 A1 | 4/2005 | Marpe et al. |
| 2005/0084006 A1 * | 4/2005 | Lei et al. .................... 375/240.1 |
| 2005/0094725 A1 | 5/2005 | Hui |
| 2005/0169374 A1 | 8/2005 | Marpe et al. |
| 2005/0220190 A1 | 10/2005 | Ha et al. |
| 2005/0254649 A1 | 11/2005 | Demos |
| 2005/0259744 A1 | 11/2005 | Hellman |
| 2005/0259887 A1 | 11/2005 | Hellman |
| 2006/0002476 A1 | 1/2006 | Park et al. |
| 2006/0073215 A1 | 4/2006 | Hong et al. |
| 2006/0088102 A1 | 4/2006 | Lee et al. |
| 2006/0098734 A1 | 5/2006 | Cho et al. |
| 2006/0110065 A1 | 5/2006 | Huang et al. |
| 2006/0126962 A1 | 6/2006 | Sun |
| 2006/0133503 A1 | 6/2006 | Park et al. |
| 2006/0133504 A1 | 6/2006 | Jung et al. |
| 2006/0146941 A1 | 7/2006 | Cha et al. |
| 2006/0182181 A1 | 8/2006 | Lee et al. |
| 2006/0198439 A1 * | 9/2006 | Zhu ......................... 375/240.03 |
| 2006/0222251 A1 | 10/2006 | Zhang |
| 2006/0291743 A1 | 12/2006 | Partiwala et al. |
| 2007/0025448 A1 * | 2/2007 | Cha et al. ................. 375/240.24 |
| 2007/0171969 A1 | 7/2007 | Han et al. |
| 2007/0286283 A1 | 12/2007 | Yin et al. |
| 2007/0297511 A1 | 12/2007 | Chiu et al. |
| 2008/0063075 A1 | 3/2008 | Kondo et al. |
| 2008/0089597 A1 | 4/2008 | Guo et al. |
| 2008/0096620 A1 | 4/2008 | Lee et al. |
| 2008/0159407 A1 | 7/2008 | Yang et al. |
| 2008/0267291 A1 | 10/2008 | Vieron et al. |
| 2009/0016439 A1 | 1/2009 | Thoreau et al. |
| 2009/0028245 A1 | 1/2009 | Vieron et al. |
| 2009/0147848 A1 | 6/2009 | Park et al. |
| 2009/0168875 A1 | 7/2009 | Park et al. |
| 2009/0175359 A1 | 7/2009 | Jeon et al. |
| 2009/0220000 A1 | 9/2009 | Park et al. |
| 2009/0323811 A1 | 12/2009 | Francois et al. |
| 2010/0195714 A1 | 8/2010 | Park et al. |
| 2010/0316124 A1 | 12/2010 | Park et al. |
| 2010/0316139 A1 | 12/2010 | Le Leannec et al. |
| 2011/0013696 A1 | 1/2011 | Hiramatsu et al. |
| 2012/0039387 A1 | 2/2012 | Ha et al. |

FOREIGN PATENT DOCUMENTS

| | | |
|---|---|---|
| CN | 1518834 | 8/2004 |
| CN | 1520179 | 8/2004 |
| CN | 1595990 | 3/2005 |
| CN | 1607836 | 4/2005 |
| CN | 101385354 | 12/2010 |
| EP | 1 075 765 | 4/2006 |
| JP | 06-153183 | 5/1994 |
| JP | 7-162870 | 6/1995 |
| JP | 10-084548 A | 3/1998 |
| JP | 10-271509 | 10/1998 |
| JP | 10-271512 | 10/1998 |
| JP | 2000-036963 | 2/2000 |
| JP | 2001-008214 | 1/2001 |
| JP | 2001-160971 | 6/2001 |
| JP | 2001-198740 | 7/2001 |
| JP | 2001-298740 A | 10/2001 |
| JP | 2004-215229 | 7/2004 |
| JP | 2006-191576 | 7/2006 |
| JP | 2009-522890 | 6/2009 |
| KR | 10-1999-0024963 | 4/1999 |
| RU | 2 201 654 | 3/2003 |
| WO | WO 98/43435 | 10/1998 |
| WO | WO 02/43394 | 5/2002 |
| WO | WO 2005/098755 | 10/2005 |

OTHER PUBLICATIONS

Chinese Patent Gazette for Chinese patent application No. 200780005323.8 dated Jan. 12, 2011.

Chinese Patent Gazette for Chinese patent application No. 200780005754.4 dated Dec. 22, 2010.

Notice of Allowance for corresponding Australian Application No. 2007205337 dated Apr. 7, 2010.

T. Kimoto et al., "Unrestricted Temporal decomposition in SVC," Joint Video Team (JVT) of ISo/IEC MPEG & ITU-T VCEG (ISO/IEC JTC1/SC29/WG11 and ITU-T SG 16 Q.6), JVT-Q048, 14-21, Oct. 2005.

S.W. Park et al., "Inter layer motion prediction for SVC interlaced coding," Joint Video Team (JVT) of ISO/IEC MPEG & ITU-T VCEG (ISO/IEC JTC1/SC29/WG11 and ITU-T SG16 Q.6), JVT-R030, Jan. 11-20, 2006.

"Extended Spatial Scalability with Picture-Level Adaptation," Joint Video Team (JVT) of ISO/IEC MPEG & ITU-T VCEG (ISO/IEC JTC1/SC29/WG11 and ITU-T SG16 Q.6), 15th Meeting: Busan, KR, Apr. 16-22, 2005.

Office Action for Russian Application No. 2008132819/09(041183) dated Apr. 28, 2009 and English translation thereof.

Notice of Allowance for Korean Application No. 2008-7017204 dated Jun. 29, 2009.

International Search Report corresponding to Korean Application No. PCT/KR2007/000141 dated Apr. 13, 2007.

International Search Report corresponding to Korean Application No. PCT/KR2007/000143 dated Apr. 13, 2007.

International Search Report corresponding to Korean Application No. PCT/KR2007/000144 dated Apr. 13, 2007.

International Search Report corresponding to Korean Application No. PCT/KR2007/000147 dated Apr. 16, 2007.

International Search Report corresponding to Korean Application No. PCT/KR2007/000146 dated Apr. 20, 2007.

Iain Richardson, "H.264 and MPEG-4 Video Compression: Video Coding for Next-generation Multimedia," Oct. 2003, pp. 1-306. (English Translation of Video Coding H.264 and MPEG-4 new generation standards).

Iain Richardson, "Video Coding H.264 and MPEG-4 new generation standards," Moscow, Tekhnosfera, 2005, official issue translation 2003, pp. 186-205.

Notice of Allowance for corresponding Russian Application No. 2008132819 dated Oct. 13, 2009 and English translation thereof.

Office Action for corresponding U.S. Appl. No. 12/087,526 dated Mar. 21, 2012.

Office Action for corresponding U.S. Appl. No. 12/087,518 dated Mar. 27, 2012.

Patent Gazette for corresponding Chinese Application No. 200780005782.6 dated Aug. 31, 2011.

Patent Gazette for corresponding Chinese Application No. 200780005646.7 dated Oct. 5, 2011.

Office Action for corresponding U.S. Appl. No. 12/087,523 dated Feb. 15, 2012.

Office Action for corresponding U.S. Appl. No. 12/087,471 dated Jan. 18, 2012.

Office Action for corresponding U.S. Appl. No. 12/087,464 dated Sep. 14, 2011.

Office Action for corresponding U.S. Appl. No. 12/087,466 dated Sep. 14, 2011.

Office Action for corresponding U.S. Appl. No. 12/087,488 dated Oct. 6, 2011.

Office Action for corresponding U.S. Appl. No. 12/087,464 dated Apr. 3, 2012.

Qu et al., A Fast MBAFF Mode Prediction Strategy for H.264/AVC, 7th International Conference on Signal Processing, Jun. 2005, pp. 1195-1198, http://ieeexplore.ieee.org/stamp/stamp.jsp?tp=arnumber=1441538.

Notice of Allowance for corresponding U.S. Appl. No. 12/087,466 dated Apr. 17, 2012.

U.S. Office Action dated Jul. 3, 2012 for related U.S. Appl. No. 12/087,471.

International Search Report PCT/ISA/210 and PCT/ISA/220.

Written Opinion PCT/ISA/237 and a PCT/IB/304.

U.S. Office Action dated Sep. 11, 2012 for related U.S. Appl. No. 12/087,523.

U.S. Office Action dated Sep. 28, 2012 for related U.S. Appl. No. 12/087,488.

U.S. Office Action dated Nov. 1, 2012 for related U.S. Appl. No. 12/659,389.

Office Action dated Oct. 5, 2012 for related U.S. Appl. No. 12/087,525.

* cited by examiner

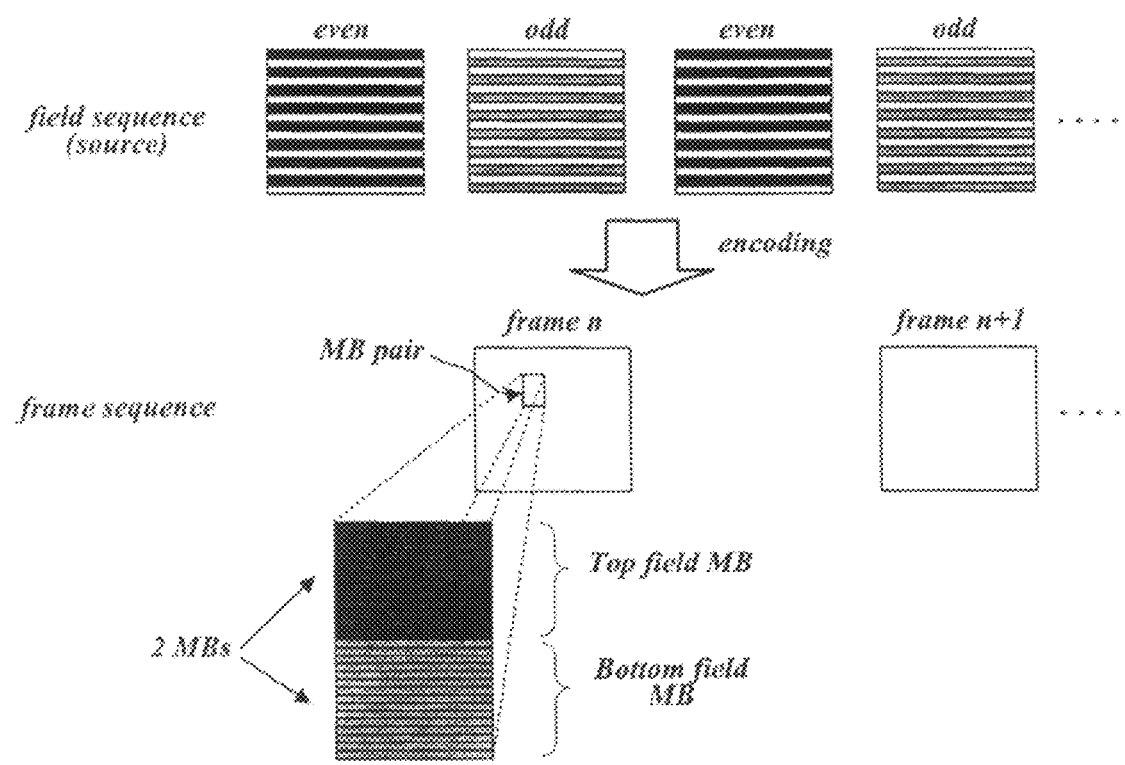

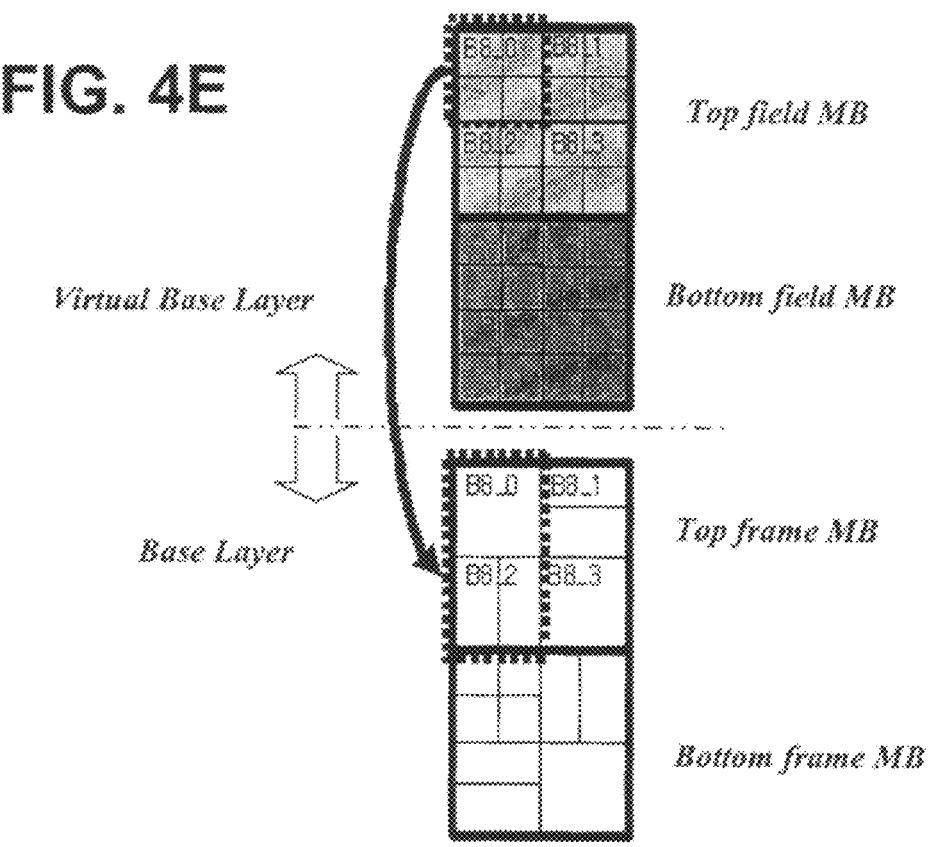
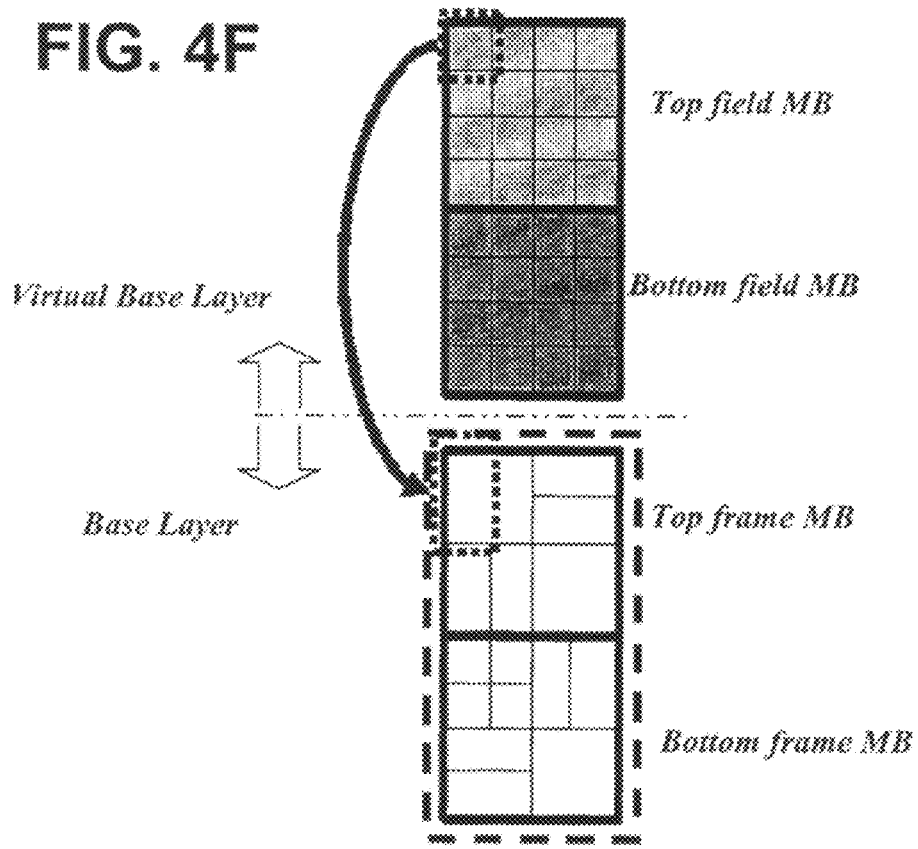

In case of ref_idx(1st (or 3rd) 8x8 blk) = ref_idx(2nd (or 4th) 8x8 blk)

In case of ref_idx(1st (or 3rd) 8x8 blk) not equal to ref_idx(2nd (or 4th) 8x8 blk)

In case of ref_idx(1st (or 3rd) 8x8 blk) not equal to ref_idx(2nd (or 4th) 8x8 blk)

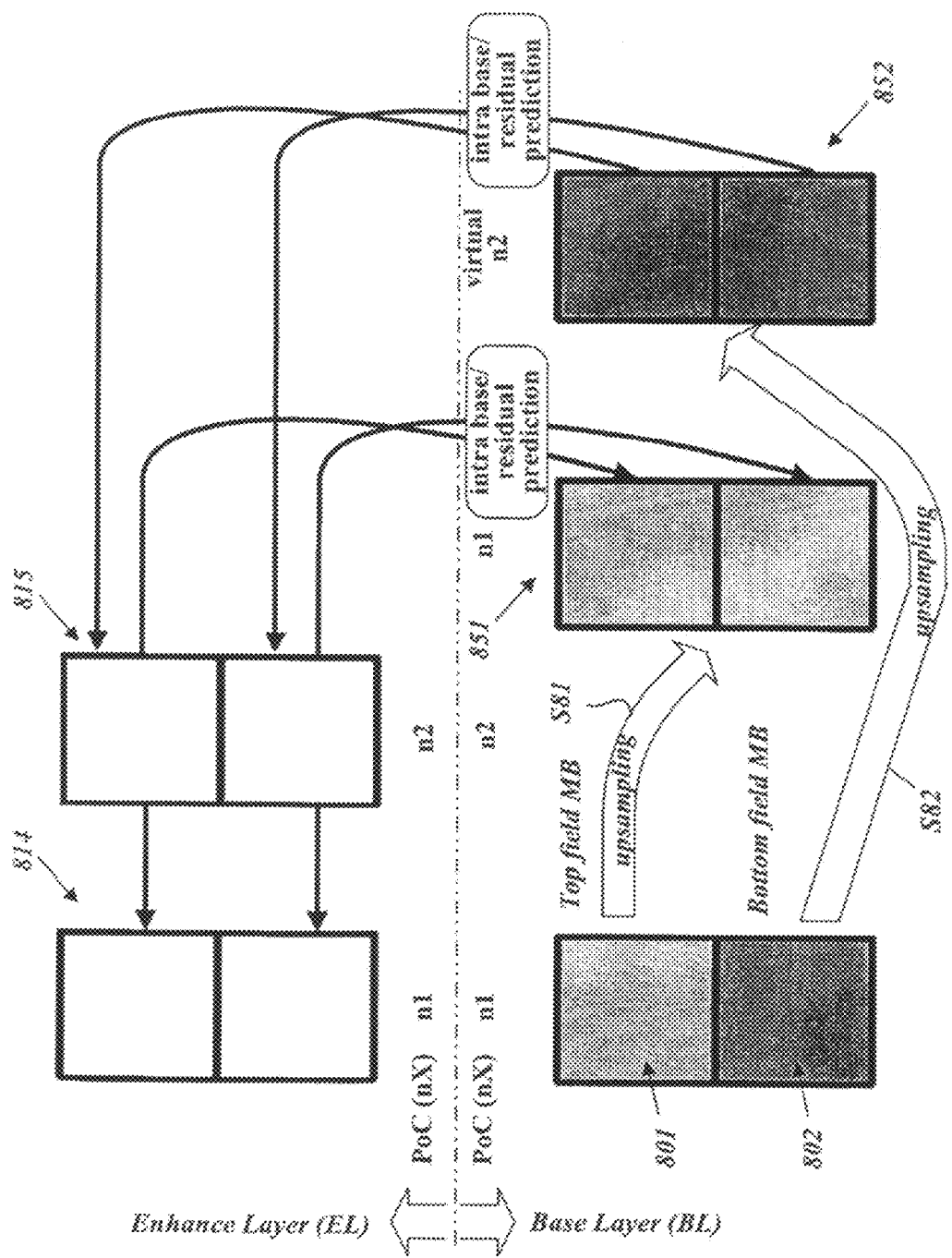

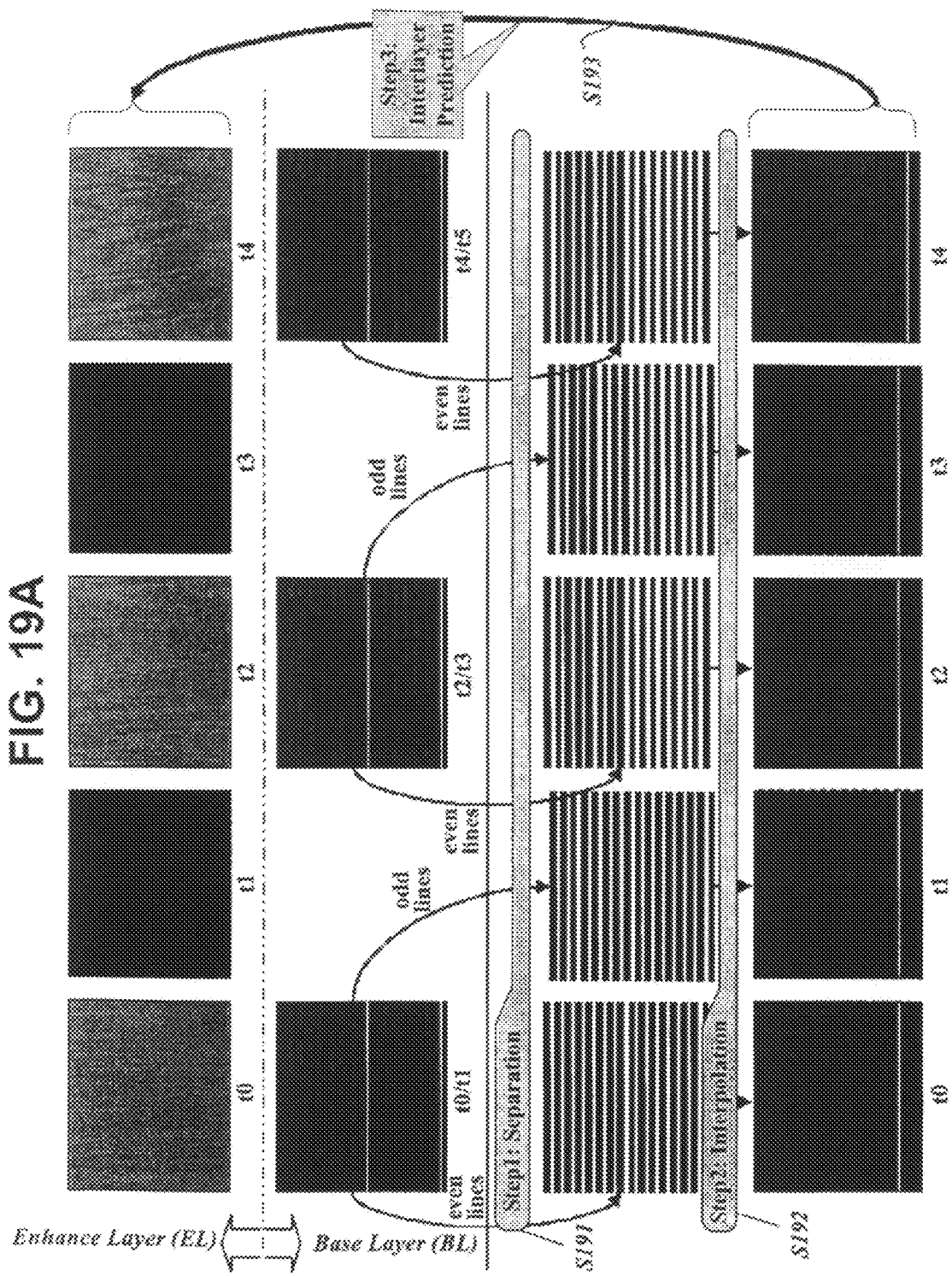

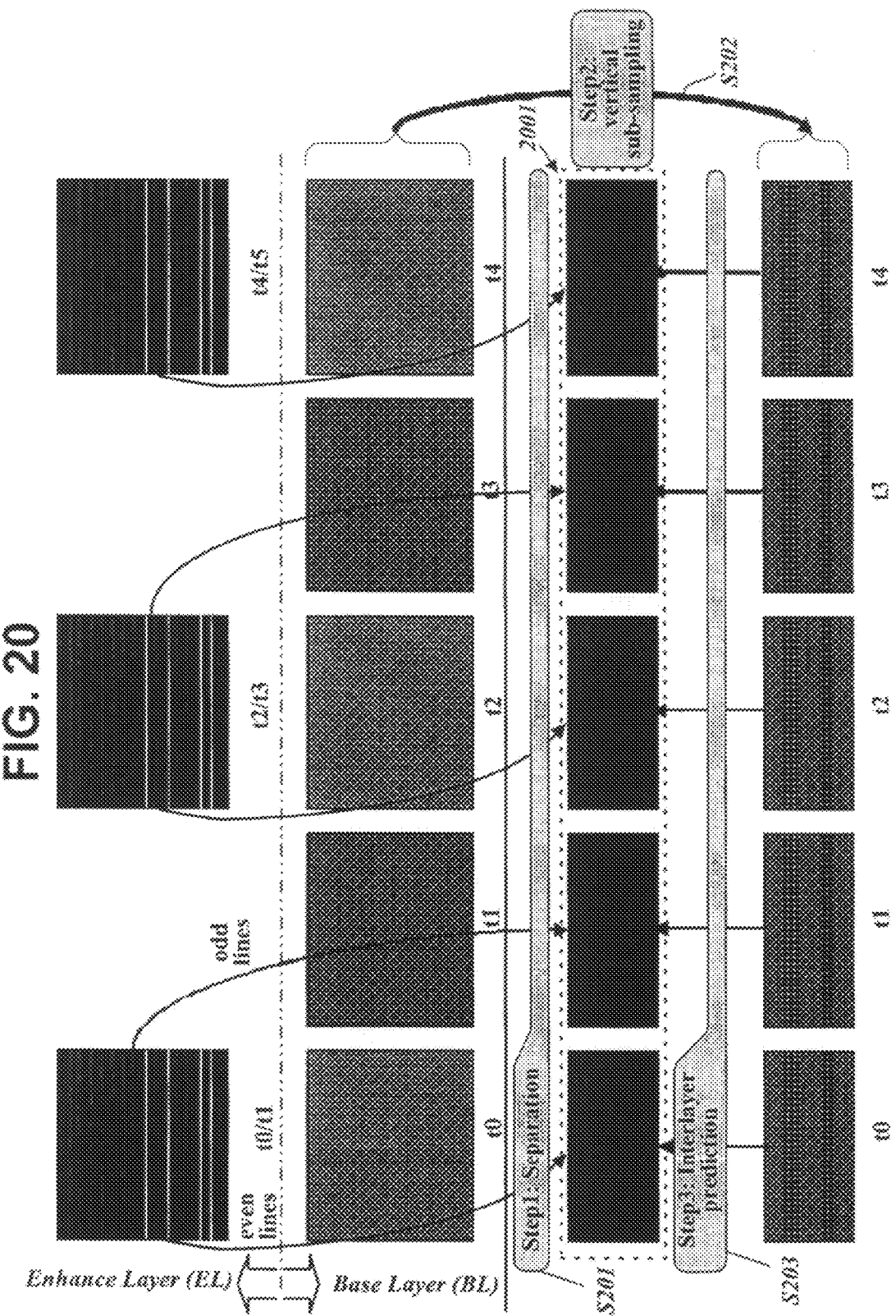

ately, a partial sequence of frames intermittently selected
INTER-LAYER PREDICTION METHOD FOR VIDEO SIGNAL This application is a National Phase entry of PCT Application number PCT/KR2007/000142 filed on Jan. 9, 2007, which claims priority under 35 U.S.C. §§119(e), 120 and 365(c) to U.S. Provisional Application No. 60/757,009, filed on Jan. 9, 2006, U.S. Provisional Application No. 60/758,235, filed on Jan. 12, 2006, U.S. Provisional Application No. 60/776,935, filed on Feb. 28, 2006, U.S. Provisional Application No. 60/783,395, filed on Mar. 20, 2006, U.S. Provisional Application No. 60/786,741, filed on Mar. 29, 2006, U.S. Provisional Application No. 60/787,496, filed on Mar. 31, 2006, U.S. Provisional Application No. 60/816,340, filed on Jun. 26, 2006, and U.S. Provisional Application No. 60/830,600, filed on Jul. 14, 2006 and which also claims priority to Korean Patent Application No. 10-2006-01118976, filed on Nov. 13, 2006, Korean Patent Application No. 10-2006-0111893, filed on Nov. 13, 2006, Korean Patent Application No. 10-2006-0111895, filed on Nov. 13, 2006, Korean Patent Application No. 10-2007-0111894, filed on Nov. 13, 2006, Korean Patent Application No. 10-2007-0001587, filed on Jan. 5, 2007, Korean Patent Application No. 10-2007-0001582, filed on Jan. 5, 2007, in the Korean Intellectual Property Office, the disclosure of each of which is incorporated herein in its entirety by reference.

TECHNICAL FIELD

The present invention relates to a method for interlayer prediction when encoding/decoding a video signal.

BACKGROUND ART

Scalable Video Codec (SVC) encodes video into a sequence of pictures with the highest image quality while ensuring that part of the encoded picture sequence (specifically, a partial sequence of frames intermittently selected from the total sequence of frames) can be decoded and used to represent the video with a low image quality.

Although it is possible to represent low image-quality video by receiving and processing part of a sequence of pictures encoded according to the scalable scheme, there is still a problem in that the image quality is significantly reduced if the bitrate is lowered. One solution to this problem is to provide an auxiliary picture sequence for low bitrates, for example, a sequence of pictures having a small screen size and/or a low frame rate, as at least one layer in the hierarchical structure.

When it is assumed that two sequences are provided, the auxiliary (lower) picture sequence is referred to as a base layer, and the main (upper) picture sequence is referred to as an enhanced or enhancement layer. Video signals of the base and enhanced layers have redundancy since the same video signal source is encoded into two layers. To increase the coding efficiency of the enhanced layer, a video signal of the enhanced layer is coded using coded information (motion information or texture information) of the base layer.

While a single video source 1 may be coded into a plurality of layers with different transfer rates as shown in FIG. 1a, a plurality of video sources 2b in different scanning modes which contain the same content 2a may be coded into the respective layers as shown in FIG. 1b. Also in this case, an encoder which codes the upper layer can increase coding gain by performing interlayer prediction using coded information of the lower layer since both the sources 2b provide the same content 2a.

Thus, it is necessary to provide a method for interlayer prediction taking into consideration the scanning modes of video signals when coding different sources into the respective layers. When interlaced video is coded, it may be coded into even and odd fields and may also be coded into pairs of odd and even macroblocks in one frame. Accordingly, the types of pictures for coding an interlaced video signal must also be considered for interlayer prediction.

Generally, the enhanced layer provides pictures with a resolution higher than those of the base layer. Accordingly, if pictures of the layers have different resolutions when different sources are coded into the respective layers, it is also necessary to perform interpolation to increase the picture resolution (i.e., picture size). Since the closer the images of base layer pictures for use in interlayer prediction are to those of enhanced layer pictures for predictive coding, the higher the coding rate is, it is necessary to provide a method for interpolation taking into consideration the scanning modes of the video signals of the layers.

DISCLOSURE OF INVENTION

It is an object of the present invention to provide a method for performing interlayer prediction under the condition that at least one of the two layers has interlaced video signal components.

It is another object of the present invention to provide a method for performing interlayer motion prediction of layers having pictures of different spatial resolutions (scalabilities) according to the types of the pictures.

It is yet another object of the present invention to provide a method for performing interlayer texture prediction of layers having pictures of different spatial and/or temporal resolutions (scalabilities).

One interlayer motion prediction method according to the present invention includes setting motion-related information of an intra-mode macroblock to motion-related information of an inter-mode macroblock, the intra-mode and inter-mode macroblocks being two vertically adjacent macroblocks of a base layer; and then obtaining motion information of a pair of vertically adjacent macroblocks for use in interlayer motion prediction based on the two vertically adjacent macroblocks.

Another interlayer motion prediction method according to the present invention includes setting an intra-mode macroblock, which is one of two vertically adjacent intra-mode and inter-mode macroblocks of a base layer, to an inter-mode block having zero motion-related information; and then obtaining motion information of a pair of vertically adjacent macroblocks for use in interlayer motion prediction based on the two vertically adjacent macroblocks.

Another interlayer motion prediction method according to the present invention includes deriving motion information of a single macroblock from motion information of a pair of vertically adjacent frame macroblocks of a base layer; and using the derived motion information as prediction information of motion information of a field macroblock in a current layer or respective motion information of a pair of field macroblocks in the current layer.

Another interlayer motion prediction method according to the present invention includes deriving respective motion information of two macroblocks from motion information of a single field macroblock of a base layer or motion information of a single field macroblock selected from a pair of vertically adjacent field macroblocks of the base layer; and using the derived respective motion information as prediction information of respective motion information of a pair of frame macroblocks of a current layer.

One interlayer motion prediction method for layers with pictures of different resolutions according to the present invention includes transforming a picture of a lower layer into a frame picture of the same resolution by selectively using prediction methods for transformation into frame macroblocks according to the types of pictures and the types of macroblocks in the pictures; upsampling the frame picture so as to have the same resolution as that of an upper layer; and then applying an interlayer prediction method suitable for the types of frame macroblocks in the upsampled frame picture and the types of macroblocks in a picture of the upper layer.

Another interlayer motion prediction method for layers with pictures of different resolutions according to the present invention includes identifying types of pictures of lower and upper layers and/or types of macroblocks included in the pictures; applying a method for prediction of a pair of frame macroblocks from a single field macroblock to the picture of the lower layer according to the identified results to construct a virtual picture having the same aspect ratio as that of the picture of the upper layer; upsampling the virtual picture; and then applying interlayer motion prediction to the upper layer using the upsampled virtual picture.

Another interlayer motion prediction method for layers with pictures of different resolutions according to the present invention includes identifying types of pictures of lower and upper layers and/or types of macroblocks included in the pictures; applying a method for prediction of a pair of frame macroblocks from a single field macroblock to the picture of the lower layer according to the identified results to construct a virtual picture having the same aspect ratio as that of the picture of the upper layer; and applying interlayer motion prediction to the picture of the upper layer using the constructed virtual picture.

Another interlayer motion prediction method for layers with pictures of different resolutions according to the present invention includes identifying types of pictures of lower and upper layers; copying motion information of a block in the picture of the lower layer to construct a virtual picture if the type of the picture of the lower layer is field and the type of the picture of the upper layer is progressive; upsampling the virtual picture; and applying a frame macroblock-to-macroblock motion prediction method between the upsampled virtual picture and the picture of the upper layer.

Another interlayer motion prediction method for layers with pictures of different resolutions according to the present invention includes identifying types of pictures of lower and upper layers; copying motion information of a block of the lower layer to construct a virtual picture if the type of the picture of the lower layer is field and the type of the picture of the upper layer is progressive; and using the virtual picture to apply interlayer motion prediction to the picture of the upper layer.

In an embodiment of the present invention, partition modes, reference indices, and motion vectors are sequentially predicted in interlayer motion prediction.

In another embodiment of the present invention, reference indices, motion vectors, and partition modes are sequentially predicted.

In another embodiment of the present invention, motion information of a pair of. field macroblocks of the virtual base layer to be used for interlayer motion prediction is derived from motion information of a pair of frame macroblocks of the base layer.

In another embodiment of the present invention, motion information of a field macroblock in an even or odd field picture of the virtual base layer to be used for interlayer motion prediction is derived from motion information of a pair of frame macroblocks of the base layer.

In another embodiment of the present invention, a macroblock is selected from a pair of field macroblocks of the base layer and motion information of a pair of frame macroblocks of the virtual base layer to be used for interlayer motion prediction is derived from motion information of the selected macroblock.

In another embodiment of the present invention, motion information of a pair of frame macroblocks of the virtual base layer to be used for interlayer motion prediction is derived from motion information of a field macroblock in an even or odd field picture of the base layer.

In another embodiment of the present invention, information of a field macroblock in an even or odd field picture of the base layer is copied to additionally construct a virtual field macroblock and motion information of a pair of frame macroblocks of the virtual base layer to be used for interlayer motion prediction is derived from motion information of a pair of field macroblocks constructed in this manner.

One interlayer texture prediction method according to the present invention includes constructing a pair of field macroblocks from a pair of vertically adjacent frame macroblocks of a base layer; and using respective texture information of the constructed pair of field macroblocks as respective texture prediction information of a pair of field macroblocks of a current layer.

Another interlayer texture prediction method according to the present invention includes constructing a single field macroblock from a pair of vertically adjacent frame macroblocks of a base layer; and using texture information of the constructed single field macroblock as texture prediction information of a field macroblock of a current layer.

Another interlayer texture prediction method according to the present invention includes constructing a pair of frame macroblocks from a single field macroblock or a pair of vertically adjacent field macroblocks of a base layer; and using respective texture information of the constructed pair of frame macroblocks as respective texture prediction information of a pair of frame macroblocks of a current layer.

Another interlayer texture prediction method according to the present invention includes constructing N pairs of frame macroblocks from a pair of vertically adjacent field macroblocks of a base layer, where the N is an integer greater than 1; and using respective texture information of the constructed N pairs of frame macroblocks as respective texture prediction information of N pairs of frame macroblocks located at different temporal positions in a current layer.

Another interlayer texture prediction method according to the present invention includes separating each frame of a lower layer into a plurality of field pictures to allow the lower layer to have the same temporal resolution as that of an upper layer; upsampling each of the separated field pictures in a vertical direction to extend each of the separated field pictures in a vertical direction; and then using each of the upsampled field pictures in interlayer texture prediction of each frame of the upper layer.

Another interlayer texture prediction method according to the present invention includes upsampling each field picture of a lower layer in a vertical direction to extend each field picture in a vertical direction; and using each of the upsampled field pictures in interlayer texture prediction of each frame of an upper layer.

Another interlayer texture prediction method according to the present invention includes separating each frame of an upper layer into a plurality of field pictures; downsampling pictures of a lower layer to reduce the pictures of the lower layer in a vertical direction; and then using the downsampled pictures in interlayer texture prediction of the separated field pictures of the upper layer.

A method for coding a video signal using interlayer prediction according to the present invention includes determining whether to use, in interlayer texture prediction, respective texture information of 2N blocks constructed by alternately selecting lines of 2N blocks in an arbitrary picture of the base layer and then arranging the selected lines in the selected order or respective texture information of 2N blocks constructed by interpolating one block selected from the 2N blocks of the base layer; and incorporating information indicating the determination into the coded information.

A method for decoding a video signal using interlayer prediction according to the present invention includes checking whether or not specific indication information is included in a received signal; and determining, based on the checked result, whether to use, in interlayer texture prediction, respective texture information of 2N blocks constructed by alternately selecting lines of 2N blocks in an arbitrary picture of the base layer and then arranging the selected lines in the selected order or respective texture information of 2N blocks constructed by interpolating one block selected from the 2N blocks of the base layer.

In an embodiment of the present invention, each frame of the upper or lower layer is separated into two field pictures.

In an embodiment of the present invention, if the specific indication information is not included in the received signal, this case is regarded as the same as where a signal including the indication information set to zero has been received and blocks, respective texture information of which is to be used in interlayer prediction, are determined.

One method for using a video signal of a base layer in interlayer texture prediction according to the present invention includes separating an interlaced video signal of the base layer into even and odd field components; enlarging each of the even and odd field components in a vertical and/or horizontal direction; and then combining and using the enlarged even and odd field components in interlayer texture prediction.

Another method for using a video signal of a base layer in interlayer texture prediction according to the present invention includes separating a progressive video signal of the base layer into an even line group and an odd line group; enlarging each of the even and odd line groups in a vertical and/or horizontal direction; and combining and using combined the enlarged even and odd line groups in interlayer texture prediction.

Another method for using a video signal of a base layer in interlayer texture prediction according to the present invention includes enlarging an interlaced video signal of the base layer in a vertical and/or horizontal direction so as to have the same resolution as that of a progressive video signal of an upper layer; and performing interlayer texture prediction of the video signal of the upper layer based on the enlarged video signal.

Another method for using a video signal of a base layer in interlayer texture prediction according to the present invention includes enlarging a progressive video signal of the base layer in a vertical and/or horizontal direction so as to have the same resolution as that of an interlaced video signal of an upper layer; and performing interlayer texture prediction of the video signal of the upper layer based on the enlarged video signal.

In an embodiment of the present invention, the video signal separation and enlargement is performed at a macroblock level (or on a macroblock basis).

In another embodiment of the present invention, the video signal separation and enlargement is performed at a picture level.

In another embodiment of the present invention, the video signal separation and enlargement is performed if picture formats of two layers to which interlayer texture prediction is to be applied are different, i.e., if one layer includes progressive pictures and the other includes interlaced pictures.

In another embodiment of the present invention, the video signal separation and enlargement is performed if both pictures of two layers to which interlayer texture prediction is to be applied are interlaced.

BRIEF DESCRIPTION OF DRAWINGS

FIGS. 2c and 2d show the types of picture sequences for encoding an interlaced video signal;

FIGS. 4a to 4f schematically show a procedure in which motion information of a field macroblock of a virtual base layer to be used for interlayer motion prediction of a field macroblock in an MBAFF frame is derived using motion information of a frame macroblock according to an embodiment of the present invention;

FIG. 8*h* schematically shows a procedure in which texture information of a pair of field macroblocks in an MBAFF frame is used in texture prediction of a plurality of pairs of frame macroblocks according to an embodiment of the present invention;

FIG. 19*a* illustrates a procedure in which interlayer prediction is applied when the enhanced layer is a progressive frame sequence and the picture types and temporal resolutions of the two layers are different according to an embodiment of the present invention;

FIG. 20 illustrates a procedure in which interlayer prediction is applied when the base layer is a progressive frame sequence and the picture types and temporal resolutions of the two layers are different according to an embodiment of the present invention.

MODES FOR CARRYING OUT THE INVENTION

Embodiments of the present invention will now be described in detail with reference to the accompanying drawings.

Figure 1A:
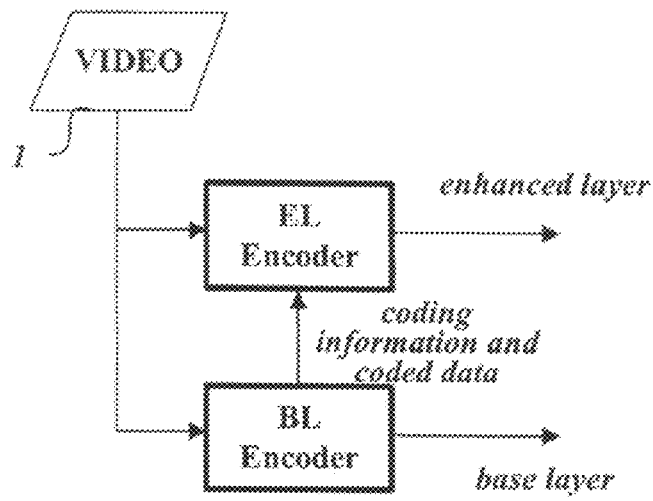
FIGS. 1a and 1b illustrate methods of coding a single video source into a plurality of layers.
Figure 1B:
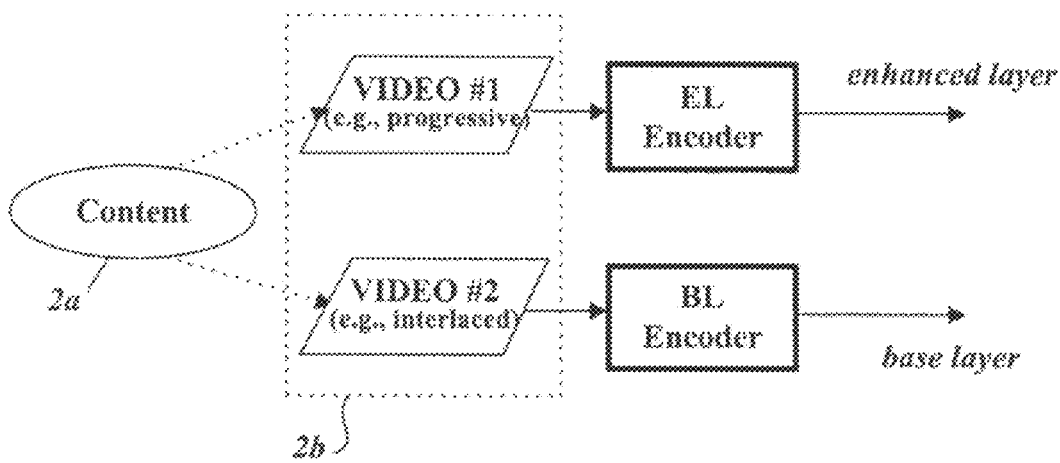
Figure 2A:
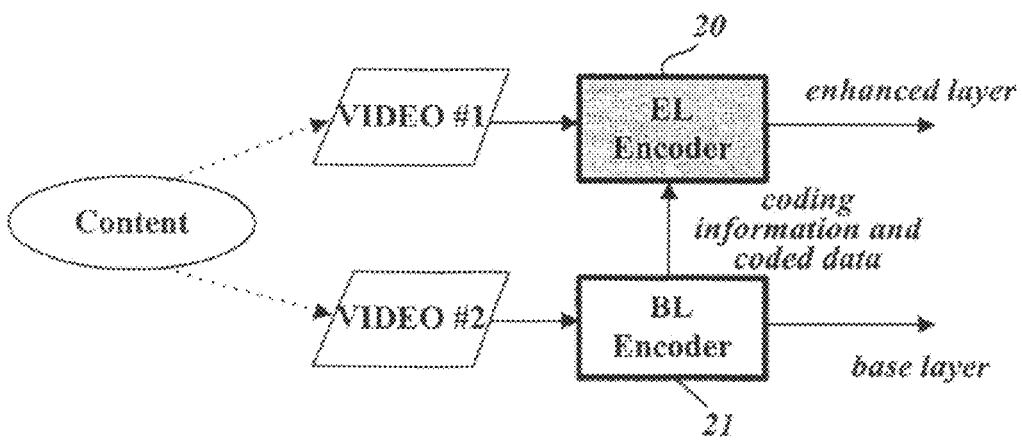
FIGS. 2a and 2b briefly show the configuration of a video signal encoding apparatus to which an interlayer prediction method according to the present invention is applied.

FIG. 2*a* schematically illustrates the building blocks of a video signal encoding apparatus to which an interlayer prediction method according to the present invention is applied. Although the apparatus of FIG. 2*a* is implemented to code an input video signal in two layers, principles of the present invention described below can also be applied to interlayer processes even when a video signal is coded in three or more layers.

Figure 2B:
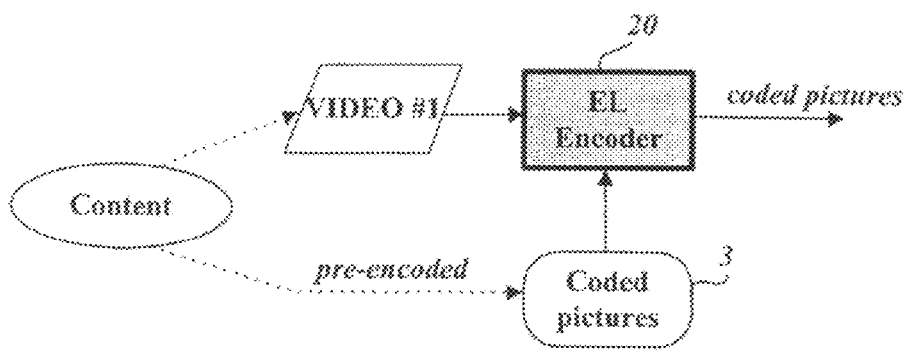

The interlayer prediction method according to the present invention is performed at an enhanced layer (EL) encoder 20 in the apparatus of FIG. 2*a*. Encoded information (motion information and texture information) is received at a base layer (BL) encoder 21. Interlayer texture prediction or motion prediction is performed based on the received information. If needed, the received information is decoded and the prediction is performed based on the decoded information. Of course, in the present invention, an input video signal may be coded using a video source 3 of the base layer that has already been encoded as shown in FIG. 2*b*. The same interlayer prediction method as described below is applied in this case.

Figure 3A:
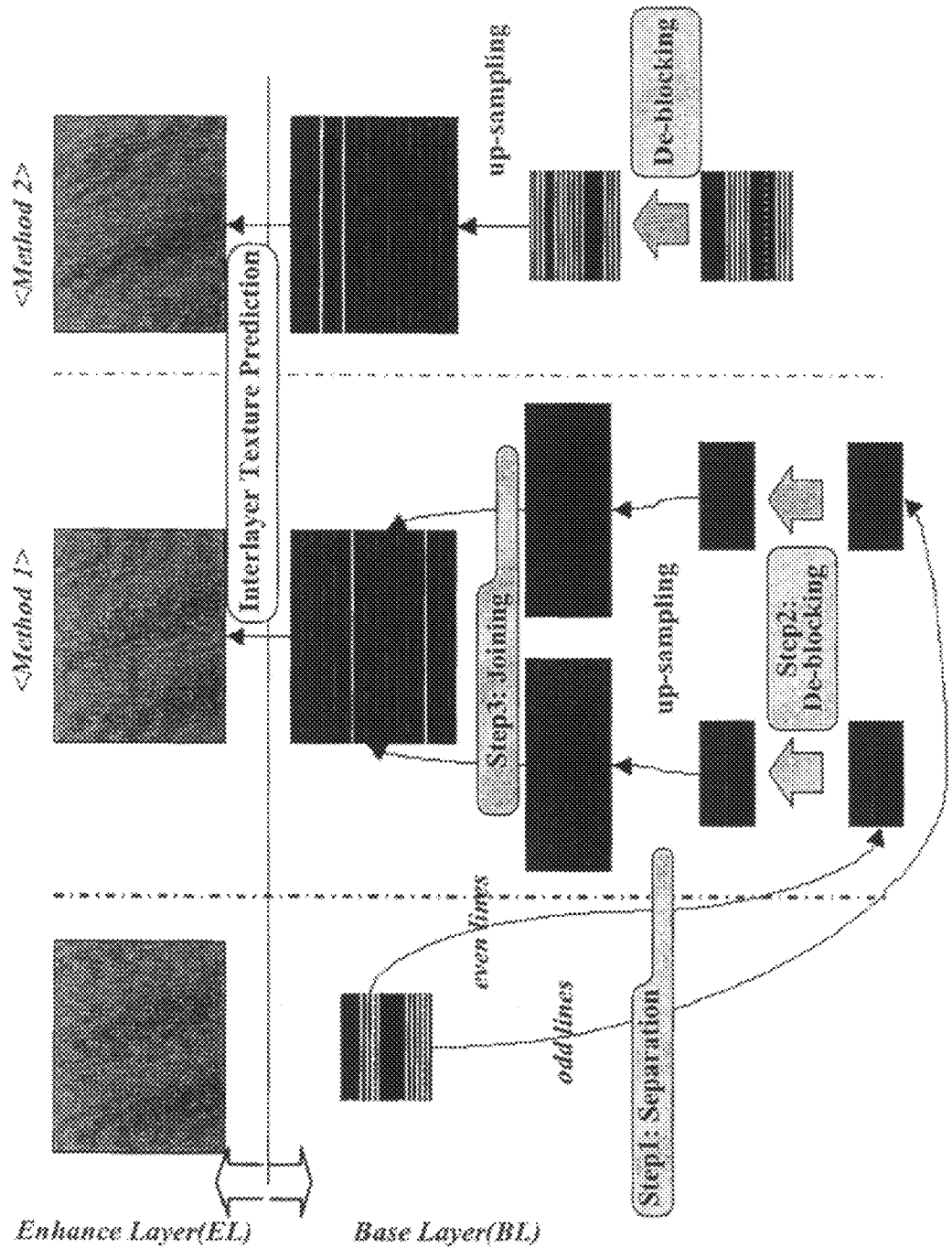
FIGS. 3a and 3b schematically show a procedure in which a base layer picture is constructed and de-blocking filtering is performed for interlayer texture prediction according to an embodiment of the present invention.
Figure 3B:
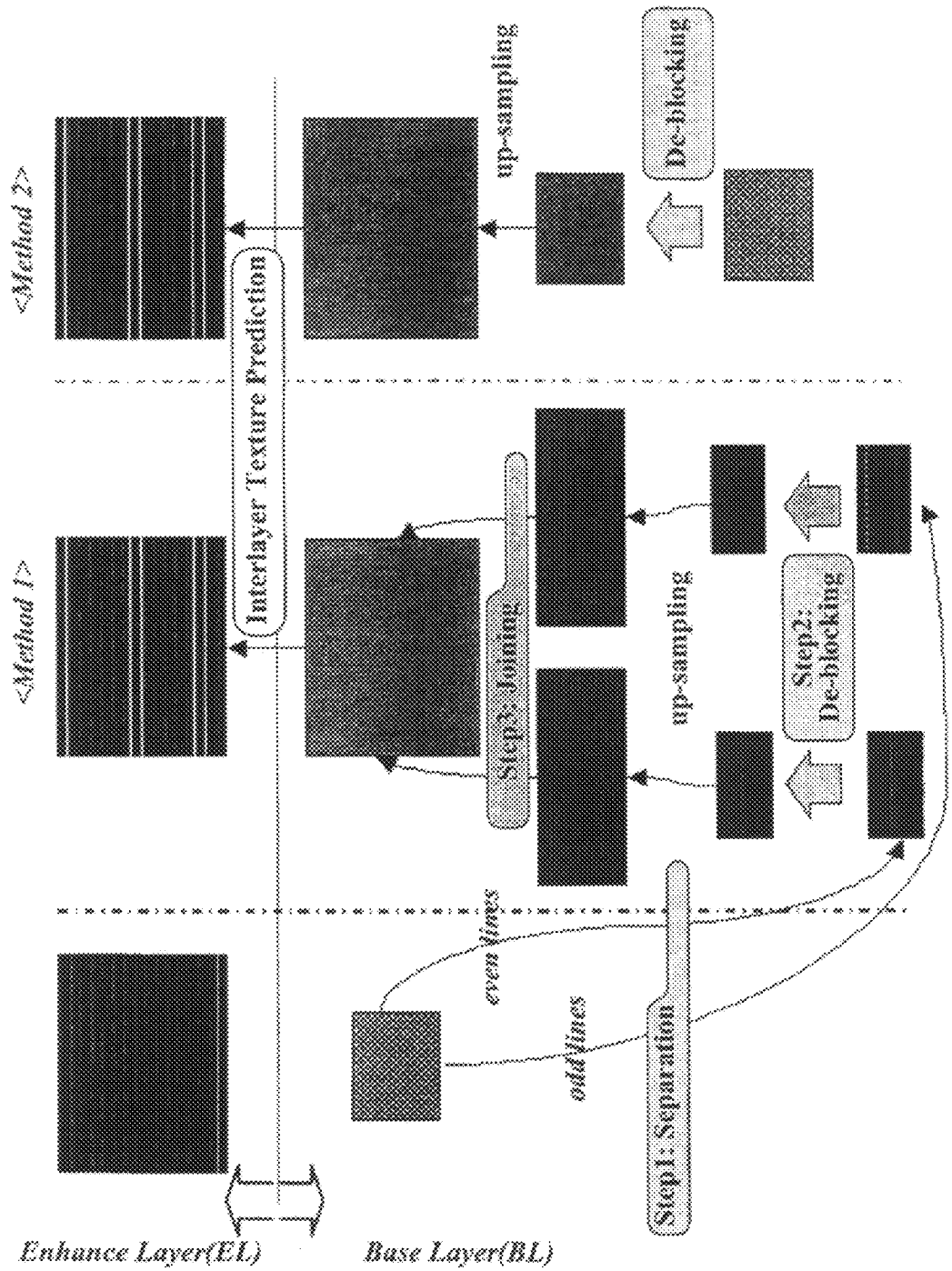

In the case of FIG. 2*a*, there may be two methods in which the BL encoder 21 encodes an interlaced video signal or in which the encoded video source 3 of FIG. 2*b* has been coded. Specifically, in one of the two methods, the interlaced video signal is simply encoded into a field sequence on a field-by-field basis as shown in FIG. 3*a* and, in the other method, frames are encoded into a frame sequence by constructing each frame of the sequence with pairs of macroblocks of two (even and odd) fields as shown in FIG. 3*b*. The upper one of a pair of macroblocks in a frame encoded in this manner is referred to as a "top macroblock" and the lower one is referred to as a "bottom macroblock". If the top macroblock is composed of an even (or odd) field image component, the bottom macroblock is composed of an odd (or even) field image component. A frame constructed in this manner is referred to as a MacroBlock Adaptive Frame Field (MBAFF) frame. The MBAFF frame may include not only macroblock pairs, each including odd and even field macroblocks but also macroblock pairs, each including two frame macroblocks.

Accordingly, when a macroblock in a picture has an interlaced image component, it may be a macroblock in a field and may also be a macroblock in a frame. Each macroblock having an interlaced image component is referred to as a field macroblock, whereas each macroblock having a progressive (scan) image component is referred to as a frame macroblock.

Thus, it is necessary to determine an interlayer prediction method by determining whether each of the types of a macroblock to be coded at the EL encoder 20 and a macroblock of the base layer to be used in interlayer prediction of the macroblock is a frame macroblock type or a field macroblock type. If the macroblock is a field macroblock, it is necessary to determine the interlayer prediction method by determining whether it is a field macroblock in a field or in an MBAFF frame.

The method will be described separately for each case. Prior to the description, it is assumed that the resolution of the current layer is equal to that of the base layer. That is, it is assumed that SpatialScalabilityType( ) is zero. A description when the resolution of the current layer is higher than that of the base layer will be given later. In the following description and the drawings, the terms "top" and "even" (or odd) are interchangeably used and the terms "bottom" and "odd" (or even) are interchangeably used.

To perform interlayer prediction to encode or decode the enhanced layer using the base layer, first, it is necessary to decode the base layer. Thus, decoding of the base layer is first described as follows.

Not only motion information of the base layer such as partition modes, reference indices, and motion vectors but also texture of the base layer is decoded when the base layer is decoded.

When the texture of the base layer is decoded for interlayer texture prediction, all image sample data of the base layer is not decoded to reduce the load of the decoder. Image sample data of intra-mode macroblocks is decoded while only residual data, which is error data between image sample data, of inter-mode macroblocks is decoded without motion compensation with adjacent pictures.

In addition, texture decoding of the base layer for interlayer texture prediction is performed on a picture-by-picture basis rather than on a macroblock-by-macroblock basis to construct base layer pictures that are temporally coincident with enhanced layer pictures. A base layer picture is constructed from image sample data reconstructed from intra-mode macroblocks and residual data decoded from inter-mode macroblocks as described above.

Intra-mode or inter-mode motion compensation and transformation such as DCT and quantization is performed on an image block basis, for example, on a 16×16 macroblock basis or on a 4×4 sub-block basis. This causes blocking artifacts at the boundaries of blocks to distort images. De-blocking filtering is applied to reduce these blocking artifacts. The de-blocking filter smoothes the edges of image blocks to improve the quality of video frames.

Whether or not to apply de-blocking filtering to reduce blocking distortion depends on the intensities of image blocks at the boundaries and the gradients of pixels around the boundaries. The strength or level of the de-blocking filter is determined from a quantization parameter, an intra mode, an inter mode, an image block partition mode indicating the block size or the like, a motion vector, a pixel value before de-blocking filtering, and the like.

The de-blocking filter in interlayer prediction is applied to an intra-mode macroblock in a base layer picture that is a basis for texture prediction of an intra base mode (intraBL or intra interlayer mode) macroblock of the enhanced layer.

Figure 2C:
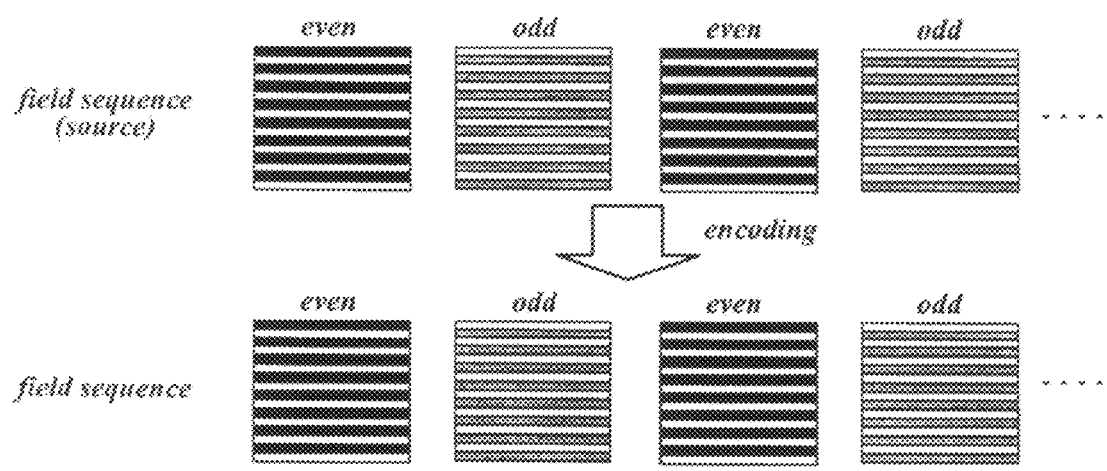

When two layers to be encoded according to an interlayer prediction method are all encoded into a field picture sequence as shown in FIG. 2c, the two layers are all regarded as in frame format so that, from coding processes for the frame format, it is possible to easily derive encoding/decoding processes including de-blocking filtering.

A method for performing de-blocking filtering according to an embodiment of the present invention will now be described for the case where the picture format of the base layer is different from that of the enhanced layer, i.e., the case where the base layer is in frame (or progressive) format and the base layer is in field (or interlaced) format, the case where the base layer is in field format and the base layer is in frame format, or the case where one of the enhanced and base layers has been encoded into a field picture sequence and the other has been encoded into an MBAFF frame although both the enhanced and base layers are in field format as shown in FIGS. 2c and 2d.

FIGS. 3a and 3b schematically illustrate procedures in which a base layer picture is constructed to perform de-blocking filtering for interlayer texture prediction according to embodiments of the present invention.

FIG. 3a illustrates an embodiment where the enhanced layer is in frame format and the enhanced layer is in field format and FIG. 3b illustrates an embodiment where the base layer is in field format and the base layer is in frame format.

In these embodiments, for interlayer texture prediction, texture of an inter-mode macroblock and an intra-mode macroblock of the base layer is decoded to construct a base layer picture including image sample data and residual data and the constructed picture is upsampled according to the ratio between the resolution (or screen size) of the base layer and that of the enhanced layer after a de-blocking filter is applied to the constructed picture to reduce blocking artifacts.

The first method (Method 1) in FIGS. 3a and 3b is a method in which a base layer is separated into two field pictures to perform de-blocking filtering. In this method, when an enhanced layer is created using a base layer encoded in a different picture format, a base layer picture is divided into an even line field picture and an odd line field picture and the two field pictures are de-blocked (i.e., filtered for de-blocking) and upsampled. The two pictures are then joined into a single picture and interlayer texture prediction is performed based on the single picture.

The first method includes the following three steps.

At a separation step (Step 1), a base layer picture is separated into a top field (or odd field) picture including even lines and a bottom field (or even field) picture including odd lines. The base layer picture is a video picture including residual data (inter-mode data) and image sample data (intra-mode data) that is reconstructed from a data stream of the base layer through motion compensation.

At a de-blocking step (Step 2), the field pictures divided at the separation step are de-blocked through a de-blocking filter. Here, a conventional de-blocking filter may be used as the de-blocking filter.

When the resolution of the enhanced layer is different from that of the base layer, the de-blocked field pictures are upsampled according to the ratio between the resolution of the enhanced layer and that of the base layer.

At a joining step (Step 3), the upsampled top field picture and the upsampled bottom field picture are interlaced in an alternate fashion to be joined into a single picture. Thereafter, texture prediction of the enhanced layer is performed based on the single picture.

In the second method (Method 2) in FIGS. 3a and 3b, when an enhanced layer is created using a base layer encoded in a different picture format, a base layer picture is directly de-blocked and upsampled without dividing it into two field pictures and interlayer texture prediction is performed based on the resulting picture.

In the second method, a base layer picture, which corresponds to an enhanced layer picture to be encoded through interlayer texture prediction, is de-blocked immediately without dividing it into top and bottom field pictures and is then upsampled. Thereafter, texture prediction of the enhanced layer is performed based on the upsampled picture.

A de-blocking filter for application to a base layer picture constructed for interlayer motion prediction is applied only to an area including image sample data decoded from intra-mode macroblocks, without being applied to an area including residual data.

In the case where the base layer has been encoded in field format in FIG. 3a, i.e., where the base layer has been encoded into a field picture sequence as shown in FIG. 2c or into an MBAFF frame as shown in FIG. 2d, to apply the second method, it is necessary to perform a process of alternately interlacing lines of top and bottom field pictures to combine them into a single picture (in the case of FIG. 2c) or alternately interlacing lines of top and bottom macroblocks of field macroblock pairs to combine them into a single picture (in the case of FIG. 2d). This process will be described in detail with reference to FIGS. 8d and 8e. The top and bottom field pictures or top and bottom macroblocks to be interlaced are field pictures or macroblocks including residual data (inter-mode data) and image sample data (intra-mode data) reconstructed through motion compensation.

In addition, in the case where top and bottom macroblocks of field macroblock pairs (of the base layer) in an MBAFF frame as shown in FIG. 2d are of different modes and, from these macroblocks, intra-mode blocks are selected to be used for interlayer texture prediction of macroblock pairs of the enhanced layer (in the case of FIG. 8g described later), in the case where any frame (picture) in the base layer encoded into field macroblock pairs in an MBAFF frame as shown in FIG. 2d is not temporally coincident with the enhanced layer picture (in the case of FIG. 8h described later), or in the case where texture of an enhanced layer of macroblock pairs is predicted from a base layer of field macroblocks of field pictures as shown in FIG. 2c (in the case of FIG. 10d described later), a selected one of the field macroblocks is upsampled to a temporary pair of macroblocks ("841" in FIG. 8g and "851" and "852" in FIG. 8h) or two temporary macroblocks ("1021" in FIG. 10d) and a de-blocking filter is applied to intra-mode ones of these macroblocks.

Interlayer texture prediction described in a variety of the following embodiments is performed based on de-blocked base layer pictures described in the embodiment of FIGS. 3a and 3b.

An interlayer prediction method will now be described separately for each case classified depending on the type of macroblocks in the current layer to be coded and the type of macroblocks of the base layer to be used for interlayer prediction of the macroblocks of the current layer. In the description, it is assumed that the spatial resolution of the current layer is equal to that of the base layer as described above.

I. The Case of Frame MB->field MB in MBAFF Frame

In this case, macroblocks in the current layer (EL) have been coded into field macroblocks in an MBAFF frame and macroblocks in the base layer to be used for interlayer prediction of the macroblocks of the current layer have been coded into frame macroblocks. Video signal components included in both the upper and lower macroblocks in the base layer are the same as those included in a pair of co-located macroblocks in the current layer. The upper and lower (top and bottom) macroblocks will be referred to as a macroblock pair and the term "pair" will be used to describe a pair of vertically adjacent blocks in the following description. First, interlayer motion prediction is described as follows.

Figure 4A:
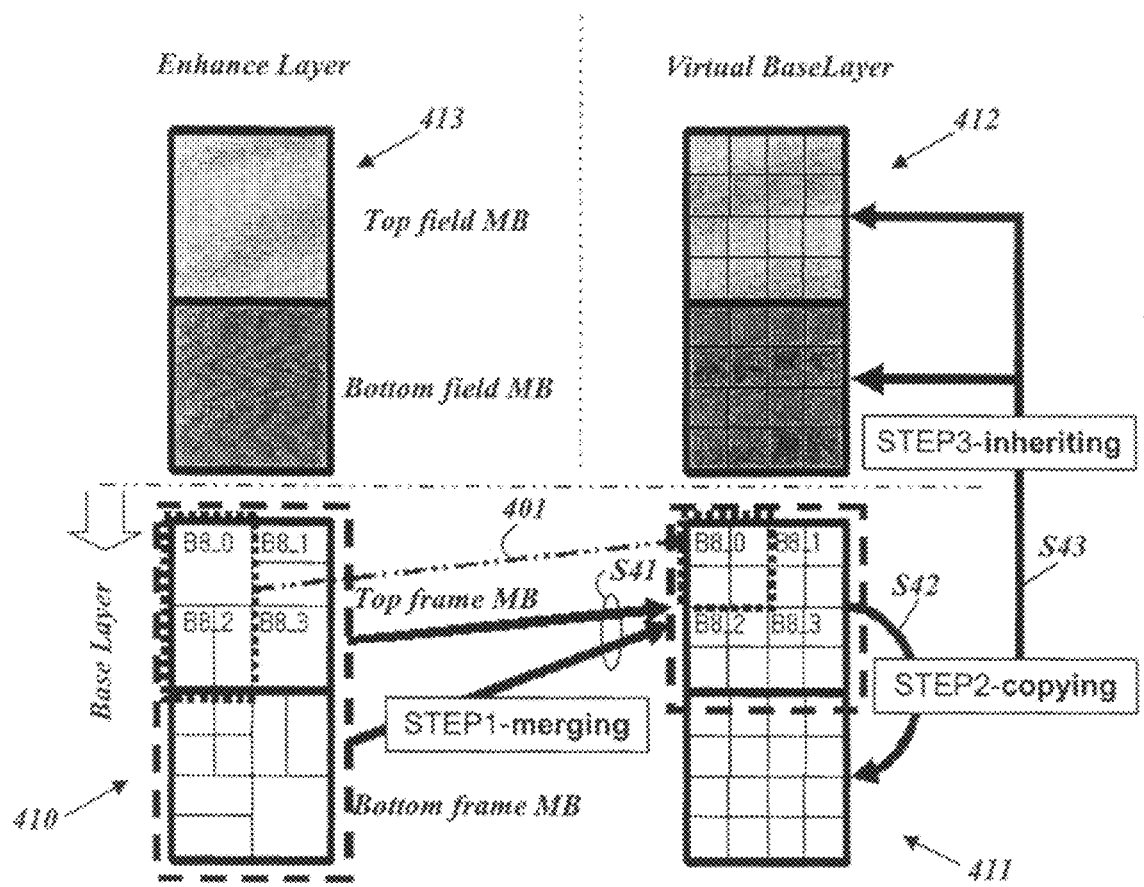

The EL encoder 20 uses, as partition modes of the current macroblock, macroblock partition modes obtained by merging a pair of macroblocks 410 of the base layer into a single macroblock (through compression to half size in a vertical direction). FIG. 4a illustrates a detailed example of this process. As shown, first, a corresponding pair of macroblocks 410 of the base layer is merged into a single macroblock (S41) and partition modes of the macroblock obtained through the merging are copied to another to construct a pair of macroblocks 411 (S42). Thereafter, respective partition modes of the pair of macroblocks 411 are applied to a pair of macroblocks 412 of a virtual base layer (S43).

However, a partition area that is not permitted in the partition mode may be generated when the corresponding pair of macroblocks 410 is merged into a single macroblock. To prevent this, the EL encoder 20 determines the partition mode according to the following rules.

1) Two top and bottom 8×8 blocks ("B8_0" and "B8_2" in FIG. 4a) in a pair of macroblocks of the base layer are merged into a single 8×8 block. However, if any of the corresponding 8×8 blocks has not been sub-partitioned, they are merged into two 8×4 blocks and, if any of the corresponding 8×8 blocks has been sub-partitioned, they are merged into four 4×4 blocks ("401" in FIG. 4a).

2) An 8×16 block of the base layer is reduced to an 8×8 block, a 16×8 block is reduced to two adjacent 8×4 blocks, and a 16×16 block is reduced to a 16×8 block.

If at least one of the pair of corresponding macroblocks has been coded in intra mode, the EL encoder 20 first performs the following processes before the merging process.

Figure 4B:
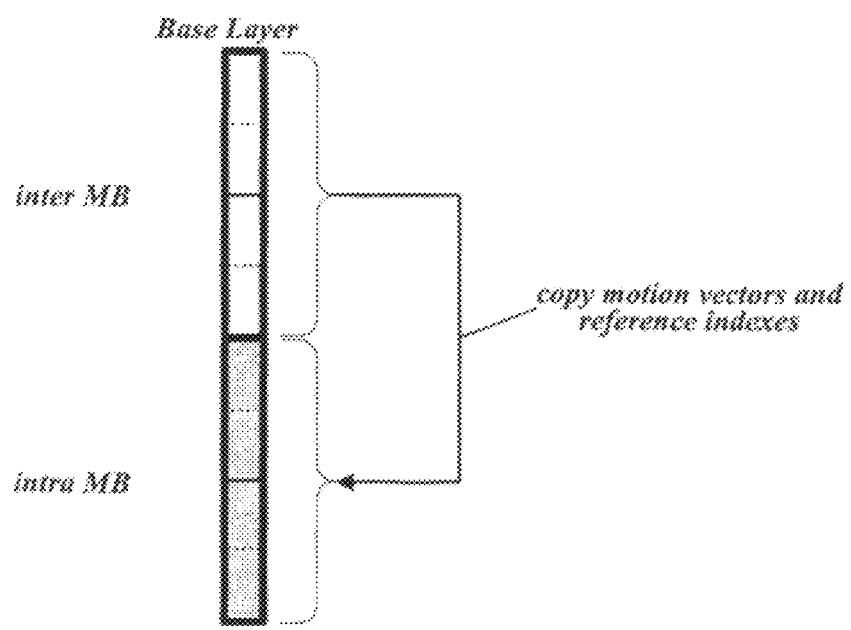
Figure 4C:
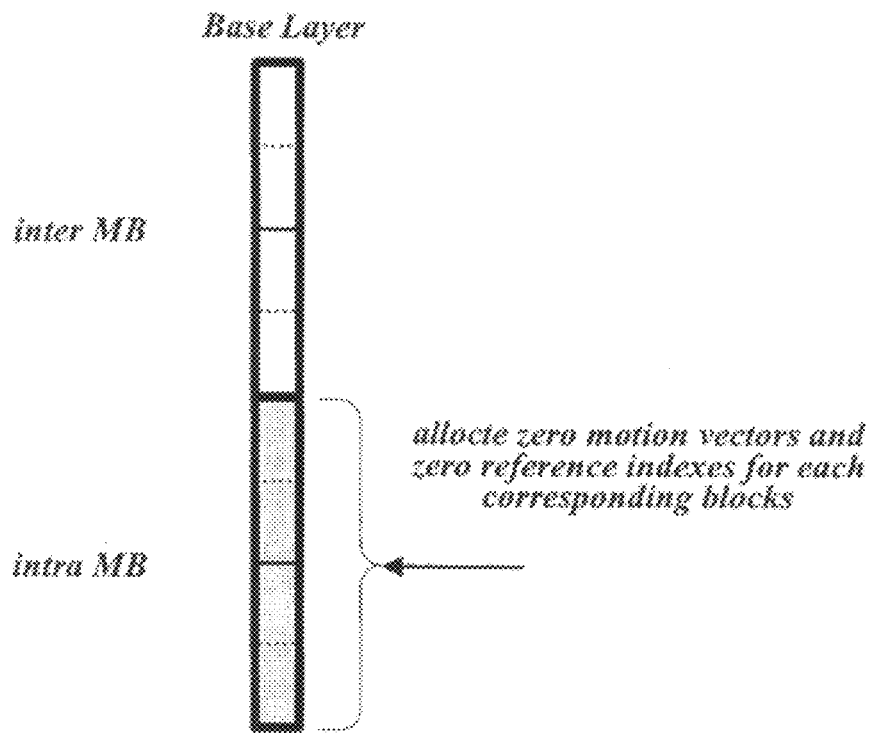
Figure 4D:
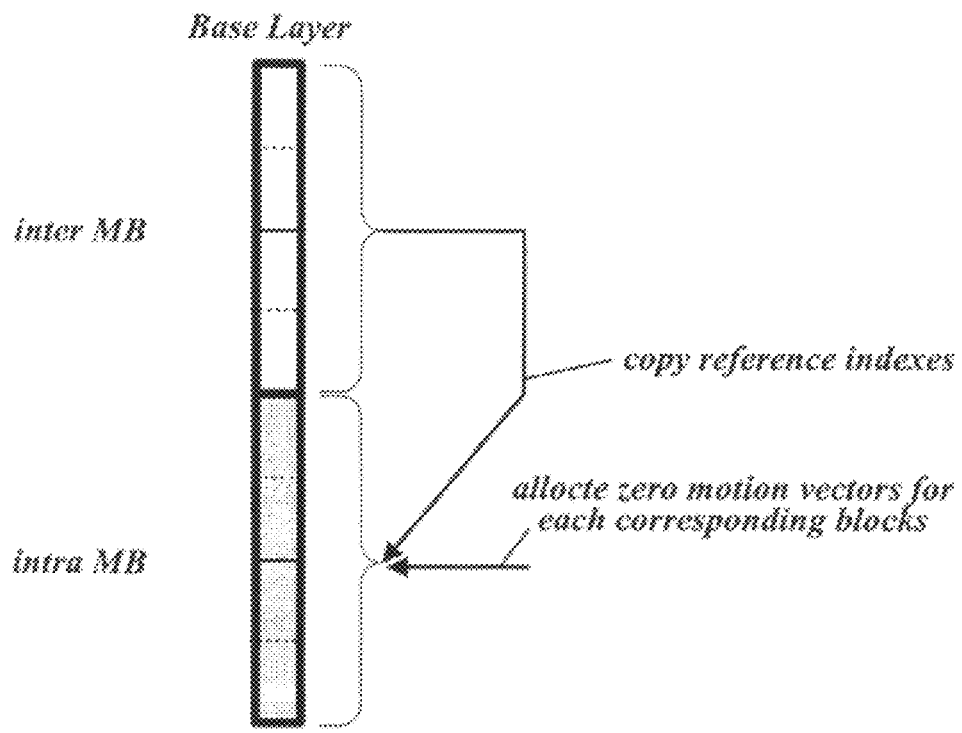

If only one of the two macroblocks is of intra mode, motion information of the inter macroblock such as macroblock partition modes, reference indices, and motion vectors is copied to the intra macroblock as shown in FIG. 4b or the intra macroblock is regarded as a 16×16 inter macroblock with zero motion vectors and zero reference indices as shown in FIG. 4c. Alternatively, as shown in FIG. 4d, reference indices of the intra macroblock are set by copying those of the inter macroblock to the intra macroblock and zero motion vectors are allocated to the intra macroblock. Then, the above-mentioned merging process is performed and a reference index and motion vector derivation procedure is then performed as described below.

The EL encoder 20 performs the following process to derive reference indices of the current pair of macroblocks 412 from those of the corresponding pair of macroblocks 410.

If each of a pair of 8×8 blocks of the base layer corresponding to the current 8×8 block has been subdivided into the same number of parts, the reference index of one (the top or bottom block) of the pair of 8×8 blocks is determined to be the reference index of the current 8×8 block. Otherwise, the reference index of one of the pair of 8×8 blocks, which has been subdivided into the smaller number of parts, is determined to be the reference index of the current 8×8 block.

In another embodiment of the present invention, the smaller of reference indices set for a pair of 8×8 blocks of the base layer corresponding to the current 8×8 block is determined to be the reference index of the current 8×8 block. This determination method in the example of FIG. 4e can be expressed as follows:

refidx of curr B8_0=min(refidx of base top frame MB's B8_0, refidx of base top frame MB's B8_2)

refidx of curr B8_1=min(refidx of base top frame MB's B8_1, refidx of base top frame MB's of base B8_3)

refidx of curr B8_2=min(refidx of base bottom frame MB's B8_0, refidx of base bottom frame MB's B8_2), and refidx of curr B8_3=min(refidx of base bottom frame MB's B8_1, refidx of base bottom frame MB's B8_3).

The above reference index derivation procedure can be applied to both the top and bottom field macroblocks. The reference index of each 8×8 block determined in this manner is multiplied by 2 and the multiplied reference index is determined to be its final reference index. The reason for this multiplication is that, when decoded, the number of pictures is twice as that of the frame sequence since field macroblocks belong to pictures divided into even and odd fields. Depending on decoding algorithm, the final reference index of the bottom field macroblock may be determined by multiplying its reference index by 2 and then adding 1 to the multiplied reference index.

The following is a procedure in which the EL encoder 20 derives motion vectors of a pair of macroblocks of the virtual base layer.

Motion vectors are determined on a 4×4 block basis and thus a corresponding 4×8 block of the base layer is identified as shown in FIG. 4f. If the corresponding 4×8 block has been subdivided, a motion vector of its top or bottom 4×4 block is determined to be that of the current 4×4 block. Otherwise, a motion vector of the corresponding 4×8 block is determined to be that of the current 4×4 block. The determined motion vector whose vertical component is divided by 2 is used as a final motion vector of the current 4×4 block. The reason for this division is that an image component included in two frame macroblocks corresponds to an image component of one field macroblock so that the size of the field image is reduced by half in a vertical direction.

Once motion information of the pair of field macroblocks 412 of the virtual base layer is determined in this manner, the motion information is used for interlayer motion prediction of a target pair of field macroblocks 413 of the enhanced layer. Also in the following description, once motion information of a macroblock or a pair of macroblocks of the virtual base layer is determined, the motion information is used for interlayer motion prediction of a corresponding macroblock or a corresponding pair of macroblocks of the current layer. In the following description, it is assumed that this process is applied even without mentioning that the motion information of a macroblock or a pair of macroblocks of the virtual base layer is used for interlayer motion prediction of a corresponding macroblock or a corresponding pair of macroblocks of the current layer.

Figure 5A:
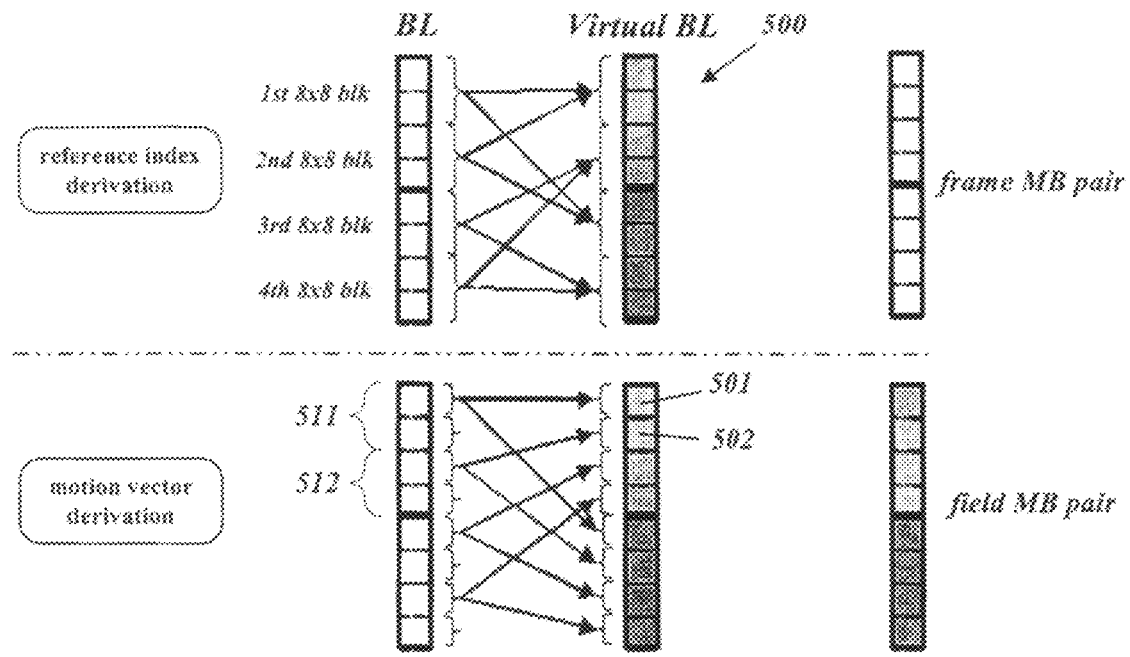
FIGS. 5a and 5b illustrate a reference index and motion information derivation procedure according to another embodiment of the present invention.

FIG. 5a schematically illustrates how motion information of a pair of field macroblocks 500 of a virtual base layer to be used for interlayer prediction is derived from motion information of a pair of frame macroblocks of the base layer corresponding to the current pair of macroblocks according to another embodiment of the present invention. In this embodiment, as shown, a reference index of a top or bottom 8×8 block of the top macroblock of the pair of frame macroblocks of the base layer is used for a reference index of a top 8×8 block of each of the pair of field macroblocks 500 of the virtual base layer and a reference index of a top or bottom 8×8 block of the bottom macroblock of the base layer is used for a reference index of a bottom 8×8 block of each of the pair of field macroblocks 500. On the other hand, as shown, a motion vector of the topmost 4×4 block of the top macroblock of the pair of frame macroblocks of the base layer is commonly used for the topmost 4×4 block of each of the pair of field macroblocks 500 of the virtual base layer, a motion vector of the third 4×4 block of the top macroblock of the pair of frame macroblocks of the base layer is commonly used for the second 4×4 block of each of the pair of field macroblocks 500, a motion vector of the topmost 4×4 block of the bottom macroblock of the pair of frame macroblocks of the base layer is commonly used for the third 4×4 block of each of the pair of field macroblocks 500, and a motion vector of the third 4×4 block of the bottom macroblock of the pair of frame macroblocks of the base layer is commonly used for the fourth 4×4 block of each of the pair of field macroblocks 500.

Figure 5B:
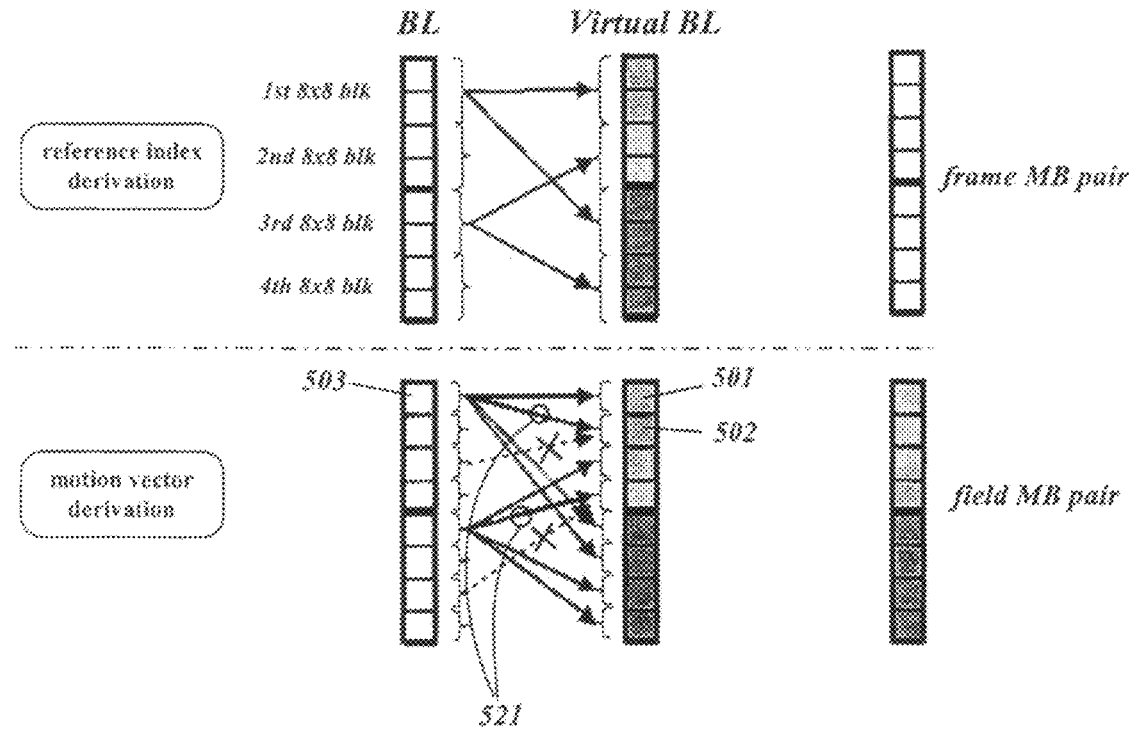

As illustrated in FIG. 5a, a top 4×4 block 501 and a bottom 4×4 block 502 in an 8×8 block in the pair of field macroblocks 500 constructed for use in interlayer prediction use the motion vectors of 4×4 blocks in different 8×8 blocks 511 and 512 of the base layer. These motion vectors may be motion vectors that use different reference pictures. That is, the different 8×8 blocks 511 and 512 may have different reference indices. Accordingly, in this case, to construct the pair of macroblocks 500 of the virtual base layer, the EL encoder 20 commonly uses a motion vector of a corresponding 4×4 block 503 selected for the top 4×4 block 501 as a motion vector of the second 4×4 block 502 of the virtual base layer as shown in FIG. 5b (521).

In the embodiment described with reference to FIGS. 4a to 4f, to construct motion information of the virtual base layer to predict motion information of the current pair of macroblocks, the EL encoder 20 sequentially derives partition modes, reference indices, and motion vectors based on motion information of a corresponding pair of macroblocks of the base layer. However, in the embodiment described with reference to FIGS. 5a and 5b, the EL encoder 20 first derives reference indices and motion vectors of a pair of macroblocks of the virtual base layer based on motion information of a corresponding pair of macroblocks of the base layer and then finally determines partition modes of the pair of macroblocks of the virtual base layer based on the derived values. When partition modes are determined, 4×4 block units with the same derived motion vectors and reference indices are combined and, if the combined block mode is a permitted partition mode, the partition modes are set to the combined mode, otherwise the partition modes are set to those before the combination.

In the embodiment described above, if both of the corresponding pair of macroblocks 410 of the base layer are of intra mode, intra base prediction alone is performed on the current pair of macroblocks 413. In this case, motion prediction is not performed. Of course, a pair of macroblocks of the virtual base layer is not constructed in the case of texture prediction. If only one of the corresponding pair of macroblocks 410 of the base layer is of intra mode, motion information of the inter macroblock is copied to the intra macroblock as shown in FIG. 4b, motion vectors and reference indices of the intra macroblock are set to zero as shown in FIG. 4c, or reference indices of the intra macroblock are set by copying those of the inter macroblock to the intra macroblock and motion vectors of the intra macroblock are set to zero as shown in FIG. 4d. Then, motion information of the pair of macroblocks of the virtual base layer is derived as described above.

After constructing the pair of macroblocks of the virtual base layer for interlayer motion prediction as described above, the EL encoder 20 predicts and codes motion information of the current pair of field macroblocks 413 using motion information of the constructed pair of macroblocks.

Figure 4G:
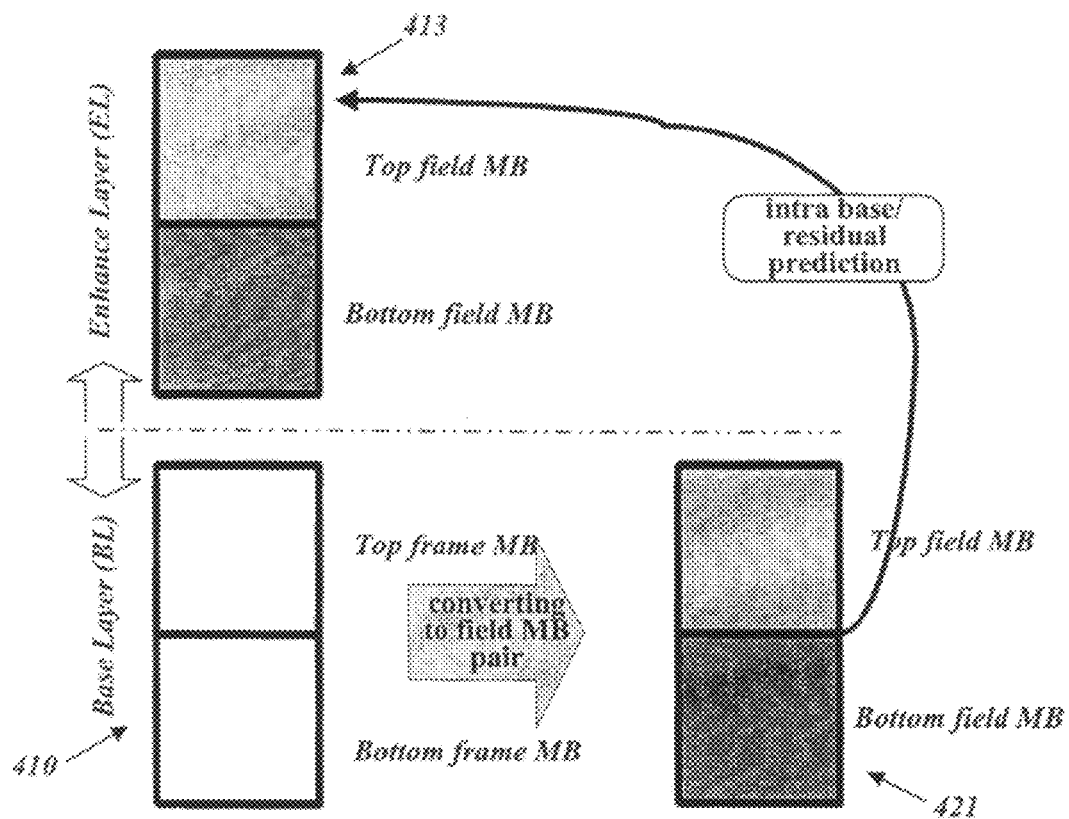
FIG. 4g schematically shows a procedure in which texture information of a pair of macroblocks is used for texture prediction of a pair of field macroblocks in an MBAFF frame according to an embodiment of the present invention.

Interlayer texture prediction will now be described. FIG. 4g illustrates an example interlayer texture prediction method in the case of "frame MB->field MB in MBAFF frame". The EL encoder 20 identifies the block modes of a corresponding pair of frame macroblocks 410 of the base layer. If both of the corresponding pair of frame macroblocks 410 are of either intra or inter mode, the EL encoder 20 converts (or transforms) the corresponding pair of macroblocks 410 of the base layer into a temporary pair of field macroblocks 421 either to perform intra base prediction of the current pair of field macroblocks 413 (when both the frame macroblocks 410 are of intra mode) or to perform its residual prediction in the manner described below (when both the frame macroblocks 410 are of inter mode). When both of the corresponding pair of macroblocks 410 are of intra mode, the temporary pair of field macroblocks 421 include data de-blocked (i.e., filtered for de-blocking) after decoding is completed in the case of intra mode as previously described. The same is true for a temporary pair of macroblocks derived from macroblocks of the base layer for use in texture prediction in the following description of a variety of embodiments.

However, interlayer texture prediction is not performed when only one of the two macroblocks is of inter mode. The pair of macroblocks 410 of the base layer for use in interlayer texture prediction have original image data that has not been encoded (or decoded image data) if the macroblocks are of intra mode and have encoded residual data (or decoded residual data) if the macroblocks are of inter mode. The same is true for a pair of macroblocks of the base layer in the following description of texture prediction.

Figure 4H:
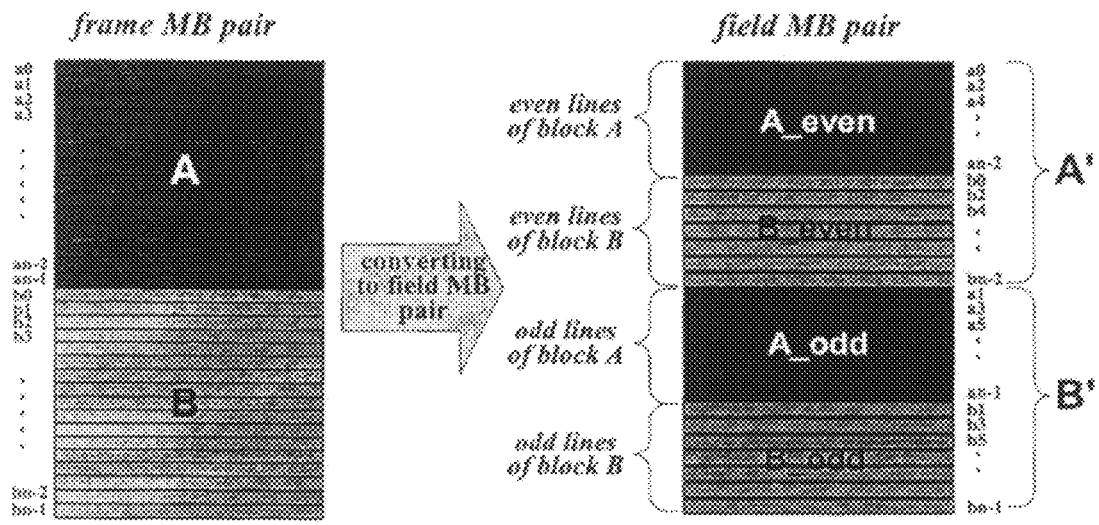
FIG. 4h illustrates a method for transforming a pair of frame macroblocks into a pair of field macroblocks according to an embodiment of the present invention.

FIG. 4h shows a method for converting a pair of frame macroblocks into a pair of field macroblocks to be used for interlayer texture prediction. As shown, even lines of a pair of frame macroblocks A and B are sequentially selected to construct a top field macroblock A' and odd lines of the pair of frame macroblocks A and B are sequentially selected to construct a bottom field macroblock B'. When one field macroblock is filled with lines, it is first filled with even (or odd) lines of the top block A (A_even or A_odd) and is then filled with odd (or even) lines of the bottom block B (B_even or B_odd).

II. The Case of Frame MB->Field MB in Field Picture

In this case, macroblocks in the current layer have been coded into field macroblocks in a field picture and macroblocks in the base layer to be used for interlayer prediction of the macroblocks of the current layer have been coded into frame macroblocks. Video signal components included in a pair of macroblocks in the base layer are the same as those included in a co-located macroblock in an even or odd field in the current layer. First, interlayer motion prediction is described as follows.

Figure 6A:
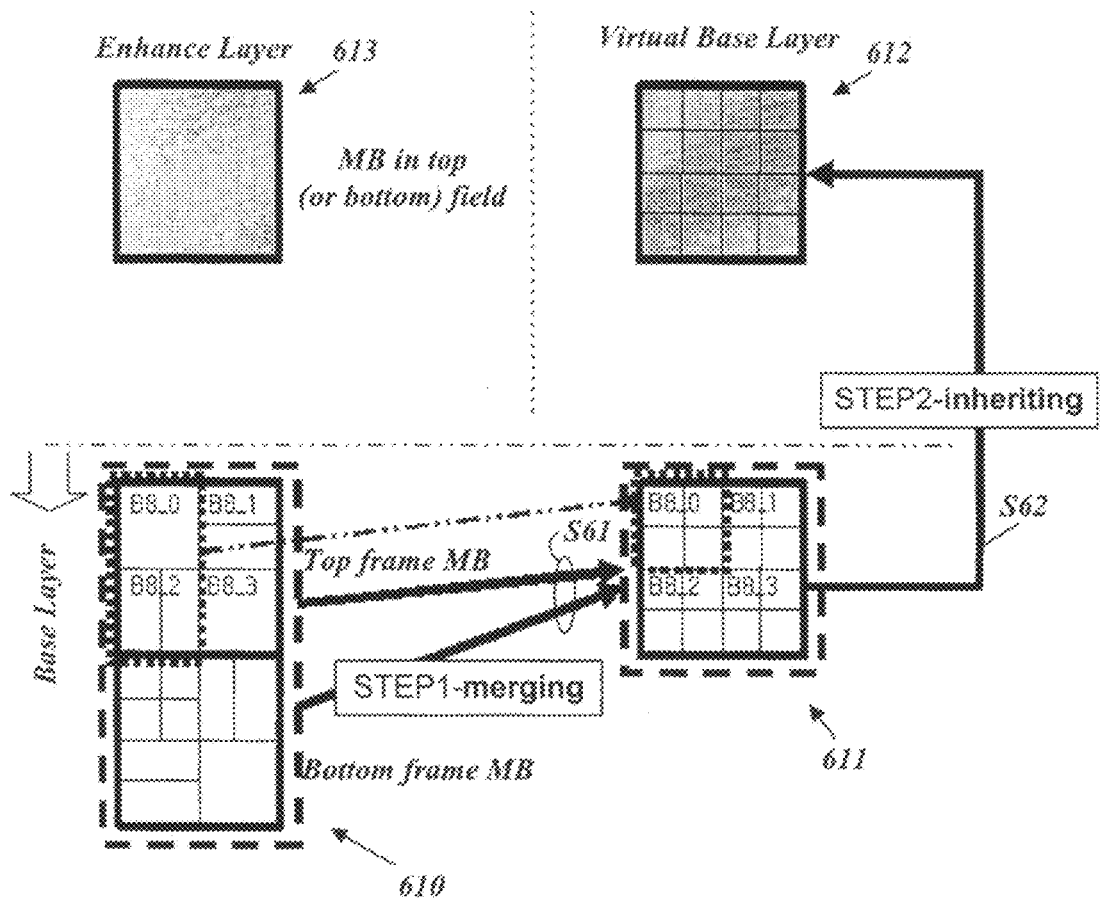
FIGS. 6a to 6c schematically illustrate procedures in which motion information of a field macroblock in a virtual base layer is derived using motion information of a frame macroblock according to an embodiment of the present invention.

The EL encoder 20 uses, as partition modes of an even or odd macroblock of the virtual base layer, macroblock partition modes obtained by merging a pair of macroblocks of the base layer into a single macroblock (through compression to half size in a vertical direction). FIG. 6a illustrates a detailed example of this process. As shown, first, a corresponding pair of macroblocks 610 of the base layer is merged into a single macroblock 611 (S61) and partition modes obtained by this merging are applied to a macroblock of the virtual base layer to be used for interlayer motion prediction of the current macroblock 612 (S62). Merging rules are the same as those of the previous case I. The processing method when at least one of the corresponding pair of macroblocks 610 has been coded in intra mode is the same as that of the previous case I.

Figure 6B:
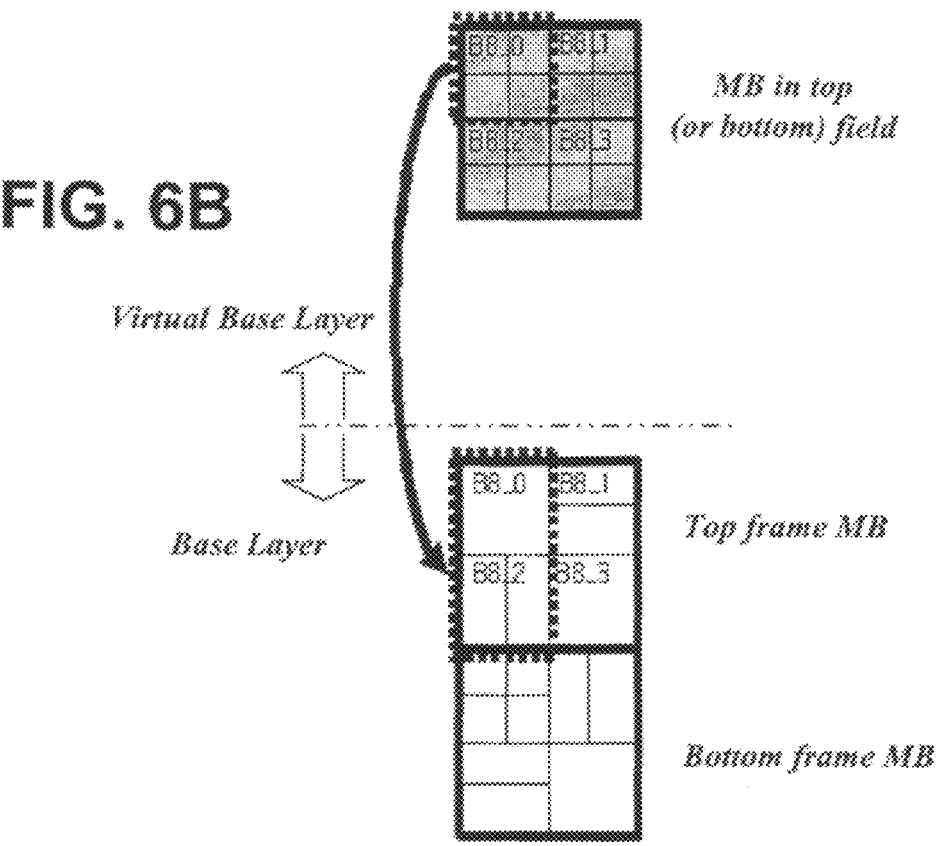
Figure 6C:
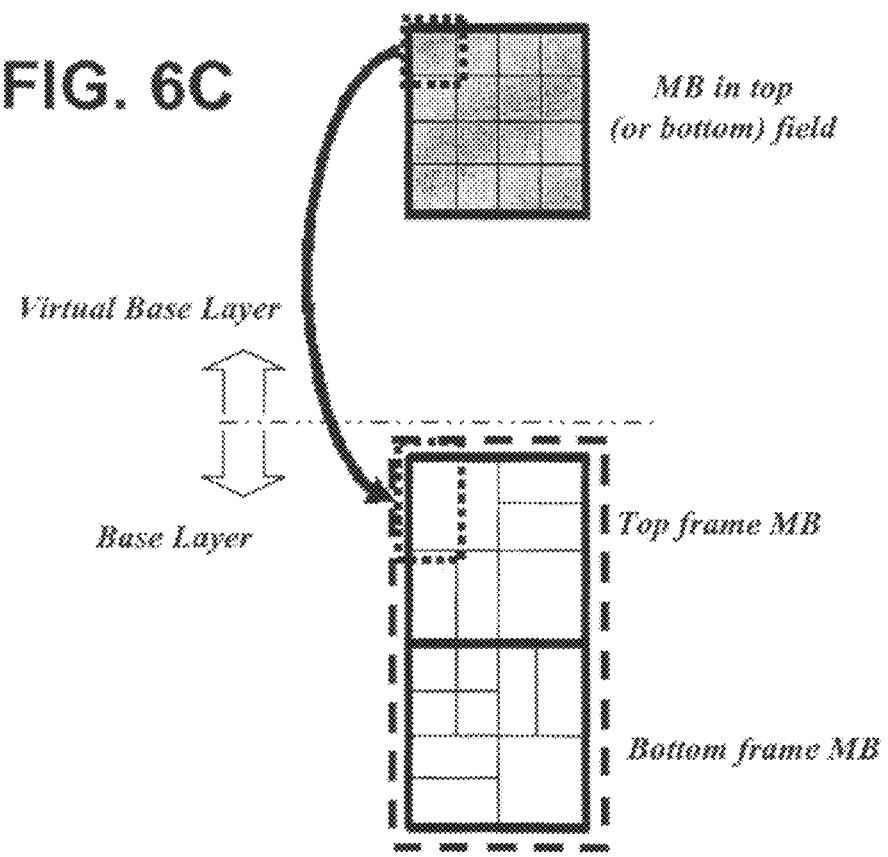

The procedure for deriving reference indices and motion vectors is also performed in the same manner as described above in the previous case I. In the case I, the same derivation procedure is applied to the top and bottom macroblocks since pairs of even and odd macroblocks are carried in one frame. However, this case II is different from the case I in that the derivation procedure is applied to only one field macroblock as shown in FIGS. 6b and 6c since only one macroblock corresponding to the pair of macroblocks 610 of the base layer is present in the current field picture to be coded.

In the above embodiment, to predict motion information of a macroblock of the virtual base layer, the EL encoder 20 sequentially derives partition modes, reference indices, and motion vectors of the macroblock based on motion information of a corresponding pair of macroblocks of the base layer.

Figure 7A:
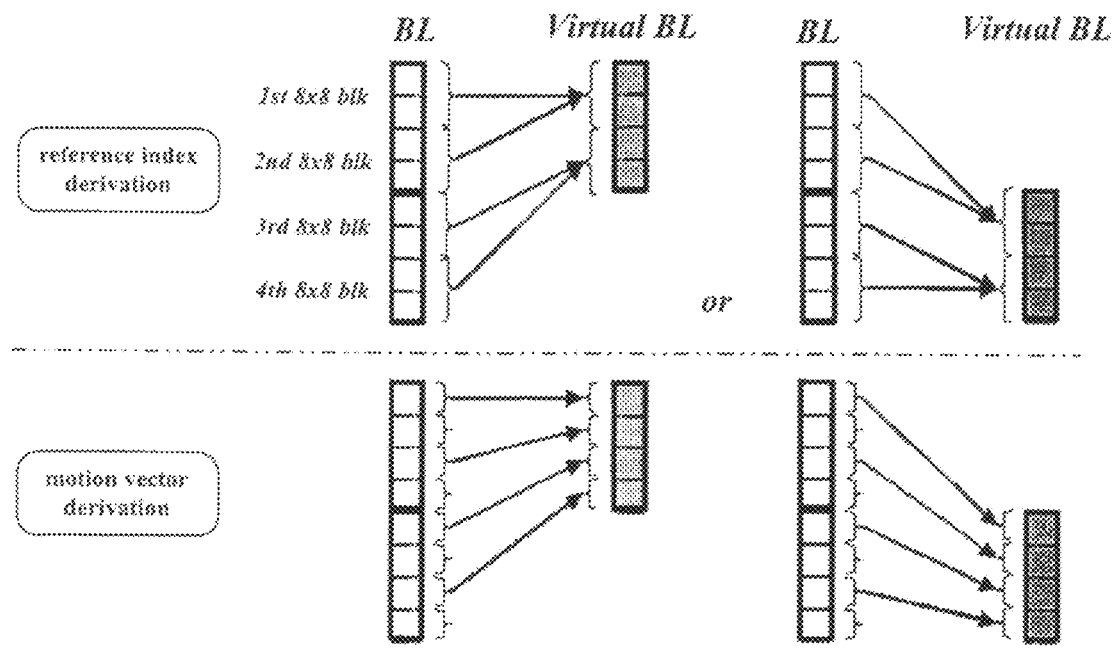
FIGS. 7a and 7b illustrate a reference index and motion information derivation procedure according to another embodiment of the present invention.
Figure 7B:
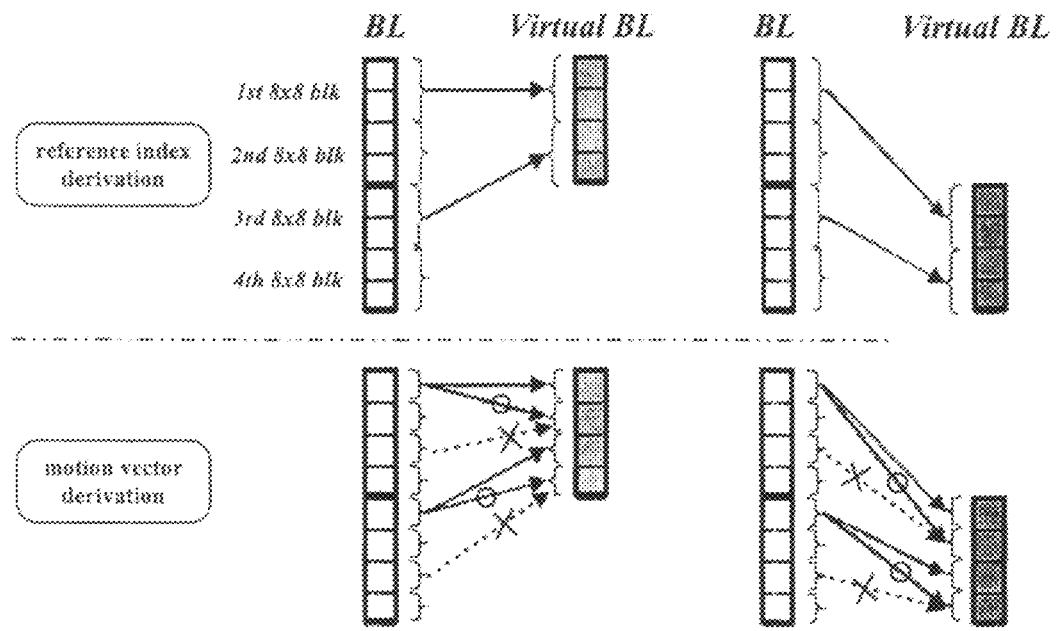

In another embodiment of the present invention, the EL encoder 20 first derives reference indices and motion vectors of a macroblock of the virtual base layer based on motion information of a corresponding pair of macroblocks of the base layer and then finally determines block modes of the macroblock of the virtual base layer based on the derived values. FIGS. 7a and 7b schematically illustrate derivation of reference indices and motion vectors of a field macroblock of the virtual base layer. Operations for the derivation in this case are similar to those of the case I described with reference to FIGS. 5a and 5b, except that motion information of the top or bottom macroblock is derived using motion information of a pair of macroblocks of the base layer.

When partition modes are finally determined, 4×4 block units with the same derived motion vectors and reference indices are combined and, if the combined block mode is a permitted partition mode, the partition modes are set to the combined mode, otherwise the partition modes are set to those before the combination.

In the embodiments described above, if both of the corresponding pair of macroblocks of the base layer are of intra mode, motion prediction is not performed and motion information of the pair of macroblocks of the virtual base layer is also not constructed and, if only one of the two macroblocks is of intra mode, motion prediction is performed as previously described in this case.

Figure 6D:
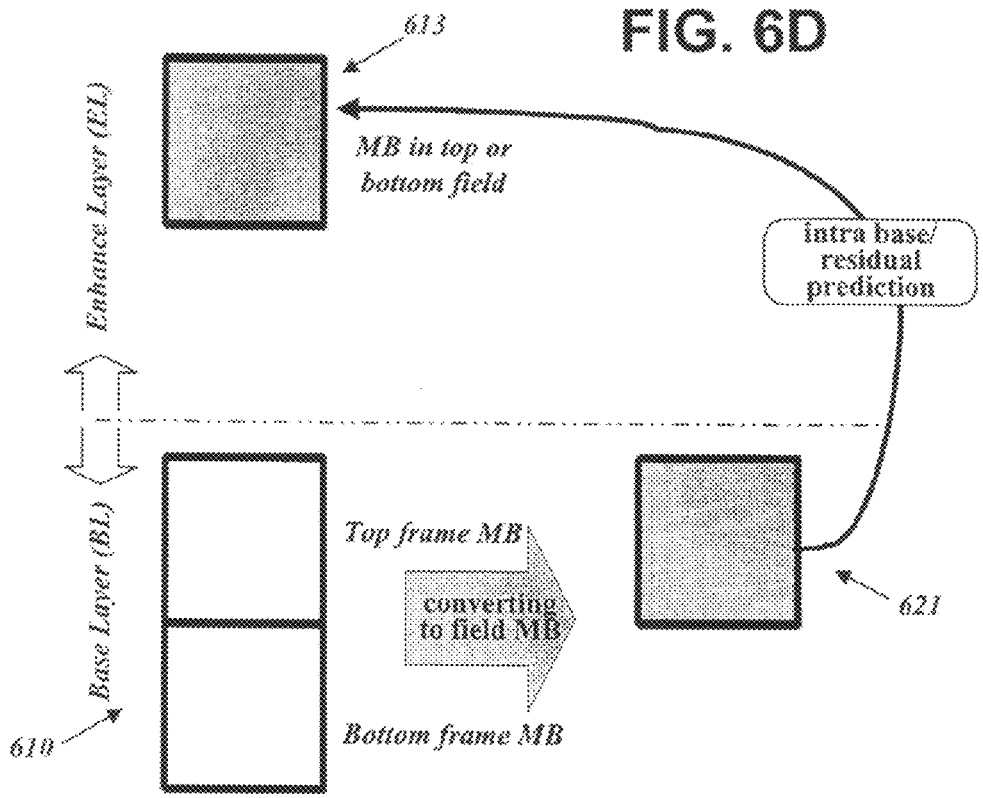
FIG. 6d schematically shows a procedure in which texture information of a pair of frame macroblocks is used in texture prediction of a field macroblock in a field picture according to an embodiment of the present invention.

Interlayer texture prediction will now be described. FIG. 6d illustrates an example interlayer texture prediction method in the case of "frame MB->field MB in field picture". The EL encoder 20 identifies the block modes of a corresponding pair of macroblocks 610 of the base layer. If both of the pair of macroblocks are of either intra or inter mode, the EL encoder 20 constructs a temporary field macroblock 621 from the single pair of frame macroblocks 610. If the current macroblock 613 belongs to an even field picture, the EL encoder 20 constructs the temporary field macroblock 621 from even lines of the corresponding pair of macroblocks 610. If the current macroblock 613 belongs to an odd field picture, the EL encoder 20 constructs the temporary field macroblock 621 from odd lines of the corresponding pair of macroblocks 610. The construction method is similar to the method of constructing the single field macroblock A' or B' in FIG. 4h.

Once the temporary field macroblock 621 is constructed, the EL encoder 20 performs intra base prediction of the current field macroblock 613 (when both of the corresponding pair of macroblocks 610 are of intra mode) based on texture information in the field macroblock 621 or to perform its residual prediction (when both of the corresponding pair of macroblocks 610 are of inter mode).

The EL encoder 20 does not perform interlayer texture prediction if only one of the corresponding pair of macroblocks 610 is of inter mode.

III. The Case of MB in MBAFF Frame->Frame MB

In this case, macroblocks in the current layer have been coded into frame macroblocks and macroblocks in the base layer to be used for interlayer prediction of the frame macroblocks of the current layer have been coded into field macroblocks in an MBAFF frame. Video signal components included in a field macroblock in the base layer are the same as those included in a pair of co-located macroblocks in the current layer. First, interlayer motion prediction is described as follows.

Figure 8A:
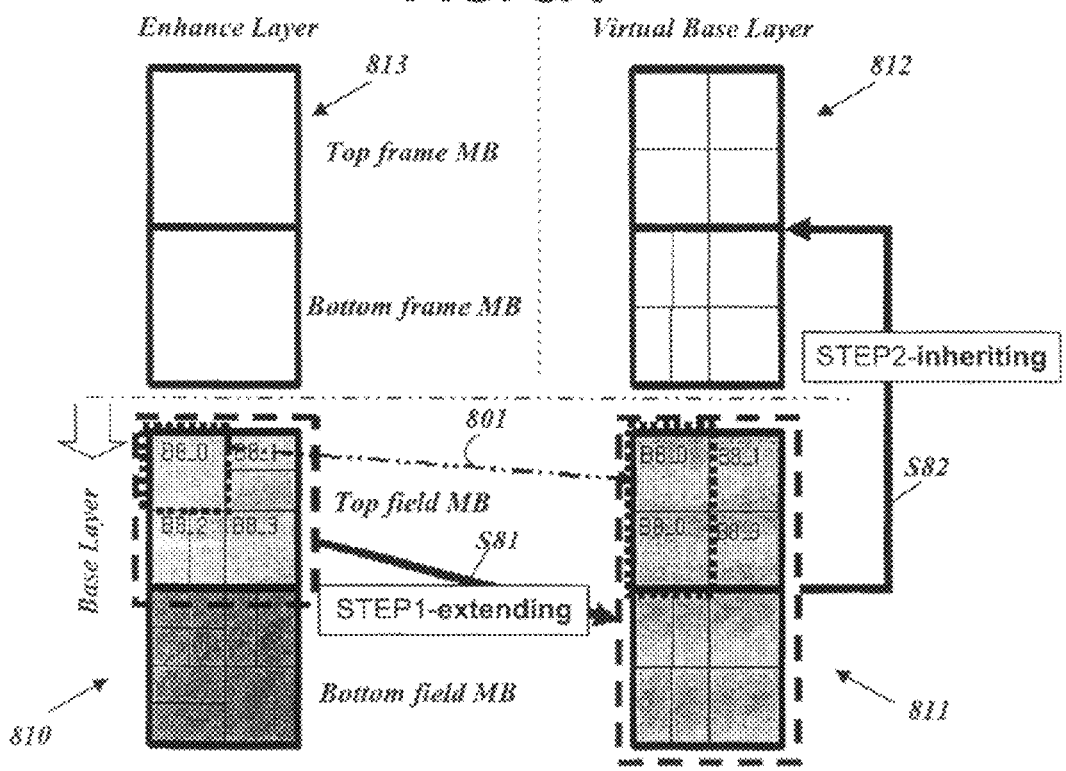
FIGS. 8a to 8c schematically show procedures in which motion information of a field macroblock frame macroblock of a virtual base layer to be used for interlayer motion prediction is derived using motion information of a field macroblock in an MBAFF frame according to an embodiment of the present invention.

The EL encoder 20 uses, as partition modes of a pair of macroblocks in a virtual base layer, macroblock partition modes obtained by extending the top or bottom macroblock of the pair of macroblocks of the base layer (twice in a vertical direction). FIG. 8*a* illustrates a detailed example of this process. Although the top field macroblock is selected in the following description and the drawings, the same as described below is applied when the bottom field macroblock is selected.

As shown in FIG. 8*a*, a top field macroblock in a corresponding pair of macroblocks 810 of the base layer is extended twice to construct two macroblocks 811 (S81) and partition modes obtained through the extension are applied to a pair of macroblocks 812 of the virtual base layer (S82).

However, a partition mode (or pattern) that is not permitted in macroblock partition modes may be generated when the corresponding field macroblock is extended twice in a vertical direction. To prevent this, the EL encoder 20 determines partition modes depending on extended partition modes according to the following rules.

1) 4×4, 8×4, and 16×8 blocks of the base layer after extension are determined to be 4×8, 8×8, and 16×16 blocks obtained by enlarging them twice in a vertical direction.

2) Each of 4×8, 8×8, and 16×16 blocks of the base layer after extension is determined to be two top and bottom blocks of the same size. As illustrated in FIG. 8*a*, an 8×8 block B8_0 of the base layer is determined to be two 8×8 blocks (801). The reason why the 8×8 block B8_0 after extension is not set to an 8×16 block is that its adjacent extended block on the left or right side may not be an 8×16 partition block and no macroblock partition mode is supported in this case.

If one of the corresponding pair of macroblocks 810 has been coded in intra mode, the EL encoder 20 selects the top or bottom field macroblock of inter mode rather than intra mode and performs the above extension process on it to determine partition modes of a pair of macroblocks 812 in the virtual base layer.

If both of the corresponding pair of macroblocks 810 are of intra mode, the EL encoder 20 performs interlayer texture prediction alone without performing the partition mode determination through the above extension process and a reference index and motion vector derivation process described below.

Figure 8B:
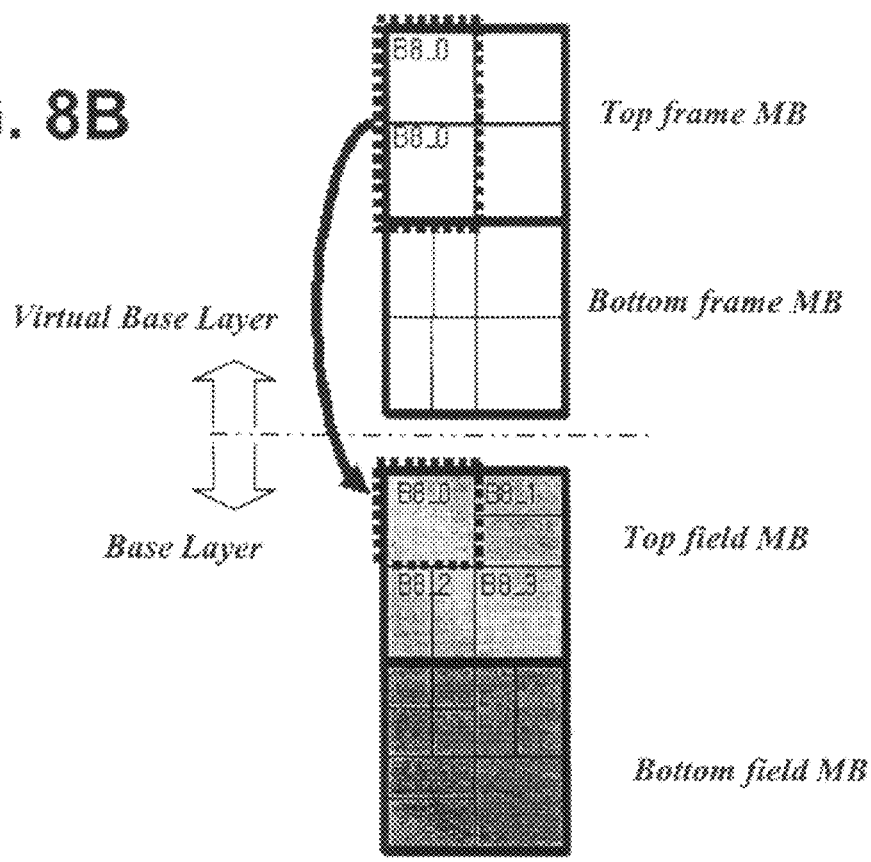

To derive reference indices of the pair of macroblocks of the virtual base layer from reference indices of a corresponding field macroblock, the EL encoder 20 determines the reference index of a corresponding 8×8 block B8_0 of the base layer to be the reference index of each of the two top and bottom 8×8 blocks as illustrated in FIG. 8*b* and divides the determined reference index of each 8×8 block by 2 to obtain its final reference index. The reason for this division is that, for application to a frame sequence, it is necessary to reduce the picture number by half since reference picture numbers of field macroblocks are set based on pictures divided into even and odd fields.

Figure 8C:
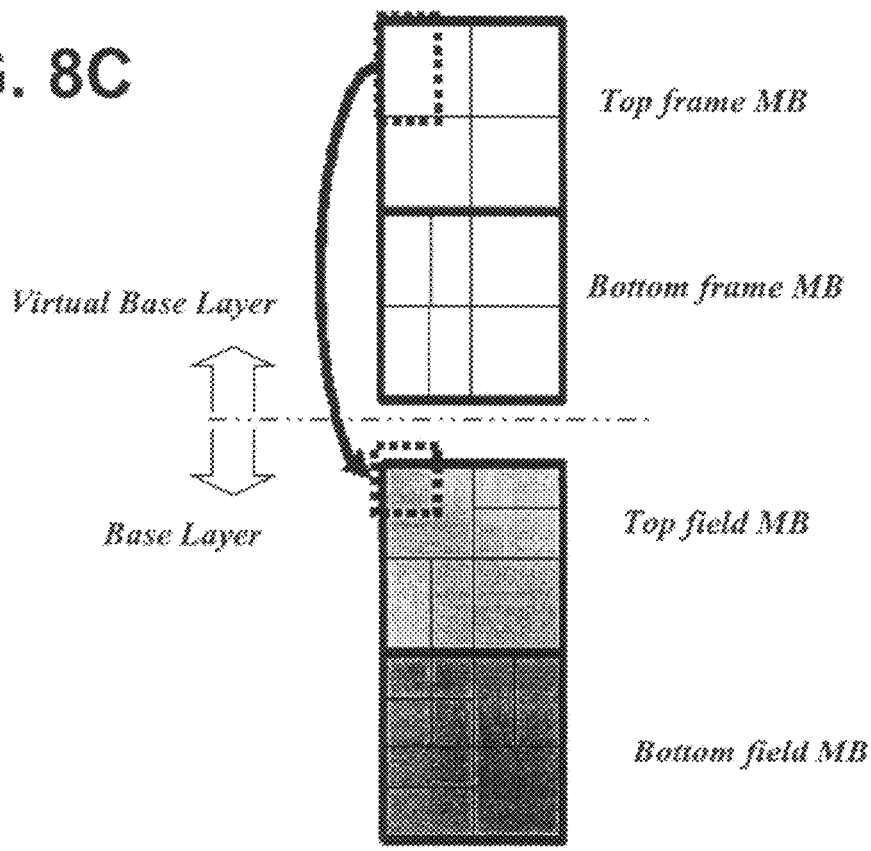

When deriving motion vectors of a pair of frame macroblocks 812 of the virtual base layer, the EL encoder 20 determines the motion vector of a corresponding 4×4 block of the base layer to be the motion vector of a 4×8 block in the pair of macroblocks 812 of the virtual base layer as illustrated in FIG. 8*c* and uses, as a final motion vector, the determined motion vector whose vertical component is multiplied by 2. The reason for this multiplication is that an image component included in one field macroblock corresponds to an image component of two frame macroblocks so that the size of the frame image is increased twice in a vertical direction.

In the embodiment described above, to predict motion information of a pair of macroblocks of the virtual base layer, the EL encoder 20 sequentially derives partition modes, reference indices, and motion vectors of the macroblock based on motion information of a corresponding field macroblock of the base layer.

Figure 9A:
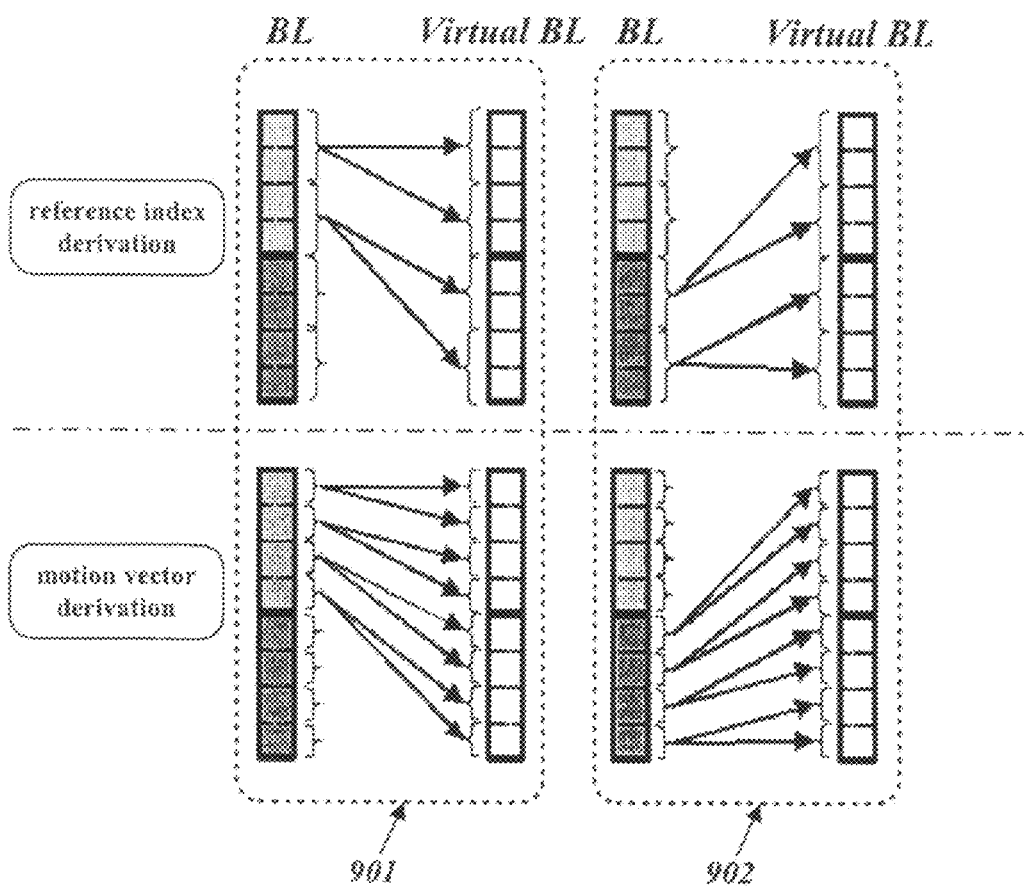
FIGS. 9*a* and 9*b* illustrate reference index and motion information derivation procedures according to another embodiment of the present invention.

In another embodiment of the present invention, when deriving motion information of a pair of macroblocks of the virtual base layer to be used for interlayer prediction of the current pair of macroblocks, the EL encoder 20 first obtains reference indices and motion vectors of the pair of macroblocks of the virtual base layer based on motion information of a corresponding field macroblock of the base layer and then finally determines the block mode of each of the pair of macroblocks of the virtual base layer based on the obtained values as illustrated in FIG. 9*a*. When partition modes are finally determined, 4×4 block units with the same derived motion vectors and reference indices are combined and, if the combined block mode is a permitted partition mode, the partition modes are set to the combined mode, otherwise the partition modes are set to those before the combination.

Figure 9B:
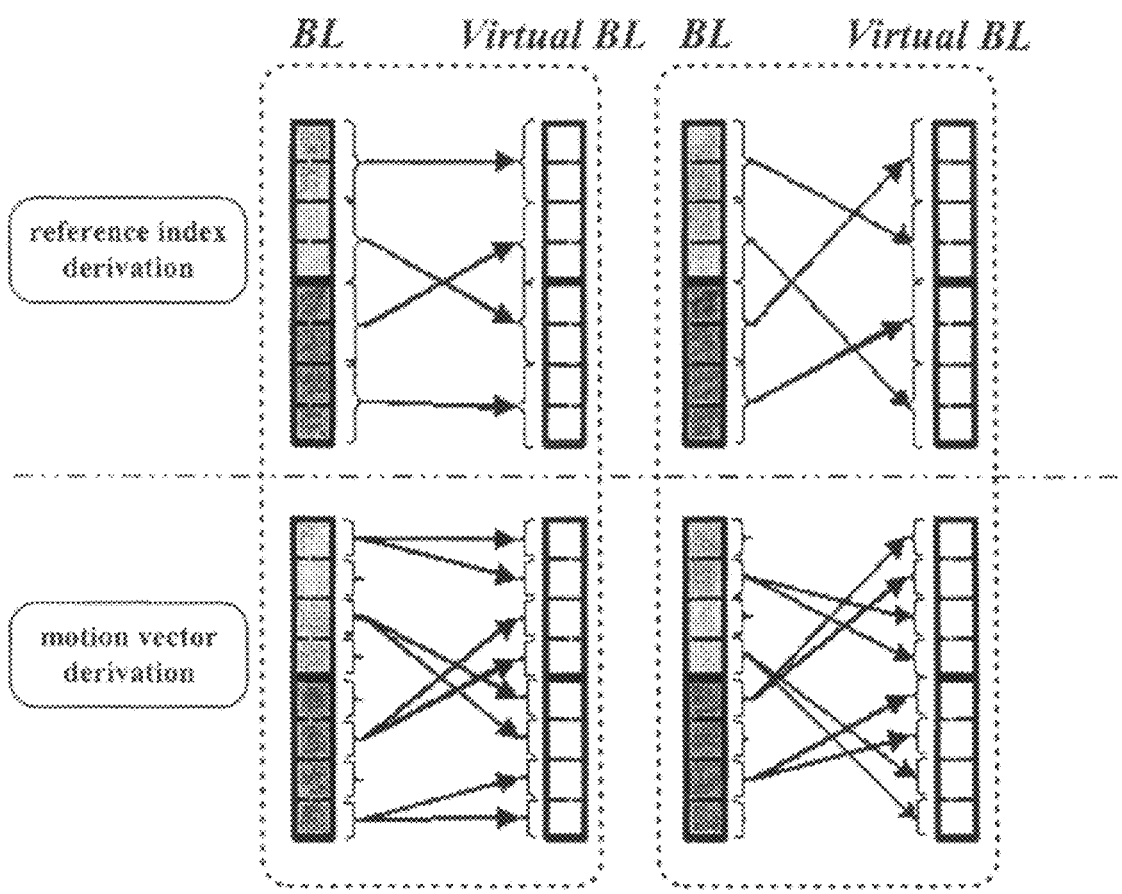

The following is a more detailed description of the embodiment of FIG. 9*a*. As shown, a field macroblock of inter mode of the base layer is selected and motion vectors and reference indices of the selected macroblock are used to derive reference indices and motion vectors of a pair of frame macroblocks of the virtual base layer to be used for motion prediction of the current pair of macroblocks. If both the macroblocks are of inter mode, an arbitrary one of the top and bottom macroblocks is selected (901 or 902) and motion vector and reference index information of the selected macroblock is used. As shown, to derive reference indices, a corresponding value of the top 8×8 block of the selected macroblock is copied to reference indices of the top and bottom 8×8 blocks of the top macroblock of the virtual base layer and a corresponding value of the bottom 8×8 block of the selected macroblock is copied to the reference indices of the top and bottom 8×8 blocks of the bottom macroblock of the virtual base layer. As shown, to derive motion vectors, a corresponding value of each 4×4 block of the selected macroblock is commonly used as the motion vectors of a corresponding pair of vertically-adjacent 4×4 blocks in the pair of macroblocks of the virtual base layer. In another embodiment of the present invention, motion information of the corresponding pair of macroblocks of the base layer may be mixed and used to derive motion vectors and reference indices of the pair of frame macroblocks of the virtual base layer, which is different from the embodiment illustrated in FIG. 9*a*. FIG. 9*b* illustrates a procedure for deriving motion vectors and reference indices according to this embodiment. A detailed description of the copy association of reference indices and motion vectors of sub-blocks (8×8 blocks and 4×4 blocks) in the pair of macroblocks of the virtual base layer is omitted here since it can be understood intuitively from the description of the motion information derivation procedure described above and the drawing of FIG. 9*b*.

However, since motion information of both of the pair of field macroblocks of the base layer is used in the embodiment of FIG. 9*b*, if one of the pair of field macroblocks of the base layer is of intra mode, motion information of the intra-mode macroblock is derived using motion information of the other macroblock which is a macroblock of inter mode. Specifically, motion vector and reference index information of the pair of macroblocks of the virtual base layer may be derived as illustrated in FIG. 9*b* after motion vectors and reference indices of the intra-mode macroblock are constructed by copying corresponding information of the inter-mode macroblock to the intra-mode macroblock as illustrated in FIG. 4b or after the intra-mode macroblock is regarded as an inter-mode macroblock having zero motion vectors and zero reference indices as illustrated in FIG. 4c or after reference indices of the intra-mode macroblock are set by copying those of the inter-mode macroblock to the intra-mode macroblock and motion vectors thereof are set to zero as illustrated in FIG. 4d. Once the motion vector and reference index information of the pair of macroblocks of the virtual base layer is derived, block modes of the pair of macroblocks are determined based on the derived information as previously described.

On the other hand, if both of the corresponding pair of field macroblocks of the base layer are of intra mode, motion prediction is not performed.

Figure 8D:
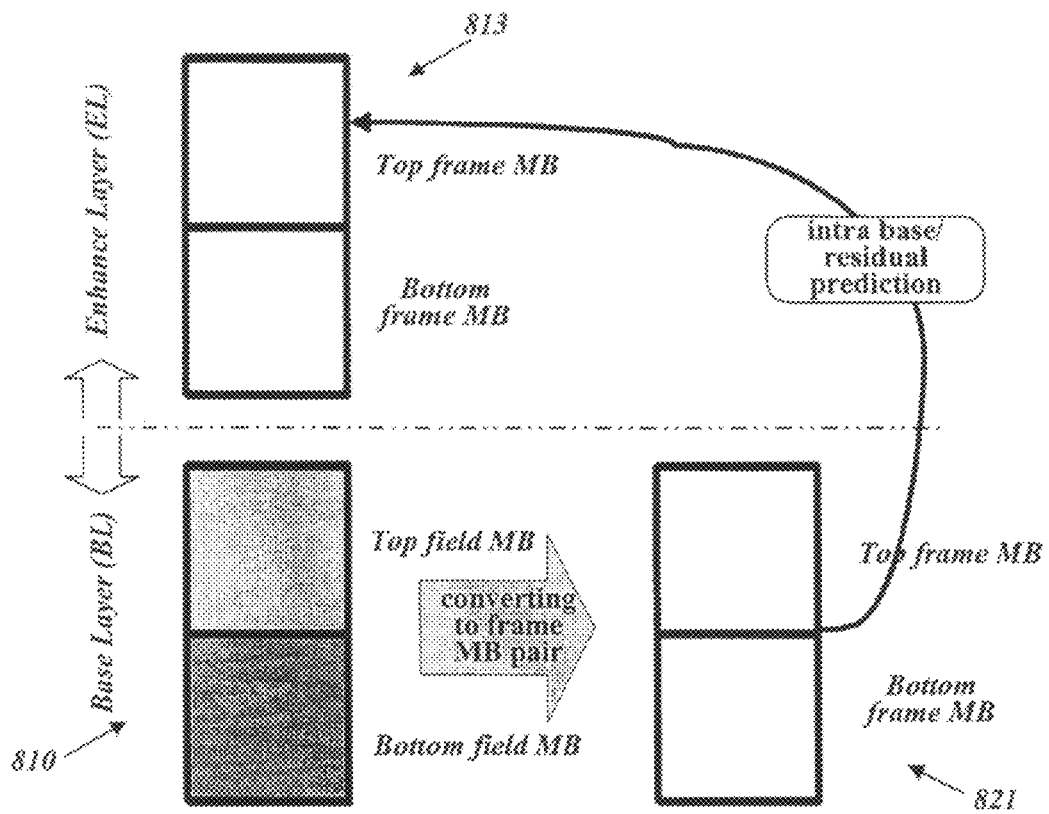
FIG. 8d schematically shows a procedure in which texture information of a pair of field macroblocks in an MBAFF frame is used in texture prediction of a pair of frame macroblocks according to an embodiment of the present invention.

Interlayer texture prediction will now be described. FIG. 8d illustrates an example interlayer texture prediction method in the case of "field MB in MBAFF frame->frame MB". The EL encoder 20 identifies the block modes of a corresponding pair of field macroblocks 810 of the base layer. If both of the corresponding pair of frame macroblocks 810 are of either intra or inter mode, the EL encoder 20 converts the corresponding pair of field macroblocks 810 of the base layer into a temporary pair of frame macroblocks 821 either to perform intra base prediction of the current pair of frame macroblocks 813 (when both the frame macroblocks 810 are of intra mode) or to perform its residual prediction in the manner described below (when both the frame macroblocks 810 are of inter mode). When both of the corresponding pair of macroblocks 810 are of intra mode, the pair of macroblocks 810 include data which has been decoded and a de-blocking filter is applied to the pair of frame macroblocks 821 as previously described.

Figure 8E:
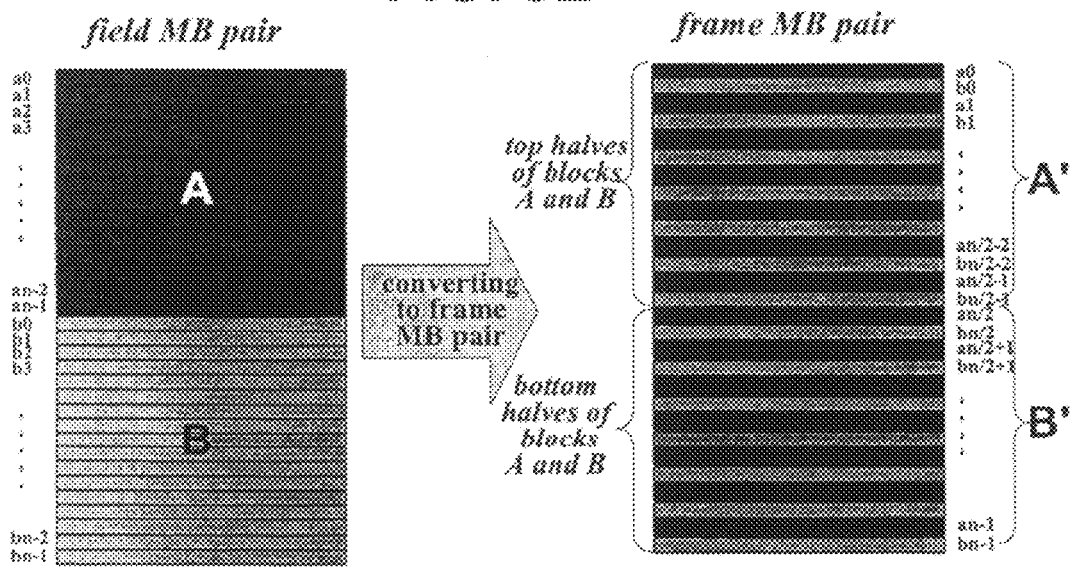
FIG. 8e shows a method for transforming a pair of field macroblocks into a pair of frame macroblocks according to an embodiment of the present invention.

FIG. 8e shows a method for converting a pair of field macroblocks into a pair of frame macroblocks. As shown, lines of a pair of field macroblocks A and B are alternately selected (A->B->A->B->A->, . . . ) sequentially from the top of each of the macroblocks and are then arranged sequentially in the selected order from the top to construct a pair of frame macroblocks A' and B'. As the lines of the pair of field macroblocks are rearranged in this manner, the top frame macroblock A' is constructed from the lines of the top half of the pair of field macroblocks A and B and the bottom frame macroblocks B' is constructed from the lines of the bottom half.

On the other hand, if only one of the corresponding pair of field macroblocks 810 of the base layer is of inter mode, one block is selected from the pair of macroblocks 810 of the base layer according to block modes of the current pair of frame macroblock 813 and the selected block is used for interlayer texture prediction. Alternatively, before determining block modes of the current pair of frame macroblocks 813, each method described below may be applied to perform interlayer prediction and the block modes of the pair of macroblocks 813 may then be determined.

Figure 8F:
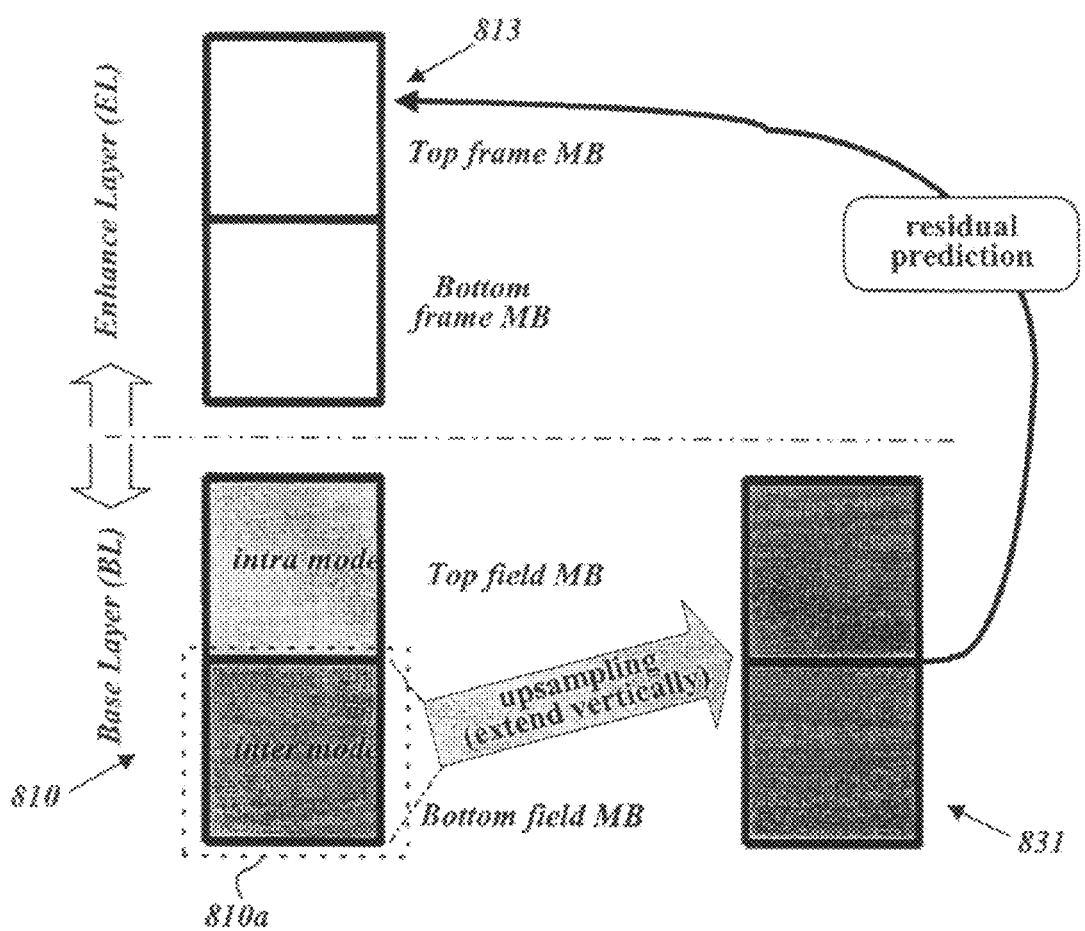
FIGS. 8*f* and 8*g* schematically show procedures in which texture information of a pair of field macroblocks in an MBAFF frame is used in interlayer prediction of a pair of frame macroblocks when only one of the pair of field macroblocks is of inter mode according to an embodiment of the present invention.
Figure 8G:
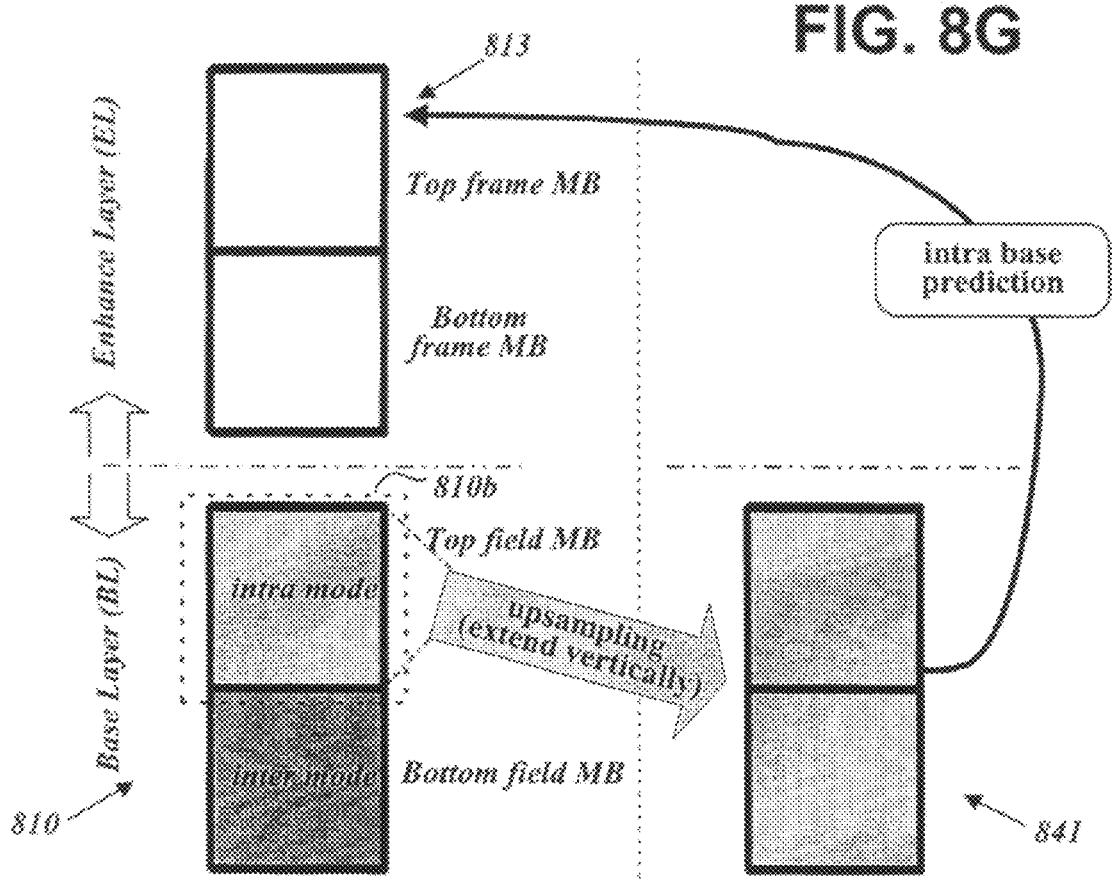

FIGS. 8f and 8g illustrate examples in which one block is selected to perform interlayer prediction. In the case where the current pair of frame macroblocks 813 is coded in inter mode (or where its inter-mode prediction is performed), as shown in FIG. 8f, an inter-mode block 810a is selected from a pair of field macroblocks 810 of the base layer and the selected block is upsampled in a vertical direction to create two corresponding macroblocks 831. The two macroblocks 831 are then used for residual prediction of the current pair of frame macroblocks 813. In the case where the current pair of frame macroblocks 813 is not coded in inter mode (or where its intra-mode prediction is performed), as shown in FIG. 8g, an intra-mode block 810b is selected from the pair of field macroblocks 810 of the base layer and the selected block is upsampled in a vertical direction to create two corresponding macroblocks 841. After a de-blocking filer is applied to the two macroblocks 841, the two macroblocks 841 are used for intra base prediction of the current pair of frame macroblocks 813.

The method illustrated in FIGS. 8f and 8g, in which one block is selected and upsampled to create a pair of macroblocks to be used for interlayer texture prediction, can also be applied when the layers have different picture rates. When the picture rate of the enhanced layer is higher than that of the base layer, some pictures of a picture sequence of the enhanced layer may have no temporally corresponding picture in the base layer. Interlayer texture prediction of a pair of frame macroblocks included in a picture of the enhanced layer, which has no temporally corresponding picture in the base layer, may be performed using one of a pair of spatially co-located field macroblocks in a temporally previous picture in the base layer.

FIG. 8h is an example of this method in the case where the picture rate of the enhanced layer is twice that of the base layer.

As illustrated, the picture rate of the enhanced layer is twice that of the base layer. Therefore, one of every two pictures of the enhanced layer such as a picture with a picture order count (POC) of "n2" has no picture with the same picture order count (POC) in the base layer. Here, the same POC indicates the temporal coincidence.

When there is no temporally coincident picture in the base layer (for example when the current POC is n2), a bottom field macroblock 802 included in a pair of spatially co-located field macroblocks in a previous picture (i.e., a picture with a POC lower than the current POC by 1) is upsampled vertically to create a temporary pair of macroblocks 852 (S82) and the temporary pair of macroblocks 852 are then used to perform interlayer texture prediction of the current pair of macroblocks 815. When there is a temporally coincident picture in the base layer (for example when the current POC is n1), a top field macroblock 801 included in a pair of spatially co-located field macroblocks in the temporally coincident picture is upsampled vertically to create a temporary pair of macroblocks 851 (S81) and the temporary pair of macroblocks 851 are then used to perform interlayer texture prediction of the current pair of macroblocks 814. When a pair of macroblocks decoded from an intra-mode macroblock is included in the temporary pairs of macroblocks 851 or 852 created through the upsampling, the pair of macroblocks is used for interlayer texture prediction after a de-blocking filter is applied to the pair of macroblocks.

In another embodiment of the present invention, when there is a temporally coincident picture in the base layer (when the current POC is n1 in the example of FIG. 8h), a pair of frame macroblocks may be created from a pair of field macroblocks according to the embodiment illustrated in FIG. 8d, rather than using the method illustrated in FIG. 8h, and then may be used for interlayer texture prediction. In addition, when the current picture has no temporally coincident picture in the base layer (when the current POC is n2 in the example of FIG. 8h), interlayer texture prediction may be performed as in FIG. 8h or alternatively interlayer texture prediction may not be performed on macroblocks in the current picture.

Accordingly, an embodiment of the present invention allocates a flag 'field_base_flag' to indicate whether interlayer texture prediction has been performed according to the method illustrated in FIG. 8d or according to the method illustrated in FIG. 8h and incorporates the flag into coding information. For example, this flag is set to '0' when texture prediction has been performed according to the method as in FIG. 8d and is set to '1' when texture prediction has been performed according to the method as in FIG. 8h. This flag is defined in a sequence parameter set in the enhanced layer, a sequence parameter in a scalable extension, a picture parameter set, a picture parameter set in a scalable extension, a slice header, a slice header in a scalable extension, a macroblock layer, or a macroblock layer in a scalable extension to be transmitted to a decoder.

IV. The Case of Field MB in Field Picture->Frame MB

In this case, macroblocks in the current layer (EL) have been coded into frame macroblocks and macroblocks in the base layer (BL) to be used for interlayer prediction of the frame macroblocks of the current layer have been coded into field macroblocks in a field picture. Video signal components included in a field macroblock in the base layer are the same as those included in a pair of co-located macroblocks in the current layer. First, interlayer motion prediction is described as follows.

Figure 10A:
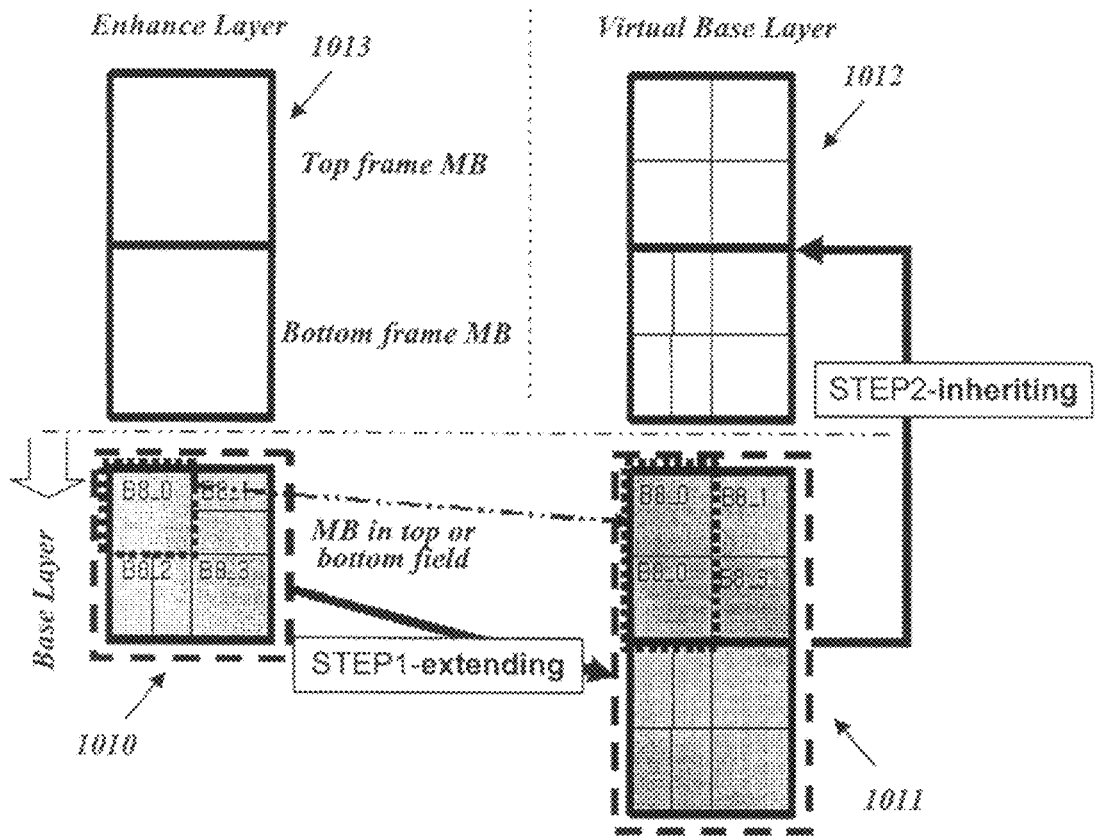
FIG. 10*a* to 10*c* schematically show procedures in which motion information of a frame macroblock of a virtual base layer to be used for interlayer motion prediction is derived using motion information of a field macroblock in a field picture according to an embodiment of the present invention.

The EL encoder 20 uses, as partition modes of a macroblock in a virtual base layer, partition modes obtained by extending a macroblock in an even or odd field of the base layer (twice in a vertical direction). FIG. 10a illustrates a detailed example of this process. The procedure illustrated in FIG. 10a is different from that of the case III, where the top or bottom field macroblock in an MBAFF frame is selected, in that a spatially co-located field macroblock 1010 in an even or odd field is naturally used and is similar to that of the case III in that the co-located field macroblock 1010 is extended and partition modes of two macroblocks (1011) obtained through the extension are applied to a pair of macroblocks 1012 of the virtual base layer. A partition mode (or pattern) that is not permitted in macroblock partition modes may be generated when the corresponding field macroblock 1010 is extended twice in a vertical direction. To prevent this, the EL encoder 20 determines partition modes depending on extended partition modes according to the same rules as the rules 1) and 2) suggested in the case III.

If the corresponding macroblock has been coded in intra mode, the EL encoder 20 performs interlayer texture prediction alone without performing the partition mode determination through the above extension process and a reference index and motion vector derivation process described below. That is, the EL encoder 20 does not perform interlayer motion prediction.

Figure 10B:
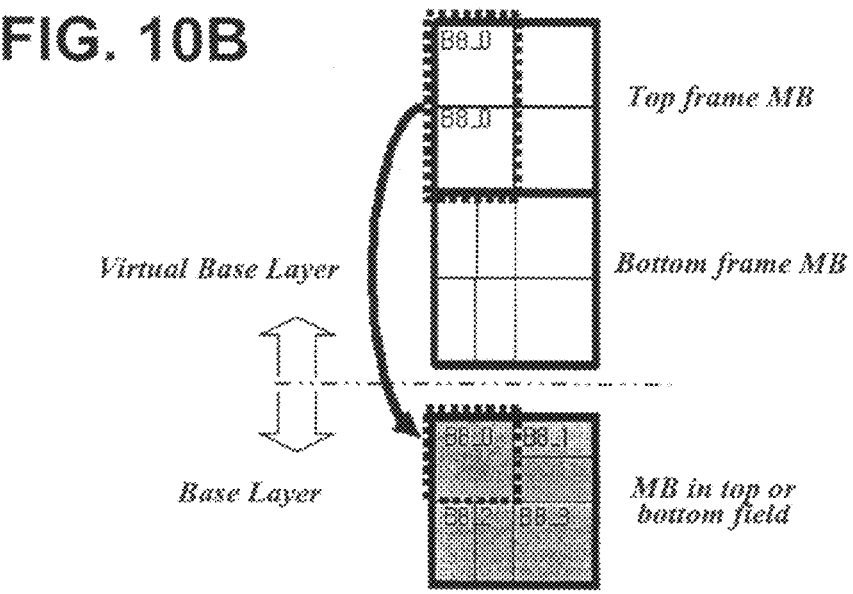
Figure 10C:
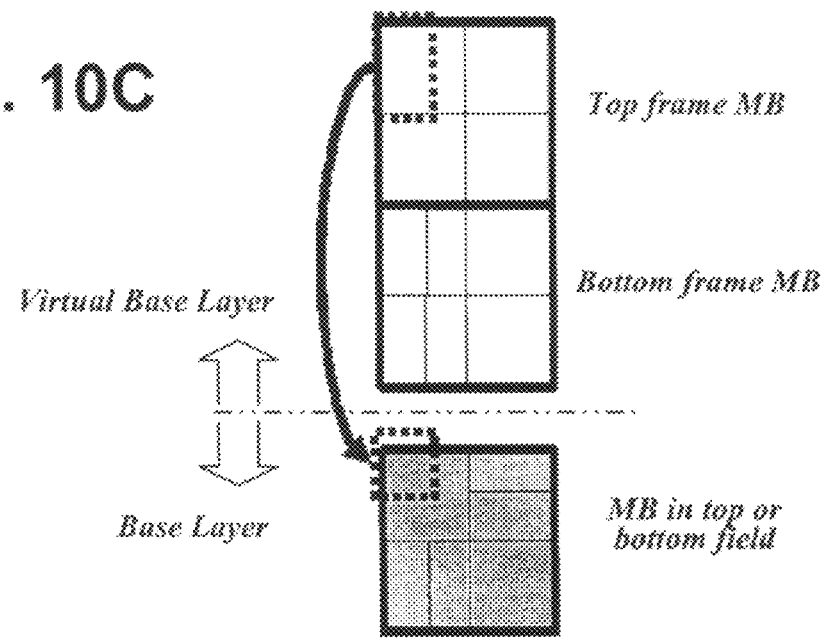
Figure 10D:
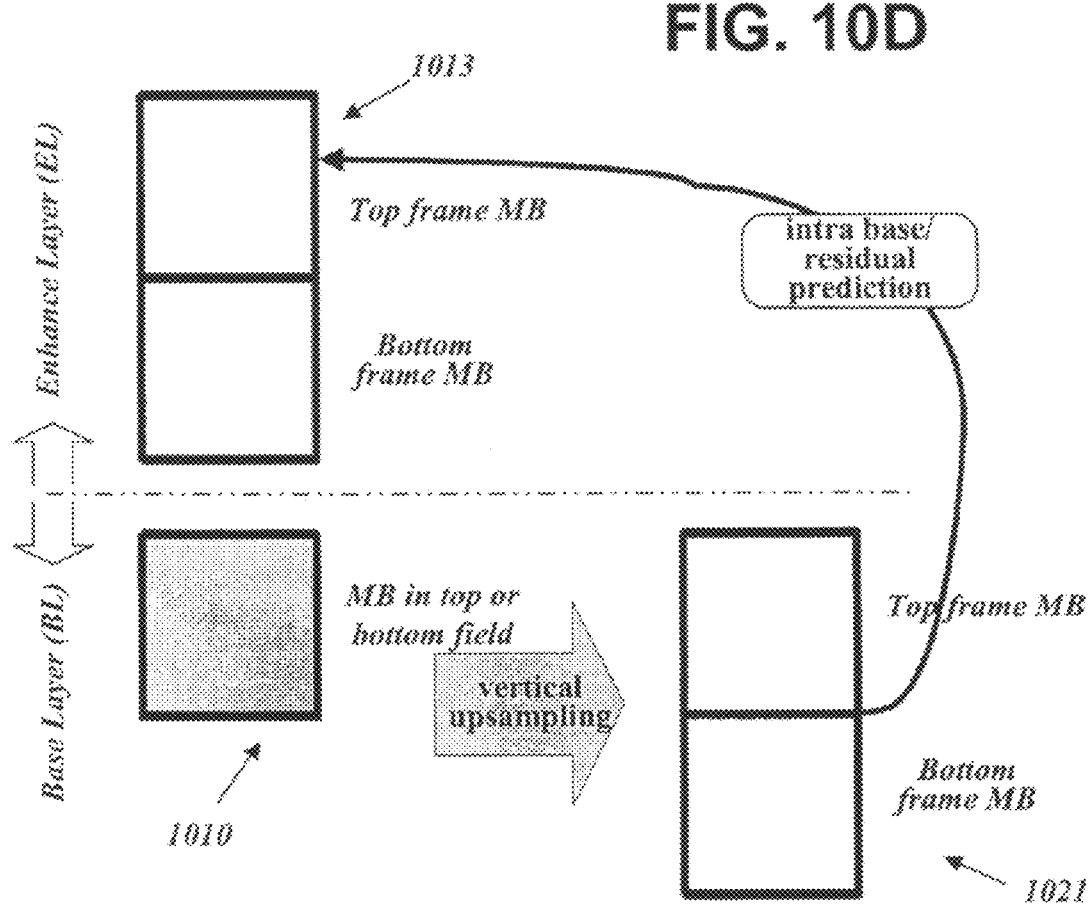
FIG. 10*d* schematically shows a procedure in which texture information of a field macroblock in a field picture is used in texture prediction of a pair of frame macroblocks according to an embodiment of the present invention.

The reference index and motion vector derivation procedure is also similar to that described in the previous case III. However, this case IV is different from the case III in the following aspect. In the case III, since corresponding base layer macroblocks are carried in pairs of even and odd macroblocks in a frame, one of the top and bottom macroblocks is selected and applied to the derivation procedure. In this case IV, since only one macroblock which corresponds to the current macroblock to be coded is present in the base layer, motion information of a pair of macroblocks 1012 of the virtual base layer is derived from motion information of a corresponding field macroblock without the macroblock selection procedure as shown in FIGS. 10b and 10c and the derived motion information is used for interlayer motion prediction of the current pair of macroblocks 1013.

Figure 11:
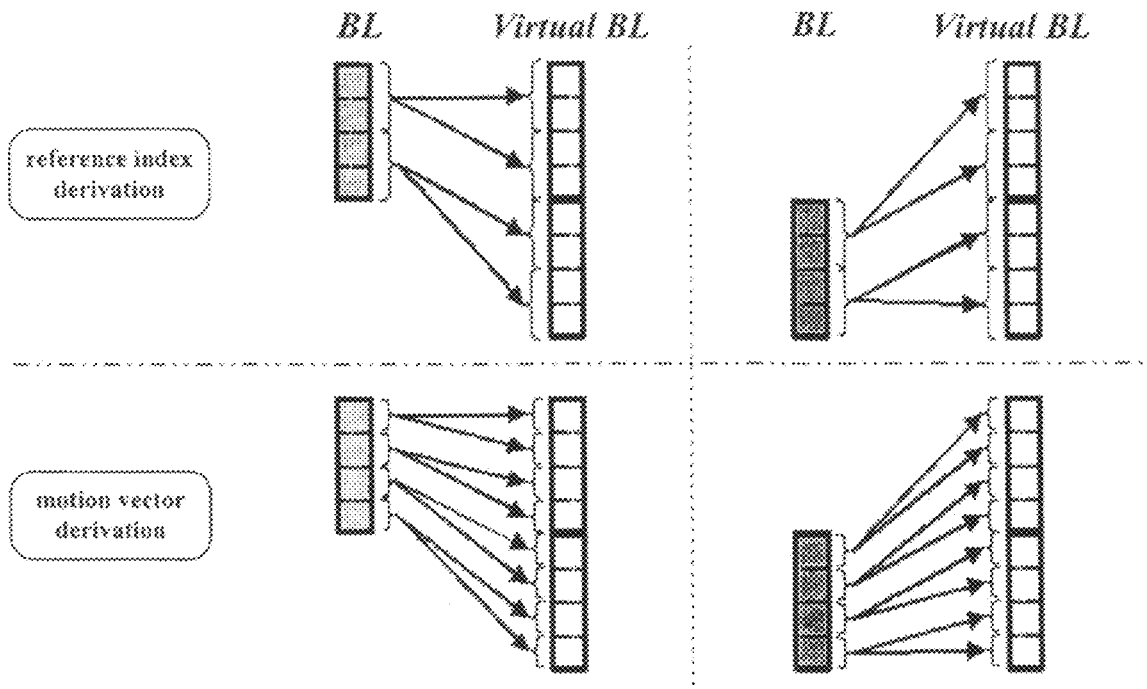
FIG. 11 illustrates a reference index and motion information derivation procedure according to another embodiment of the present invention.

FIG. 11 schematically illustrates derivation of reference indices and motion vectors of a pair of macroblocks of the virtual base layer according to another embodiment of the present invention. In this case, motion information of a pair of macroblocks of the virtual base layer is derived from motion information of an even or odd field macroblock of the base layer, which is different from the case described above with reference to FIG. 9a. The same derivation operations as those of the case of FIG. 9a are applied in this case. However, the process of mixing and using motion information of the pair of macroblocks in the case illustrated in FIG. 9b is not applied in this case IV since there is no pair of top and bottom macroblocks in a corresponding field of the base layer.

In the embodiment described with reference to FIGS. 10a to 10c, to predict motion information of the pair of macroblocks of the virtual base layer, the EL encoder 20 sequentially derives partition modes, reference indices, and motion vectors based on motion information of a corresponding field macroblock of the base layer. However, in another embodiment of FIG. 11, the EL encoder 20 first derives reference indices and motion vectors of a pair of macroblocks of the virtual base layer based on motion information of a corresponding pair of macroblocks of the base layer and then finally determines partition modes of the pair of macroblocks of the virtual base layer based on the derived values. When partition modes are determined, 4×4 block units with the same derived motion vectors and reference indices are combined and, if the combined block mode is a permitted partition mode, the partition modes are set to the combined mode, otherwise the partition modes are set to those before the combination.

When texture prediction is performed in the embodiments described above, if the corresponding field macroblock of the base layer is of intra mode, intra base predictive coding is performed on the current macroblock. If the corresponding field macroblock is of inter mode and if the current macroblock has been coded in inter mode, interlayer residual predictive coding is performed. Here, of course, the field macroblock for use in prediction is used for texture prediction after it is upsampled in a vertical direction.

Figure 12A:
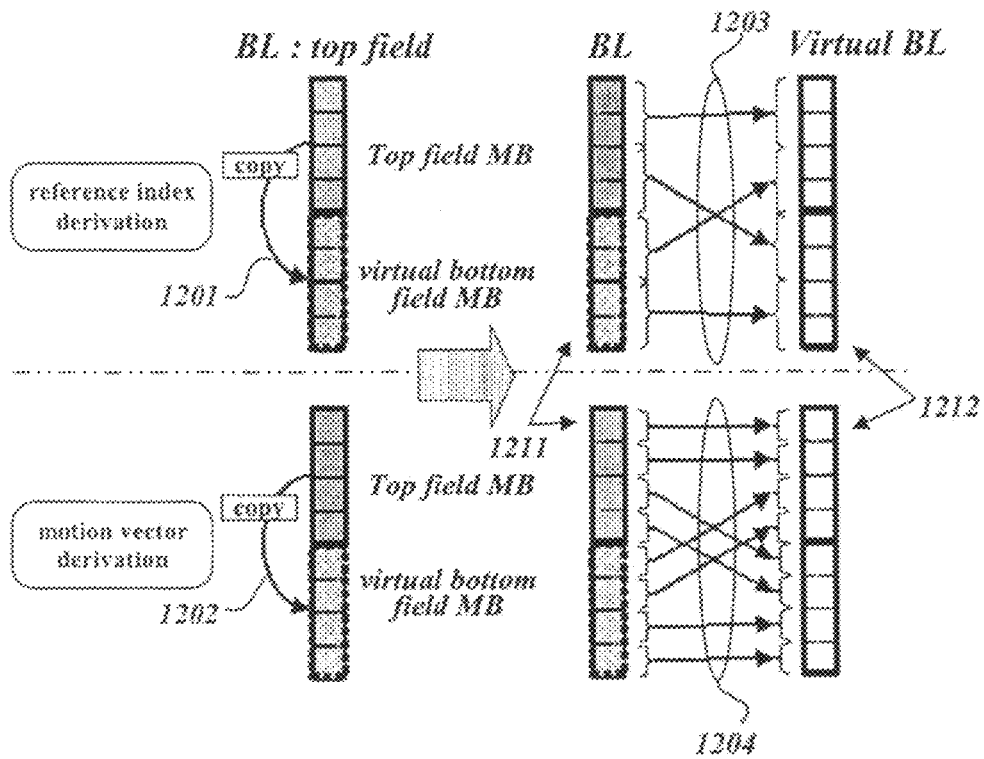
FIGS. 12*a* and 12*b* schematically show procedures in which motion information of a frame macroblock of a virtual base layer to be used for interlayer motion prediction is derived using motion information of a field macroblock in a field picture according to another embodiment of the present invention.
Figure 12B:
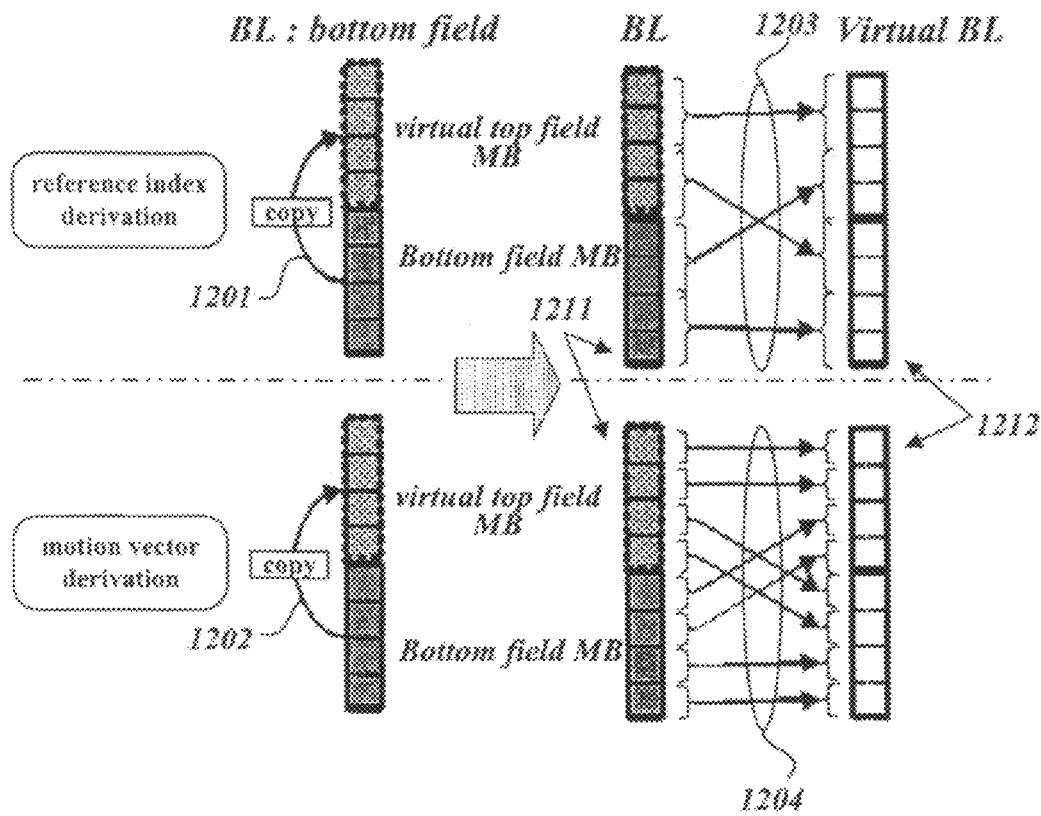

In another embodiment of the present invention, a virtual macroblock is created from a field macroblock included in an odd or even field to construct a pair of macroblocks and then motion information of a pair of macroblocks of the virtual base layer is derived from the constructed pair of macroblocks. FIGS. 12a and 12b illustrate examples of this embodiment.

In this embodiment, reference indices and motion vectors of a corresponding even (or odd) field macroblock of the base layer are copied (1201 and 1202) to create a virtual odd (or even) field macroblock to construct a pair of macroblocks 1211 and motion information of the constructed pair of macroblocks 1211 is mixed to derive motion information of a pair of macroblocks 1212 of the virtual base layer (1203 and 1204). In an example method of mixing and using the motion information, as illustrated in FIGS. 12a and 12b, reference indices of the top 8×8 block of the corresponding top macroblock are applied to the top 8×8 block of the top macroblock of the pair of macroblocks 1212 of the virtual base layer, reference indices of the bottom 8×8 block are applied to the top 8×8 block of the bottom macroblock, reference indices of the top 8×8 block of the corresponding bottom macroblock are applied to the bottom 8×8 block of the top macroblock of the pair of macroblocks 1212 of the virtual base layer, and reference indices of the bottom 8×8 block are applied to the bottom 8×8 block of the bottom macroblock (1203). Motion vectors are applied according to the reference indices (1204). A description of this process is omitted here since it can be understood intuitively from FIGS. 12a and 12b.

In the embodiment illustrated in FIGS. 12a and 12b, partition modes of the pair of macroblocks 1212 of the virtual base layer are determined based on the derived reference indices and motion vectors using the same method as described above.

Interlayer texture prediction will now be described. FIG. 10b illustrates an example interlayer texture prediction method for this case of "field MB in field picture->frame MB". The EL encoder 20 first upsamples a corresponding field macroblock 1010 of the base layer to create two temporary macroblocks 1021. If the corresponding field macroblock 1010 is of intra mode, the EL encoder 20 applies a de-blocking filter to the two created temporary macroblocks 1021 and then performs intra base prediction of the current pair of frame macroblocks 1013 based on the two temporary macroblocks 1021. If the corresponding field macroblock 1010 is of inter mode, the EL encoder 20 performs residual prediction of the current pair of frame macroblocks 1013 based on the two created temporary macroblocks 1021.

V. The Case of Field MB->Field MB

This case is subdivided into the following four cases since field macroblocks are divided into field macroblocks included in a field picture and field macroblocks included in an MBAFF frame.

i) The Case Where the Base and Enhanced Layers are MBAFF Frames

Figure 13A:
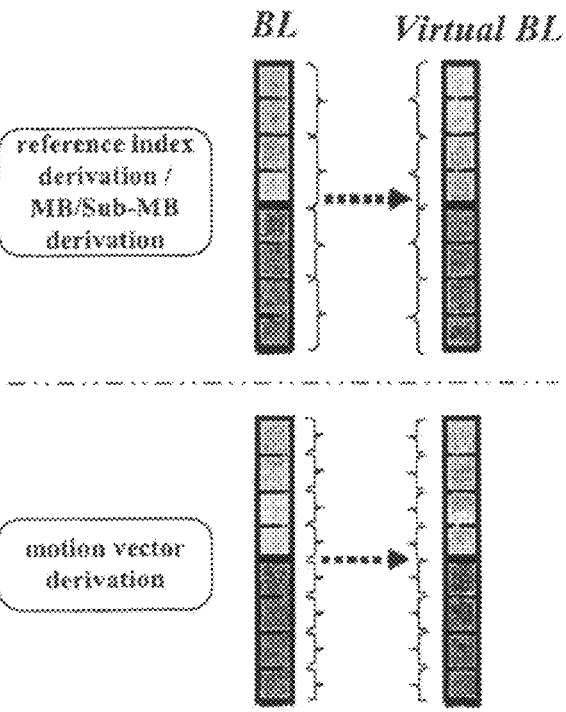
FIGS. 13*a* to 13*d* schematically show, separately according to the types of pictures, procedures in which motion information of a field macroblock of a virtual base layer to be used for interlayer motion prediction is derived using motion information of a field macroblock according to an embodiment of the present invention.

This case is shown in FIG. 13a. As shown, motion information (partition modes, reference indices, and motion vectors) of a corresponding pair of macroblocks of the base layer is used as motion information of a pair of macroblocks of a virtual base layer by directly copying the motion information of the corresponding pair of macroblocks to the pair of macroblocks of the virtual base layer. Here, the motion information is copied between macroblocks of the same parity. Specifically, motion information of even field macroblocks is copied to even field macroblocks and motion information of odd field macroblocks is copied to odd field macroblocks to construct the macroblock of the virtual layer, which is used for motion prediction of the macroblock of the current layer.

Figure 13B:
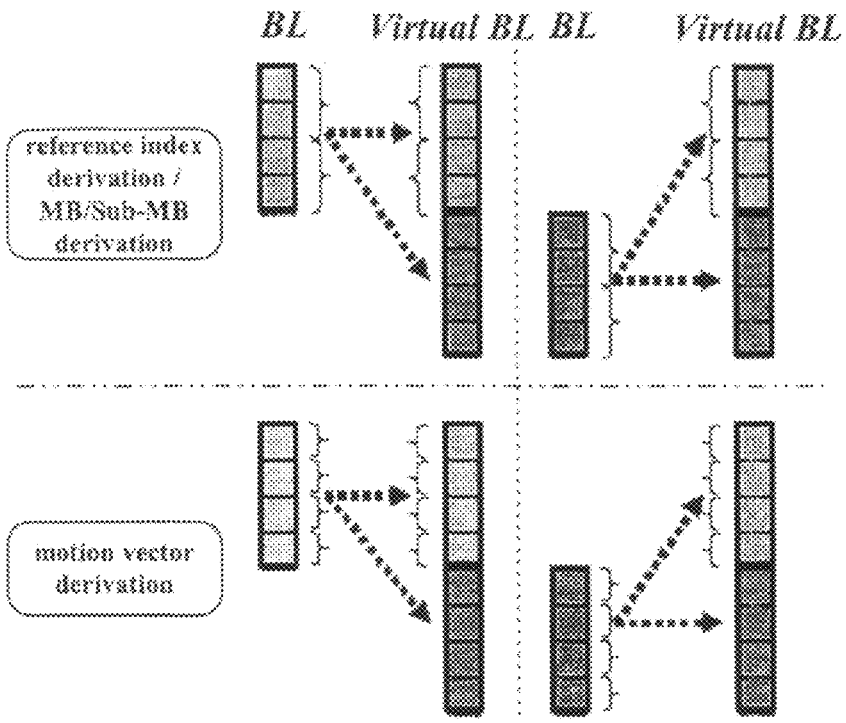

A known method of interlayer texture prediction between frame macroblocks is applied when texture prediction is performed.

ii) The Case Where the Base Layer Includes Field Pictures and the Enhanced Layer Includes MBAFF Frames This case is shown in FIG. 13b. As shown, motion information (partition modes, reference indices, and motion vectors) of a corresponding field macroblock of the base layer is used as motion information of each of a pair of macroblocks of a virtual base layer by directly copying the motion information of the corresponding field macroblock to each of the pair of macroblocks. Here, the same-parity copy rule is not applied since motion information of a single field macroblock is used for both the top and bottom field macroblocks.

Figure 13C:
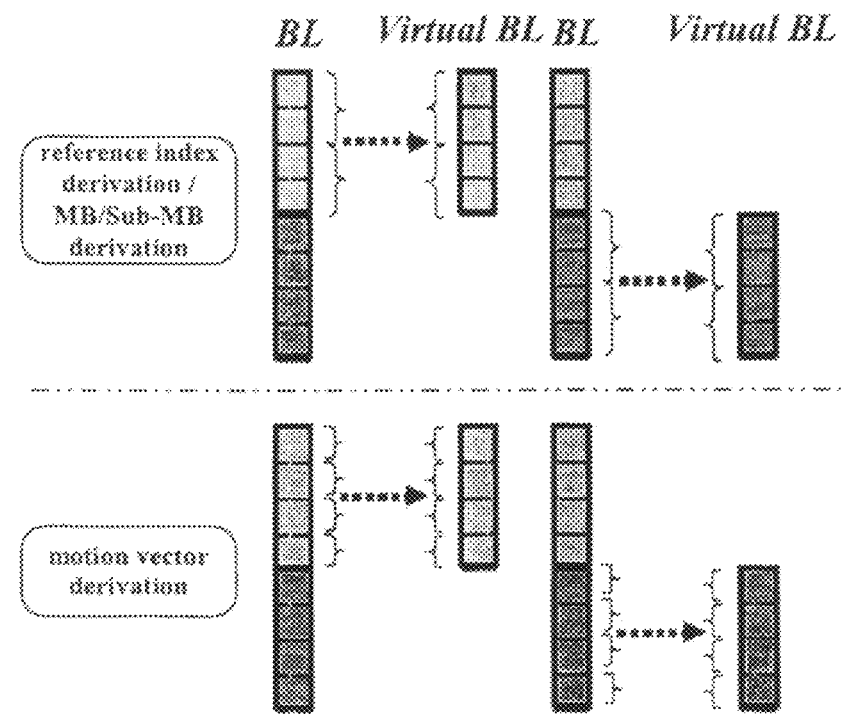

When texture prediction is performed, intra base prediction is applied (when the corresponding block of the base layer is of intra mode) or residual prediction (when the corresponding block of the base layer is of inter mode) is applied between macroblocks of the enhanced and base layers having the same (even or odd) field attributes.

iii) The Case Where the Base Layer Includes MBAFF Frames and the Enhanced Layer Includes Field Pictures This case is shown in FIG. 13c. As shown, a field macroblock of the same parity is selected from a pair of macroblocks of the base layer corresponding to the current field macroblock and motion information (partition modes, reference indices, and motion vectors) of the selected field macroblock is used as motion information of a field macroblock of a virtual base layer by directly copying the motion information of the selected field macroblock to the field macroblock of the virtual base layer.

When texture prediction is performed, intra base prediction is applied (when the corresponding block of the base layer is of intra mode) or residual prediction (when the corresponding block of the base layer is of inter mode) is applied between macroblocks of the enhanced and base layers having the same (even or odd) field attributes.

iv) The Case Where the Base and Enhanced Layers are Field Pictures

Figure 13D:
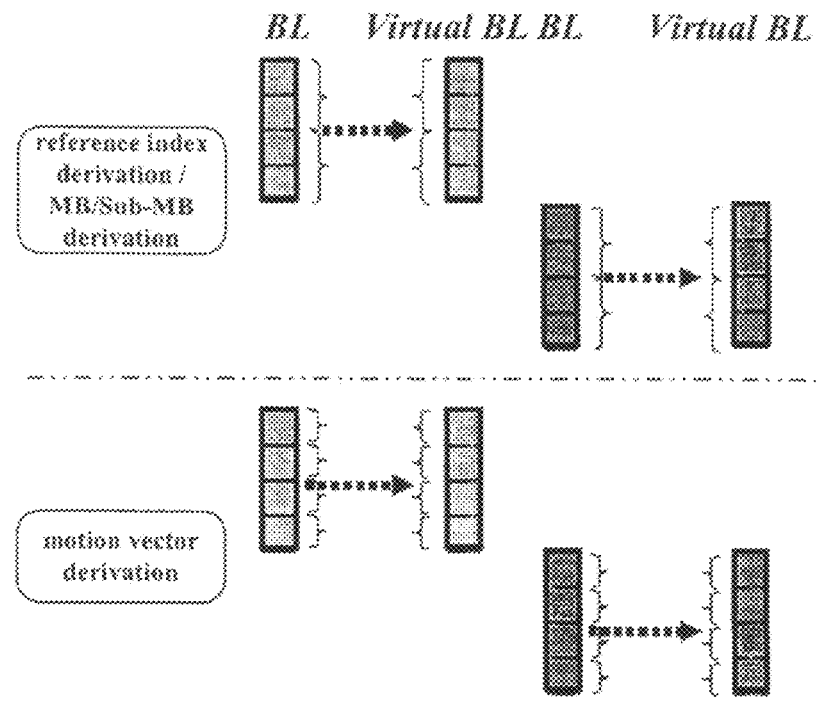

This case is shown in FIG. 13d. As shown, motion information (partition modes, reference indices, and motion vectors) of a corresponding field macroblock of the base layer is used as motion information of a field macroblock of a virtual base layer by directly copying the motion information of the corresponding field macroblock to the field macroblock of the virtual base layer. Also in this case, the motion information is copied between macroblocks of the same parity.

A known method of interlayer texture prediction between frame macroblocks is applied when texture prediction is performed.

The above description of interlayer prediction has been given for the case where the base and enhanced layers have the same resolution. The following description will be given of how the type of a picture (a progressive frame, an MBAFF frame, or an interlaced field) of each layer and/or the type of a macroblock in a picture are identified when the resolution of the enhanced layer is higher than that of the base layer (i.e., when SpatialScalabilityType( ) is higher than zero) and an interlayer prediction method is applied according to the identified types. First, interlayer motion prediction is described.

M_A). Base Layer (Progressive Frame)->Enhanced Layer (MBAFF Frame)

Figure 14A:
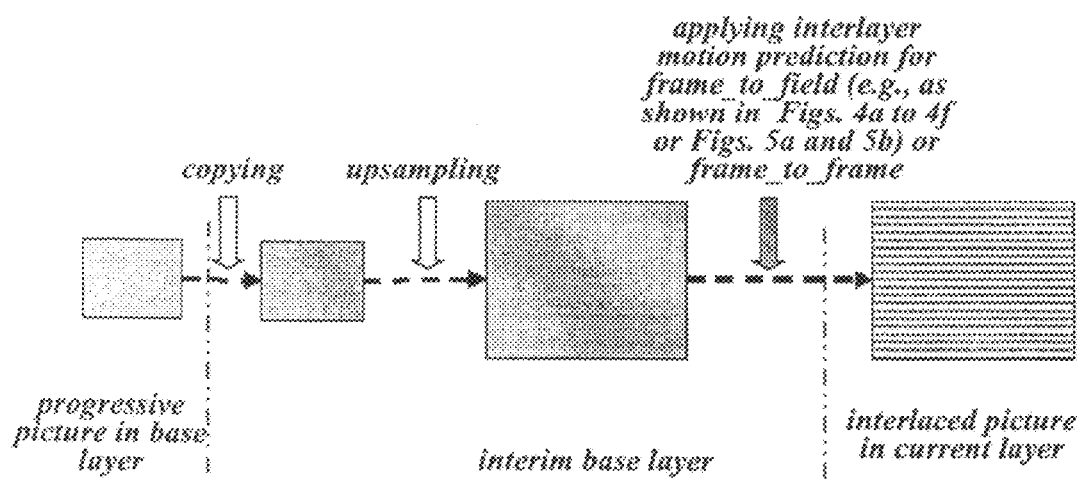
FIGS. 14*a* to 14*k* show, separately according to the types of pictures, methods for performing interlayer motion prediction when spatial resolutions of the layers are different according a variety of embodiments of the present invention.

FIG. 14a illustrates a processing method for this case. As shown, first, motion information of all macroblocks of a corresponding frame in the base layer is copied to create a virtual frame. Upsampling is then performed. In this upsampling, interpolation is performed using texture information of the picture of the base layer at an interpolation rate which allows the resolution (or picture size) of the picture to be equal to that of the current layer. In addition, motion information of each macroblock of the picture enlarged by the interpolation is constructed based on motion information of each macroblock of the virtual frame. One of a number of known methods is used for this construction. Pictures of an interim base layer constructed in this manner have the same resolution as pictures of the current (enhanced) layer. Accordingly, the above-described interlayer motion prediction can be applied in this case.

In this case (FIG. 14a), macroblocks in pictures in the base and current layers are frame macroblocks and field macroblocks in an MBAFF frame since the base layer includes frames and the current layer includes MBAFF frames. Accordingly, the method of the case I described above is applied to perform interlayer motion prediction. However, not only a pair of field macroblocks but also a pair of frame macroblocks may be included in the same MBAFF frame as described above. Accordingly, a known method for motion prediction between frame macroblocks (frame-to-frame prediction method), which includes simple copying of motion information, is applied when the type of a pair of macroblocks of the current layer corresponding to the pair of macroblocks in the picture of the interim base layer has been identified as the type of frame macroblocks rather than the type of field macroblocks.

M_B). Base Layer (Progressive Frame)->Enhanced Layer (Interlaced Field)

Figure 14B:
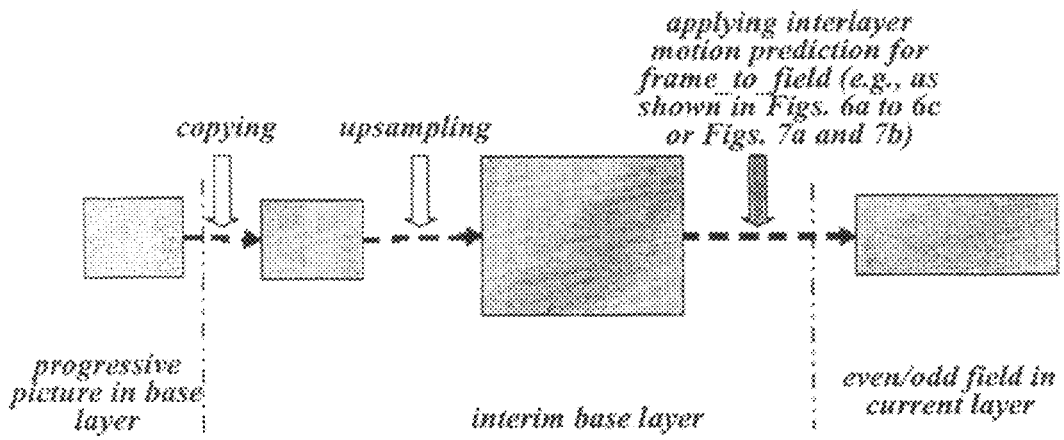

FIG. 14b illustrates a processing method for this case. As shown, first, motion information of all macroblocks of a corresponding frame in the base layer is copied to create a virtual frame. Upsampling is then performed. In this upsampling, interpolation is performed using texture information of the picture of the base layer at an interpolation rate which allows the resolution of the picture to be equal to that of the current layer. In addition, motion information of each macroblock of the picture enlarged by the interpolation is constructed based on motion information of each macroblock of the created virtual frame.

The method of the case II described above is applied to perform interlayer motion prediction since each macroblock of the picture of the interim base layer constructed in this manner is a frame macroblock and each macroblock of the current layer is a field macroblock in a field picture.

M_C). Base Layer (MBAFF Frame)->Enhanced Layer (Progressive Frame)

Figure 14C:
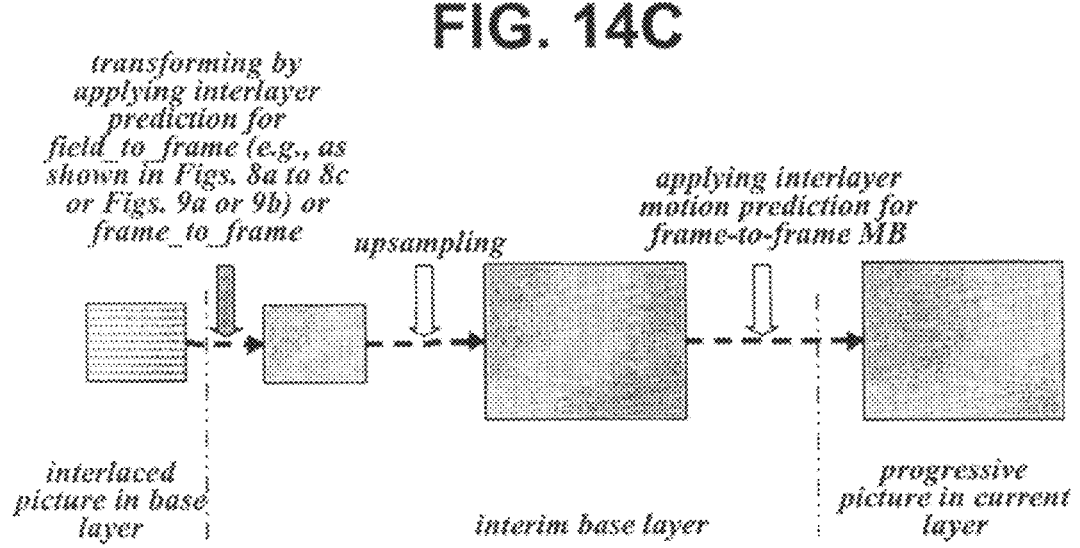

FIG. 14c illustrates a processing method for this case. As shown, first, a corresponding MBAFF frame of the base layer is transformed into a progressive frame. The method of the case III described above is applied for transformation of pairs of field macroblocks of the MBAFF frame into the progressive frame and the known frame-to-frame prediction method is applied for transformation of pairs of frame macroblocks of the MBAFF frame. Of course, when the method of the case III is applied in this case, a virtual frame and motion information of each macroblock of the frame are created using data obtained through interlayer prediction without performing the operation for coding the difference between predicted data and data of the layer to be actually coded.

Once the virtual frame is obtained, upsampling is performed on the virtual frame. In this upsampling, interpolation is performed at an interpolation rate which allows the resolution of the base layer to be equal to that of the current layer. In addition, motion information of each macroblock of the enlarged picture is constructed based on motion information of each macroblock of the virtual frame using one of a number of known methods. Here, the known frame macroblock-to-macroblock interlayer motion prediction method is performed since each macroblock of the picture of the interim base layer constructed in this manner is a frame macroblock and each macroblock of the current layer is a frame macroblock.

M_D). Base Layer (Interlaced Field)->Enhanced Layer (Progressive Frame)

Figure 14D:
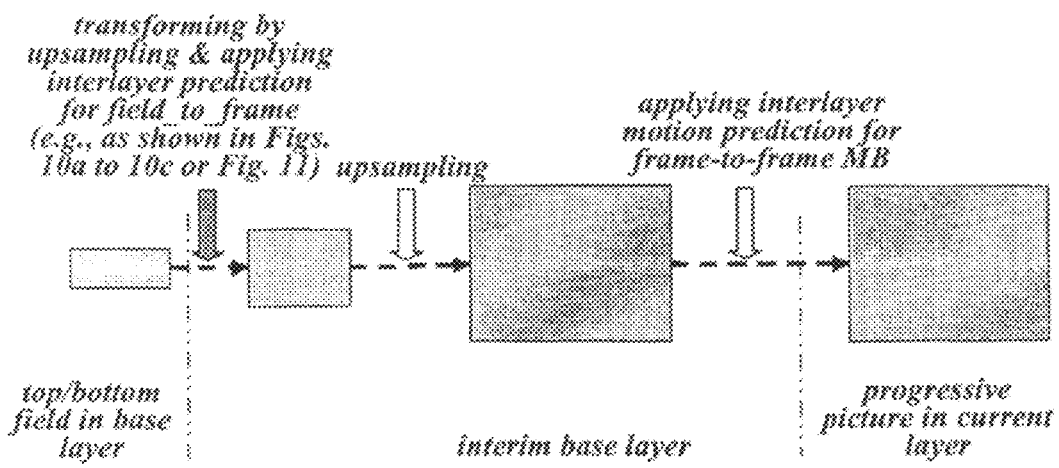

FIG. 14d illustrates one processing method for this case. In this case, the type of a picture is the same as the type of macroblocks of the picture. As shown, first, a corresponding field of the base layer is transformed into a progressive frame. The transformed frame has the same vertical/horizontal (aspect) ratio as that of the picture of the current layer. The upsampling process and the method of the case IV described above are applied for transformation of an interlaced field into a progressive frame. Of course, when the method of the case IV is applied in this case, texture data of a virtual frame and motion information of each macroblock of the frame are created using data obtained through interlayer prediction without performing the operation for coding the difference between predicted data and data of the layer to be actually coded.

Once the virtual frame is obtained, upsampling is performed on the virtual frame. In this upsampling, interpolation is performed to allow the resolution of the virtual frame to be equal to that of the current layer. In addition, motion information of each macroblock of the interpolated picture is constructed based on motion information of each macroblock of the virtual frame using one of a number of known methods. Here, the known frame macroblock-to-macroblock interlayer motion prediction method is performed since each macroblock of the picture of the interim base layer constructed in this manner is a frame macroblock and each macroblock of the current layer is a frame macroblock.

Figure 14E:
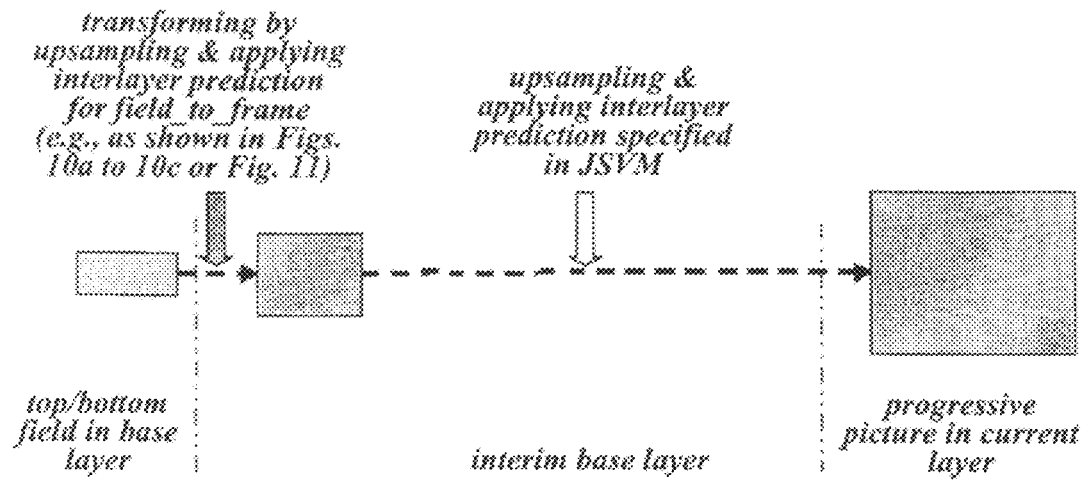

FIG. 14e illustrates a processing method for the above case M_D) according to another embodiment of the present invention. As shown, this embodiment transforms an odd or even corresponding field into a progressive frame. To transform an interlaced field into a progressive frame, upsampling and the method of the case IV described above are applied as shown in FIG. 14d. Once a virtual frame is obtained, a method for motion prediction between pictures having the same aspect ratio, which is one of a number of known methods, is applied to the virtual frame for motion prediction between the picture of the current layer and the virtual frame of the interim layer to perform predictive coding of motion information of each macroblock of the progressive picture of the current layer.

The method illustrated in FIG. 14e is different from that of FIG. 14d in that no temporary prediction signal is generated.

Figure 14F:
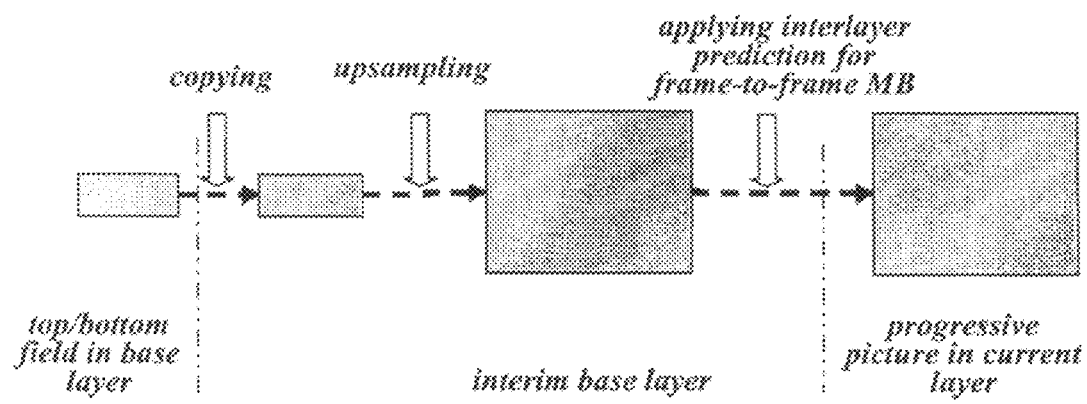

FIG. 14f illustrates a processing method for the above case M_D) according to another embodiment of the present invention. As shown, this embodiment copies motion information of all macroblocks of a corresponding field of the base layer to create a virtual picture. Upsampling is then performed. In this upsampling, texture information of a picture of the base layer is used and different interpolation rates are used for vertical and horizontal interpolation so that the enlarged picture has the same size (or resolution) as that of the picture of the current layer. In addition, one of a number of known prediction methods (for example, Extended Special Scalability (ESS)) is applied to the virtual picture to construct a variety of syntax information and motion information of the enlarged picture. Motion vectors constructed in this process are extended according to the enlargement ratio. Once the upsampled picture of the interim base layer is constructed, this picture is used to perform interlayer motion prediction of each macroblock in the picture of the current layer to code motion information each macroblock of the picture of the current layer. Here, the known frame macroblock-to-macroblock interlayer motion prediction method is applied.

Figure 14G:
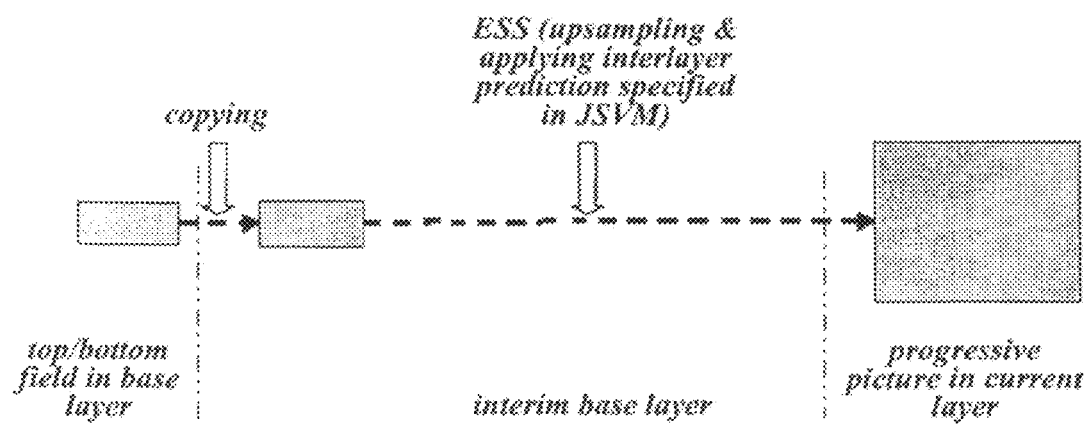

FIG. 14g illustrates a processing method for the above case M_D) according to another embodiment of the present invention. As shown, this embodiment first copies motion information of all macroblocks of a corresponding field of the base layer to create a virtual picture. Thereafter, texture information of the picture of the base layer is used to perform interpolation at different rates for vertical and horizontal interpolation. Texture information created through this operation is used for interlayer texture prediction. In addition, motion information in the virtual picture is used to perform interlayer motion prediction of each macroblock in the picture of the current layer. Here, one of a number of known methods (for example, Extended Special Scalability (ESS) defined in the Joint Scalable Video Model (JSVM)) is applied to perform motion predictive coding of the picture of the current layer.

The method illustrated in FIG. 14g is different from that of FIG. 14f in that no temporary prediction signal is generated.

M_E). Base Layer (MBAFF Frame)->Enhanced Layer (MBAFF Frame)

Figure 14H:
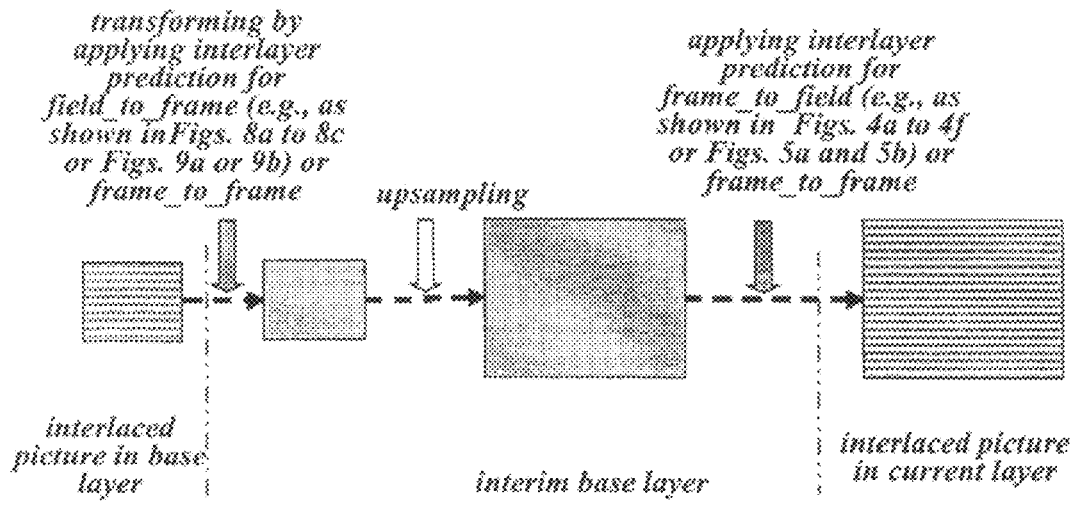

FIG. 14h illustrates a processing method for this case. As shown, first, a corresponding MBAFF frame of the base layer is transformed into a progressive frame. To transform the MBAFF frame into a progressive frame, the method of the case III described above is applied for transformation of pairs of field macroblocks of the MBAFF frame and the frame-to-frame prediction method is applied for transformation of pairs of frame macroblocks of the MBAFF frame. Of course, when the method of the case III is applied in this case, a virtual frame and motion information of each macroblock of the frame are created using data obtained through interlayer prediction without performing the operation for coding the difference between predicted data and data of the layer to be actually coded.

Once the virtual frame is obtained, upsampling is performed on the virtual frame. In this upsampling, interpolation is performed at an interpolation rate which allows the resolution of the base layer to be equal to that of the current layer. In addition, motion information of each macroblock of the enlarged picture is constructed based on motion information of each macroblock of the virtual frame using one of a number of known methods. The method of the case I described above is applied to perform interlayer motion prediction since each macroblock of the picture of the interim base layer constructed in this manner is a frame macroblock and each macroblock of the current layer is a field macroblock in an MBAFF frame. However, not only a pair of field macroblocks but also a pair of frame macroblocks may be included in the same MBAFF frame as described above. Accordingly, a known method for motion prediction between frame macroblocks (frame-to-frame prediction method), which includes copying of motion information, is applied when the pair of macroblocks of the current layer corresponding to the pair of macroblocks in the picture of the interim base layer are frame macroblocks rather than field macroblocks.

M_F). Base Layer (MBAFF Frame)->Enhanced Layer (Interlaced Field)

Figure 14I:
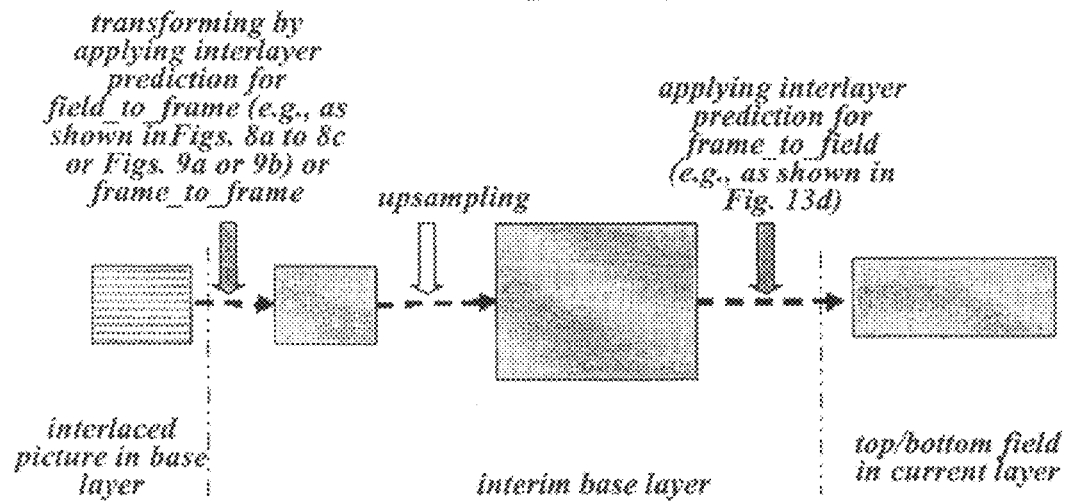

FIG. 14i illustrates a processing method for this case. As shown, first, a corresponding MBAFF frame of the base layer is transformed into a progressive frame. To transform the MBAFF frame into a progressive frame, the method of the case III described above is applied for transformation of pairs of field macroblocks of the MBAFF frame and the frame-to-frame prediction method is applied for transformation of pairs of frame macroblocks of the MBAFF frame. Of course, also when the method of the case III is applied in this case, a virtual frame and motion information of each macroblock of the frame are created using data obtained through interlayer prediction without performing the operation for coding the difference between predicted data and data of the layer to be actually coded.

Once the virtual frame is obtained, interpolation is performed on the virtual frame at an interpolation rate which allows the resolution to be equal to the resolution of the current layer. In addition, motion information of each macroblock of the enlarged picture is constructed based on motion information of each macroblock of the virtual frame using one of a number of known methods. The method of the case II described above is applied to perform interlayer motion prediction since each macroblock of the picture of the interim base layer constructed in this manner is a frame macroblock and each macroblock of the current layer is a field macroblock in an even or odd field.

M_G). Base Layer (Interlaced Field)->Enhanced Layer (MBAFF Frame)

Figure 14J:
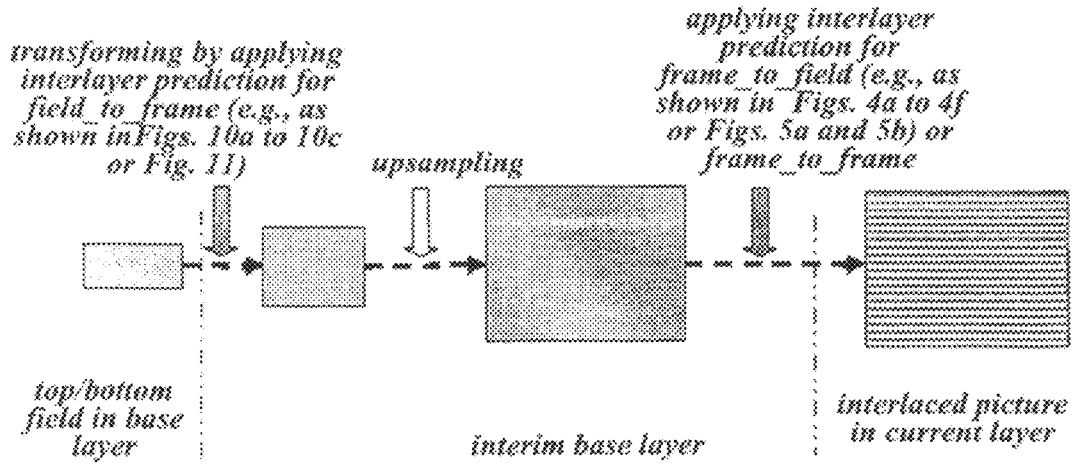

FIG. 14j illustrates a processing method for this case. As shown, first, an interlaced field of the base layer is transformed into a progressive frame. Upsampling and the method of the case IV described above are applied to transform the interlaced field into a progressive frame. Of course, also when the method of the case IV is applied in this case, a virtual frame and motion information of each macroblock of the frame are created using data obtained through interlayer prediction without performing the operation for coding the difference between predicted data and data of the layer to be actually coded.

Once the virtual frame is obtained, upsampling is performed on the virtual frame to allow the resolution to be equal to the resolution of the current layer. In addition, motion information of each macroblock of the enlarged picture is constructed using one of a number of known methods. The method of the case I described above is applied to perform interlayer motion prediction since each macroblock of the picture of the interim base layer constructed in this manner is a frame macroblock and each macroblock of the current layer is a field macroblock in an MBAFF frame. However, not only a pair of field macroblocks but also a pair of frame macroblocks may be included in the same MBAFF frame as described above. Accordingly, a known method for motion prediction between frame macroblocks (frame-to-frame prediction method) rather than the prediction method of the case I described above is applied when the pair of macroblocks of the current layer corresponding to the pair of macroblocks in the picture of the interim base layer includes frame macroblocks rather than field macroblocks.

M_H). Base Layer (Interlaced Field)->Enhanced Layer (Interlaced Field)

Figure 14K:
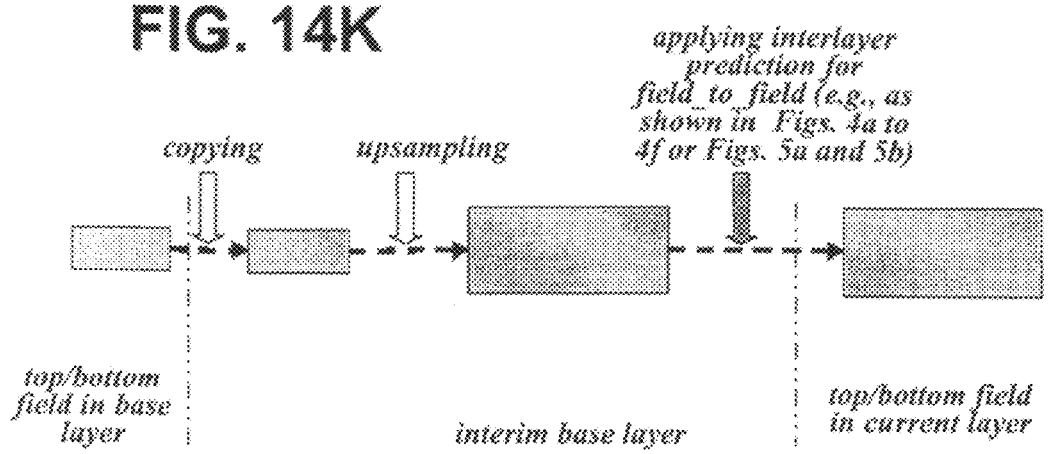

FIG. 14k illustrates a processing method for this case. As shown, first, motion information of all macroblocks of a corresponding field in the base layer is copied to create a virtual field and upsampling is then performed on the virtual field. This upsampling is performed at an upsampling rate which allows the resolution of the base layer to be equal to that of the current layer. In addition, motion information of each macroblock of the enlarged picture is constructed based on motion information of each macroblock of the created virtual field using one of a number of known methods. The method of the case iv) of the case V described above is applied to perform interlayer motion prediction since each macroblock of the picture of the interim base layer constructed in this manner is a field macroblock in a field picture and each macroblock of the current layer is also a field macroblock in a field picture.

Although texture information of the virtual field or frame of the interim layer rather than texture information of the picture of the base layer is used for upsampling in the description of the embodiments of FIGS. 14a to 14k, texture information of the base layer picture may also be used for upsampling. In addition, if not necessary, the interpolation process using texture information may be omitted in the upsampling process described above when deriving motion information of the picture of the interim layer to be used for interlayer motion prediction that is performed at a subsequent stage.

On the other hand, although the description of texture prediction has been given for the case where the base and enhanced layers have the same spatial resolution, both the layers may have different spatial resolutions as described above. In the case where the resolution of the enhanced layer is higher than that of the base layer, first, operations for making the resolution of the picture of the base layer equal to that of the picture of the enhanced layer are performed to create a picture of the base layer having the same resolution as that of the enhanced layer and a texture prediction method corresponding to each of the cases I-V described above is selected based on each macroblock in the picture to perform predictive coding. The procedure for making the resolution of the base layer picture equal to that of the enhanced layer picture will now be described in detail.

When two layers for interlayer prediction are considered, the number of combinations of picture formats (progressive and interlaced formats) for coding between the two layers is four since the there are two video signal scanning methods, one progressive scanning and the other interlaced scanning. Thus, a method for increasing the resolution of pictures of the base layer to perform interlayer texture prediction will be described separately for each of the four cases.

Figure 15A:
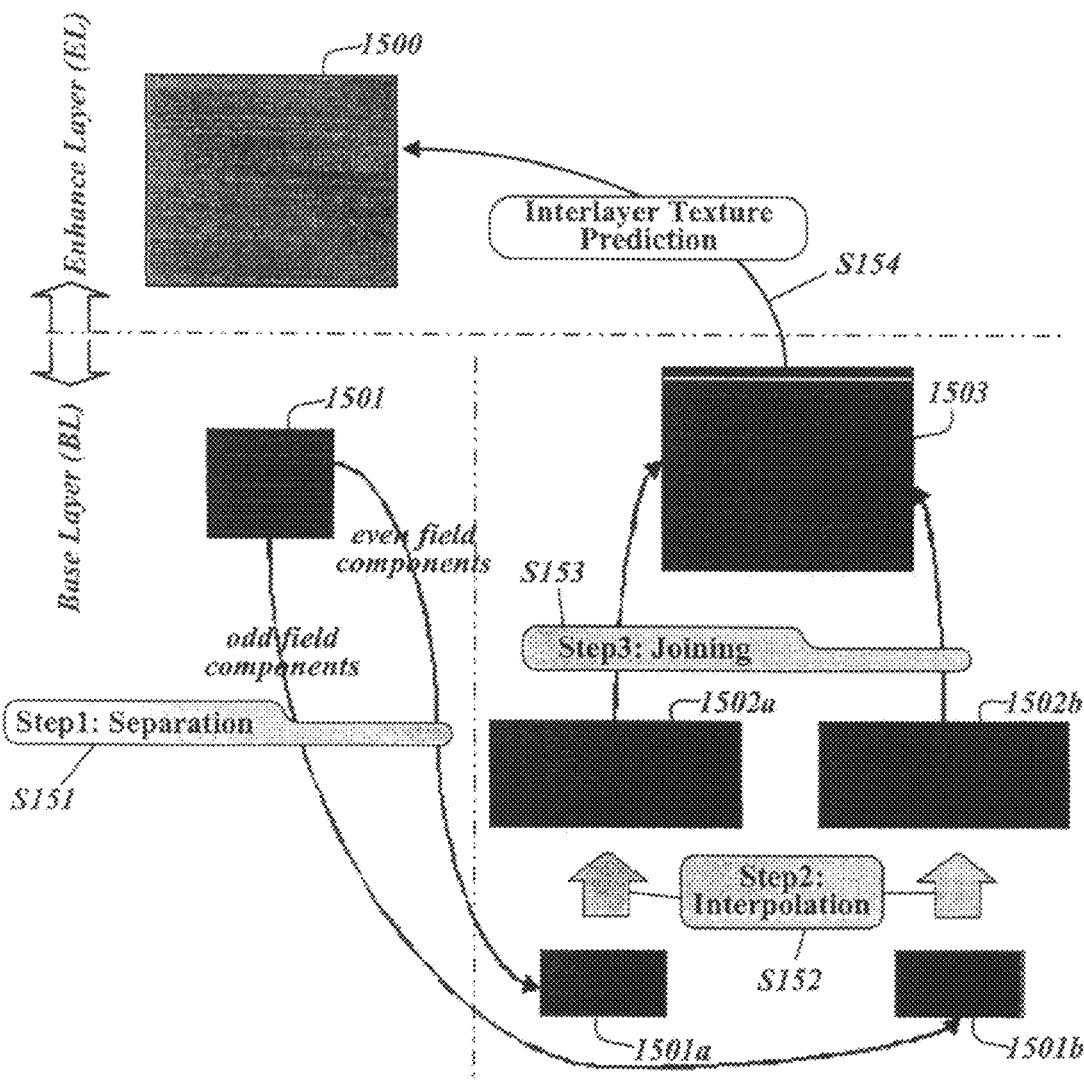
FIGS. 15*a* and 15*b* schematically show procedures in which a picture of the base layer with a different spatial resolution is used in interlayer texture prediction when the enhanced layer is progressive and the base layer is interlaced according to an embodiment of the present invention.

T_A). The Case Where the Enhanced Layer is Progressive and the Base Layer is Interlaced FIG. 15a illustrates an embodiment of a method of using a base layer picture for interlayer texture prediction for this case. As shown, a picture 1501 of the base layer temporally corresponding to a picture 1500 of the current (enhanced) layer includes even and odd fields which are output at different times. Therefore, first, the EL encoder 20 separates the picture of the base layer into even and odd fields (S151). Intra-mode macroblocks of the base layer picture 1501 have original image data that has not been encoded (or image data that has been decoded), which is used for intra base prediction, and inter-mode macroblocks thereof have encoded residual data (or decoded residual data), which is used for residual prediction. The same is true for base layer macroblocks or pictures when texture prediction is described below.

After separating the corresponding picture 1501 into field components, the EL encoder 20 performs interpolation of the separated fields 1501a and 1501b in a vertical and/or horizontal direction to create enlarged even and odd pictures 1502a and 1502b (S152). This interpolation uses one of a number of known methods such as 6-tap filtering and binary-linear filtering. Vertical and horizontal ratios for increasing the resolution (i.e., size) of the picture through interpolation are equal to vertical and horizontal ratios of the size of the enhanced layer picture 1500 to the size of the base layer picture 1501. The vertical and horizontal ratios may be equal to each other. For example, if the resolution ratio between the enhanced and base layers is 2, interpolation is performed on the separated even and odd fields 1501a and 1501b to create one more pixel between each pixel in each field in vertical and horizontal directions.

Once interpolation is completed, the enlarged even and odd fields 1502a and 1502b are combined to construct a picture 1503 (S153). In this combination, lines of the enlarged even and odd fields 1502a and 1502b are alternately selected (1502a->1502b->1502a->1502b-> . . . ) and are then arranged in the selected order to construct the combined picture 1503. Here, the block mode of each macroblock in the combined picture 1503 is determined. For example, the block mode of a macroblock of the combined picture 1503 is determined to be equal to that of a macroblock in the base layer picture 1501 which includes an area having the same image component. This determination method can be applied in any case of enlarging pictures described below. Since the combined picture 1503 constructed in this manner has the same spatial resolution as that of the current picture 1500 of the enhanced layer, texture prediction (for example, frame-to-frame inter-macroblock texture prediction) of macroblocks in the current progressive picture 1500 is performed based on corresponding macroblocks of the combined picture 1503 (S154).

Figure 15B:
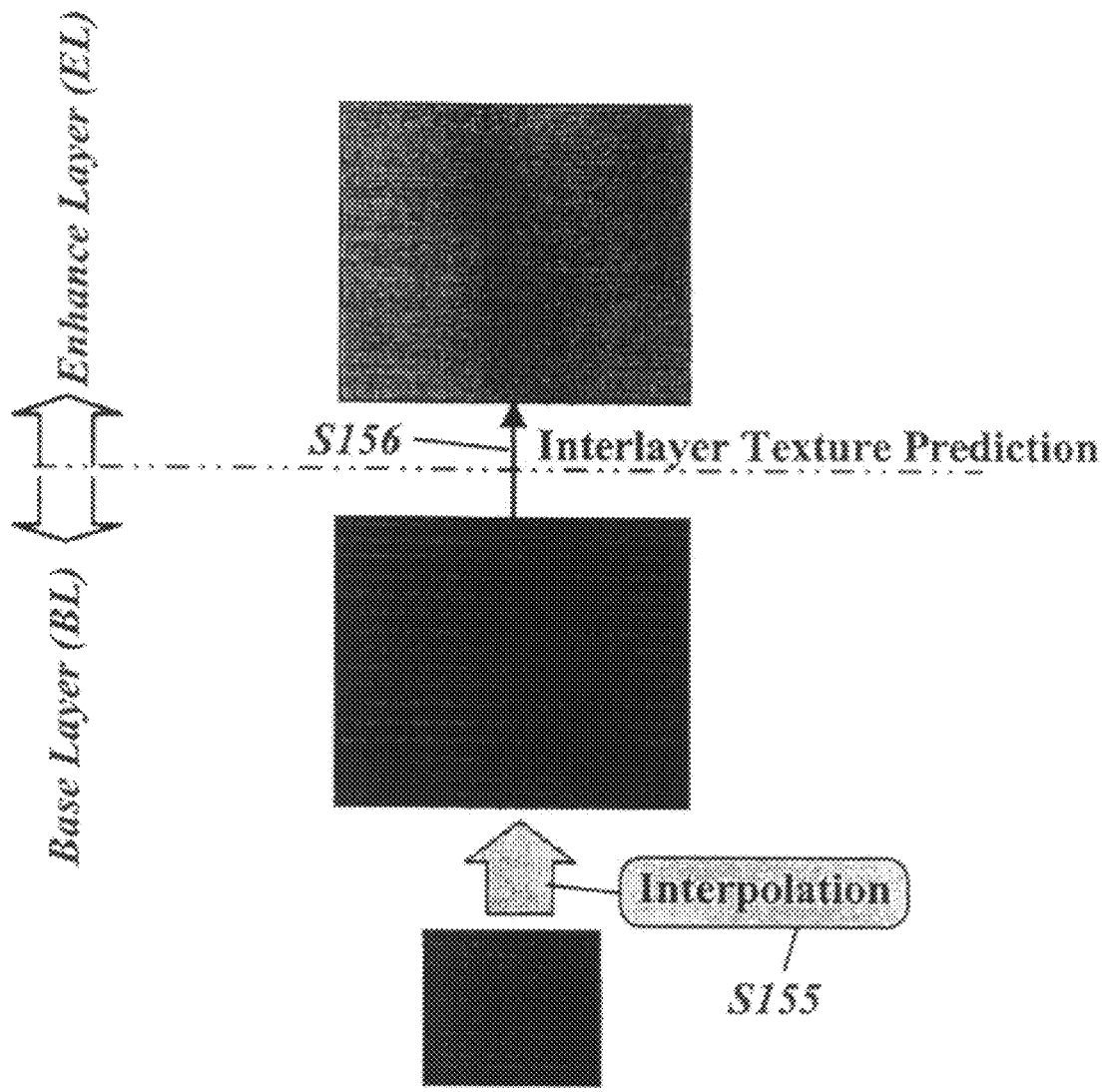

FIG. 15b illustrates a method of using a base layer picture in interlayer texture prediction according to another embodiment of the present invention. As shown, this embodiment performs interpolation of a base layer picture including even and odd fields that are output at different times in a vertical and/or horizontal direction directly, without separating the base layer picture on a field attribute (parity) basis (S155) to construct an enlarged picture of the same resolution (i.e., size) as that of the enhanced layer picture. The enlarged picture constructed in this manner is used to perform interlayer texture prediction of the current progressive picture of the enhanced layer (S156).

Figure 16A:
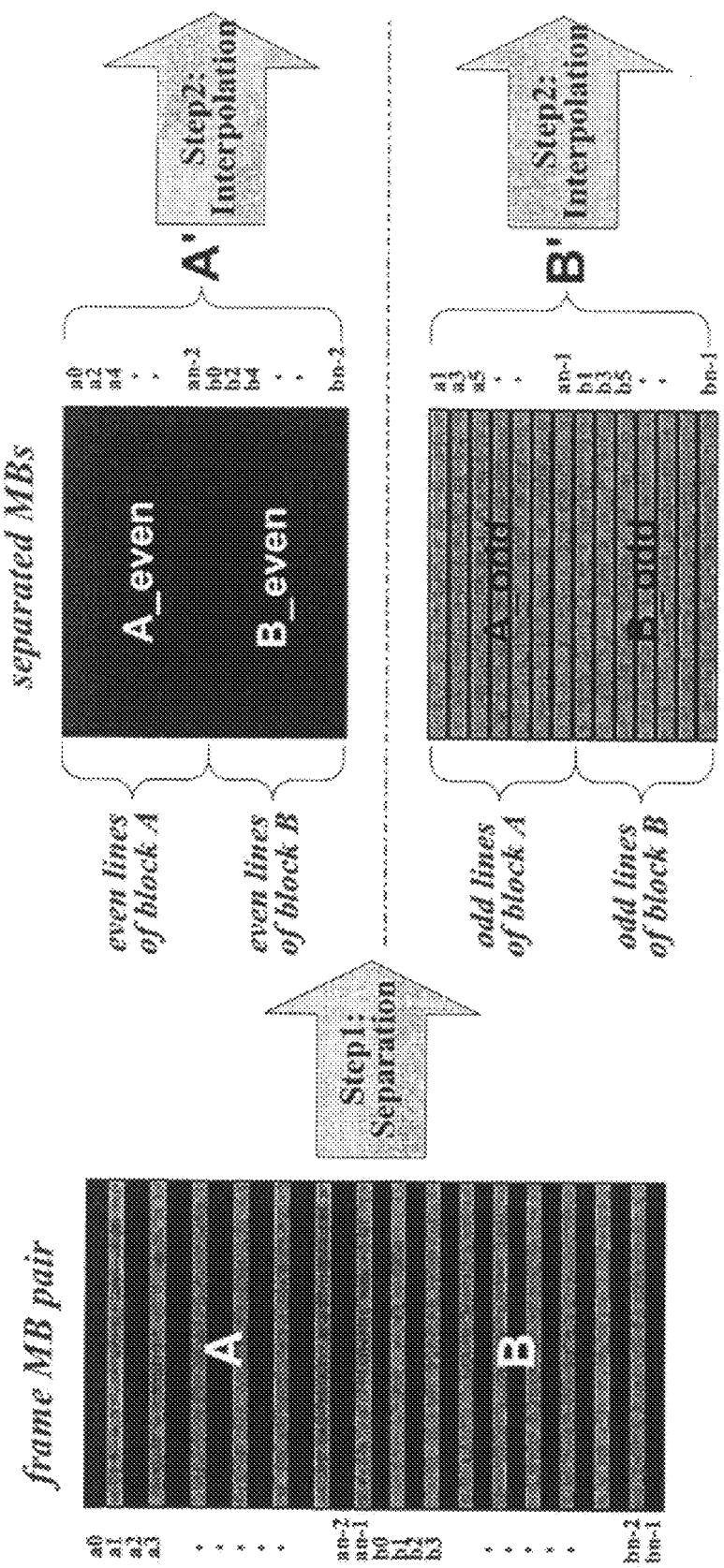
FIGS. 16*a* and 16*b* schematically show procedures in which, in order to use a picture of the base layer in interlayer texture prediction, a pair of macroblocks in the picture is separated into macroblocks and the separated macroblocks are enlarged according to an embodiment of the present invention.

FIG. 15a shows, at a picture level, the procedure for interpolating a picture having even and odd fields by separating it on a field attribute basis. However, the EL encoder 20 can achieve the same results as illustrated in FIG. 15a by performing the procedure illustrated in FIG. 15a at a macroblock level. More specifically, when the base layer having even and odd fields has been MBAFF-coded, a pair of vertically adjacent macroblocks in the picture 1501, which are co-located with a pair of macroblocks in the enhanced layer picture to be currently subjected to texture predictive coding, may include video signals of even and odd field components as in FIG. 16a or 16b. FIG. 16a illustrates a frame MB pair mode in which even and odd field components are interleaved in each of a pair of macroblocks A and B and FIG. 16b illustrates a field MB pair mode in which each of a pair of macroblocks A and B includes video lines of the same field attribute.

In the case of FIG. 16a, to apply the method illustrated in FIG. 15a, even lines of each of the pair of macroblocks A and B are selected to construct an even field block A' and odd lines thereof are selected to construct an odd field block B', thereby separating the pair of macroblocks having even and odd field components interleaved in each macroblock into the two blocks A' and B' respectively having even and odd field components. Interpolation is performed on each of the two macroblocks A' and B' separated in this manner to construct an enlarged block. Texture prediction is performed using data in an area in the enlarged block which corresponds to a macroblock of intra_BL or residual_prediction mode in the enhanced layer picture to be currently subjected to texture predictive coding. Although not illustrated in FIG. 16a, combining the individually enlarged blocks on a field attribute basis partially constructs the enlarged even and odd pictures 1502a and 1502b in FIG. 15a and therefore the enlarged even and odd pictures 1502a and 1502b in FIG. 15a can be constructed by repeating the above operations for each pair of macroblocks.

Figure 16B:
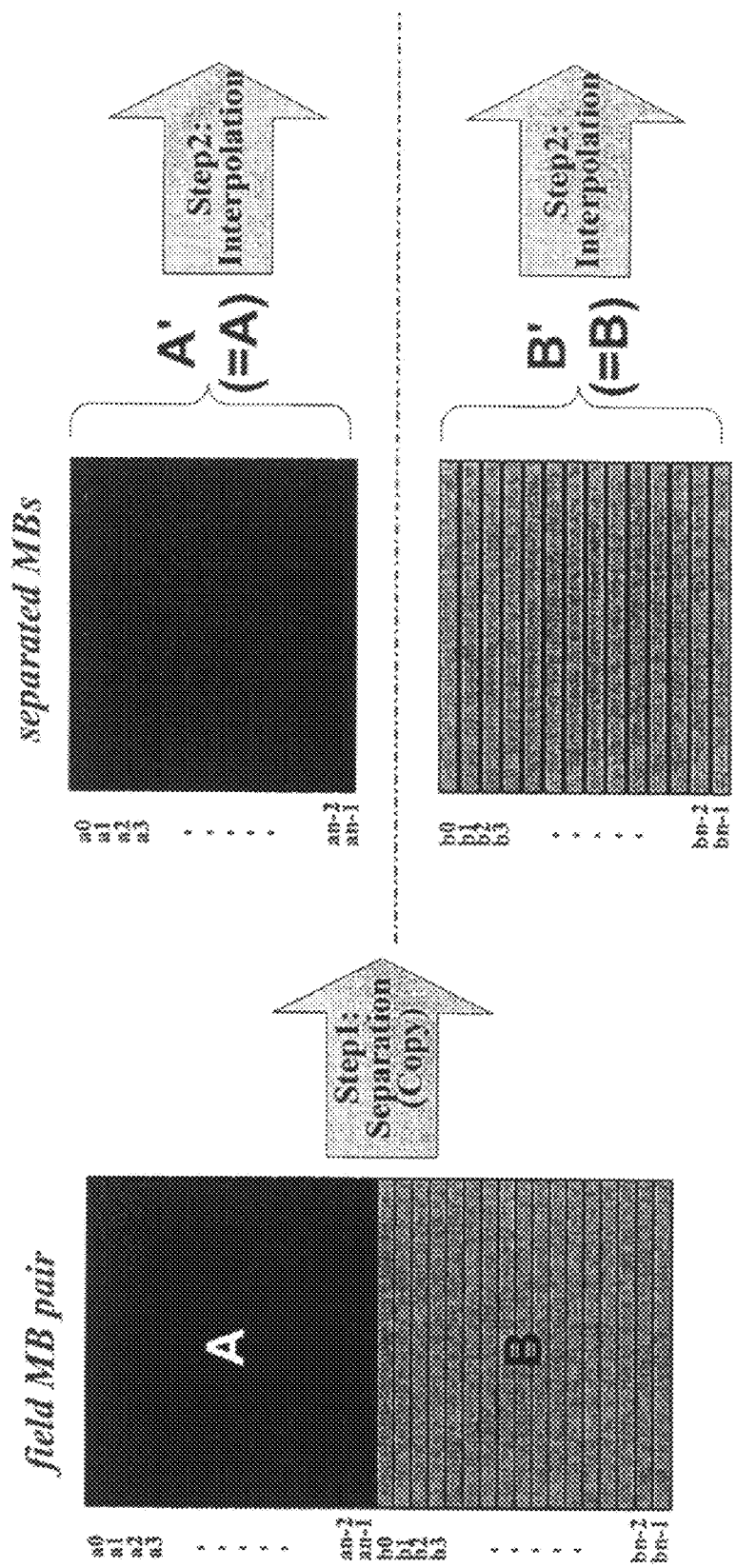

In the case where a pair of macroblocks is divided on a field attribute basis to construct each macroblock as in FIG. 16b, the separation procedure described above is a process of simply copying each macroblock from the pair of macroblocks to construct two separated macroblocks. The subsequent procedure is similar to that described with reference to FIG. 16a.

Figure 17A:
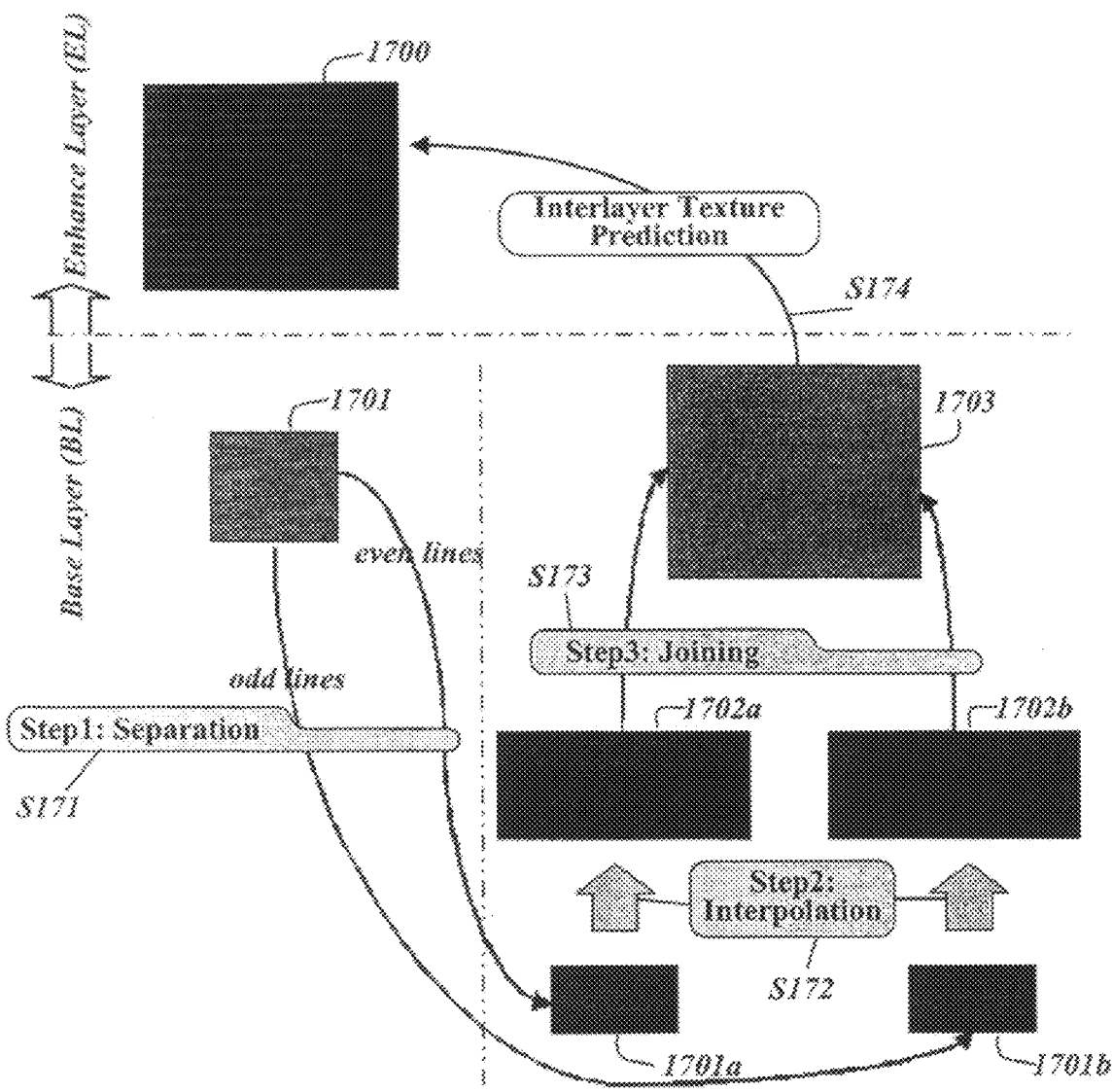
FIGS. 17*a* and 17*b* schematically show procedures in which a picture of the base layer with a different spatial resolution is used in interlayer texture prediction when the enhanced layer is interlaced and the base layer is progressive according to an embodiment of the present invention.

T_B). The Case Where the Enhanced Layer is Interlaced and the Base Layer is Progressive FIG. 17a illustrates an embodiment of a method of using a base layer picture for interlayer texture prediction for this case. As shown, first, the EL encoder 20 constructs two pictures for a current layer picture 1700 (S171). In an example method for constructing two pictures, even lines of a corresponding picture 1701 are selected to construct one picture 1701a and odd lines thereof are selected to construct another picture 1701b. The EL encoder 20 then performs interpolation of such constructed two pictures 1701a and 1701b in a vertical and/or horizontal direction to create two enlarged pictures 1702a and 1702b (S172). This interpolation uses one of a number of known methods such as 6-tap filtering and binary-linear filtering as in the case T_A). The ratios for increasing the resolution are also the same as those described in the case T_A).

Once interpolation is completed, the two enlarged fields 1702a and 1702b are combined to construct a picture 1703 (S173). In this combination, lines of the two enlarged fields 1702*a* and 1702*b* are alternately selected (1702*a*->1702*b*->1702*a*->1702*b*-> . . . ) and are then arranged in the selected order to construct the combined picture 1703. Since the combined picture 1703 constructed in this manner has the same spatial resolution as that of the current picture 1700 of the enhanced layer, texture prediction (for example, frame-to-frame inter-macroblock texture prediction or texture prediction described with reference to FIG. 4*g*) of macroblocks in the current interlaced picture 1700 is performed based on corresponding macroblocks of the combined picture 1703 (S174).

Figure 17B:
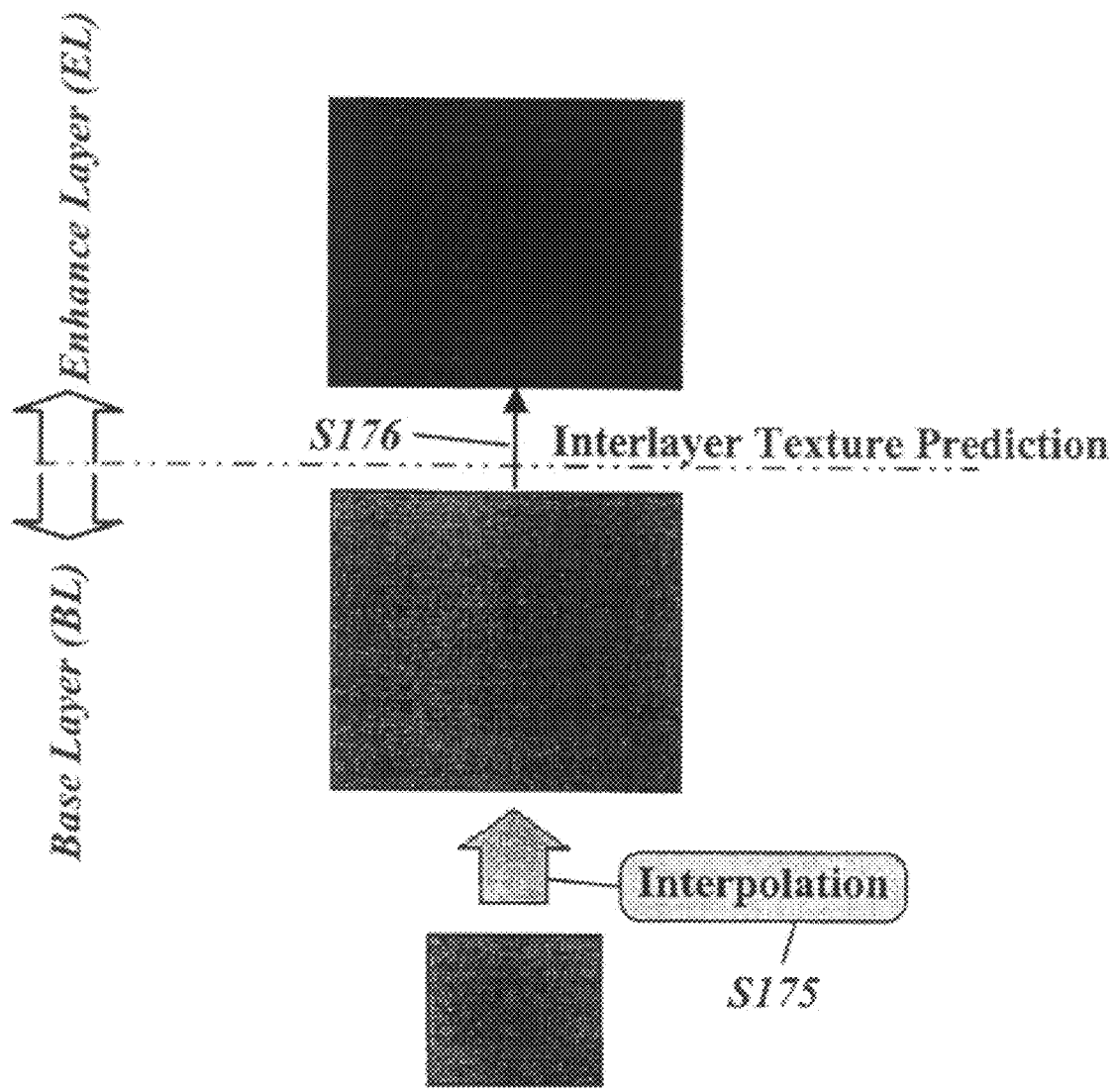

FIG. 17*b* illustrates a method of using a base layer picture in interlayer texture prediction according to another embodiment of the present invention. As shown, this embodiment performs interpolation of a base layer picture in a vertical and/or horizontal direction directly, without separating the base layer picture into two pictures (S175) to construct an enlarged picture of the same resolution (i.e., size) as that of the enhanced layer picture. The enlarged picture constructed in this manner is used to perform interlayer texture prediction of the current interlaced picture of the enhanced layer (S176).

Although the description of FIG. 17*a* has also been given at a picture level, the EL encoder 20 may perform the picture separation process at a macroblock level as described above in the case T_A). The method of FIG. 17*b* is similar to the separation and interpolation procedure illustrated in FIG. 17*a* when the single picture 1701 is regarded as a pair of vertically adjacent macroblocks. A detailed description of this procedure is omitted here since it can be understood intuitively from FIG. 17*a*.

T_C). The Case Where Both the Enhanced and Base Layers are Interlaced

Figure 18:
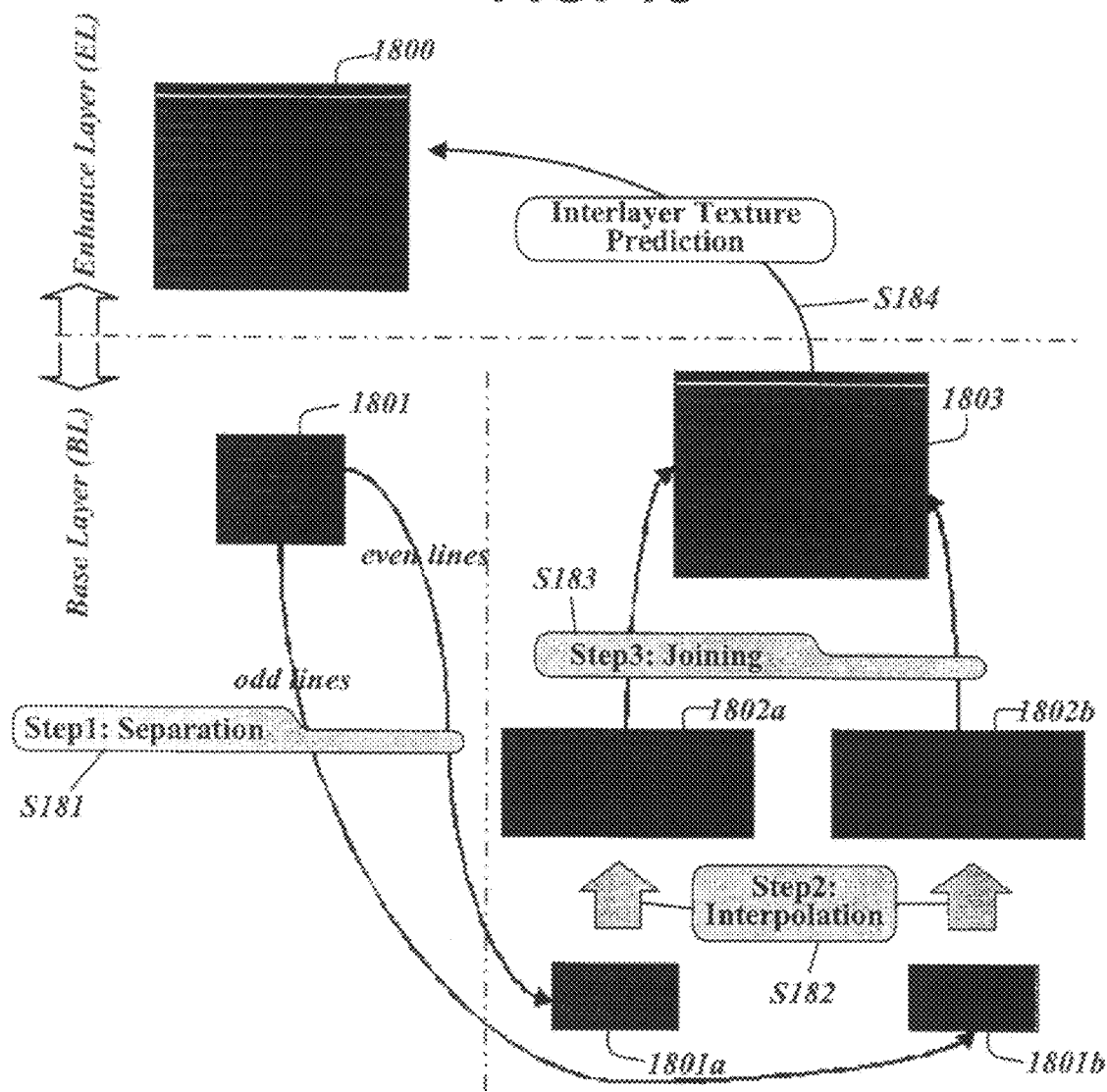
FIG. 18 schematically shows procedures in which a picture of the base layer with a different spatial resolution is used in interlayer prediction when both the enhanced and base layers are interlaced according to an embodiment of the present invention.

FIG. 18 illustrates an embodiment of a method of using a base layer picture for interlayer texture prediction for this case. In this case, as shown, the EL encoder 20 separates a base layer picture 1801 temporally corresponding to a current layer picture 1800 into even and odd fields (S181) in the same manner as in the case T_A). The EL encoder 20 then performs interpolation of the separated fields 1801*a* and 1801*b* in a vertical and/or horizontal direction to create enlarged even and odd pictures 1802*a* and 1802*b* (S182). The EL encoder 20 then combines the enlarged even and odd fields 1802*a* and 1802*b* to construct a picture 1803 (S182). The EL encoder 20 then performs interlayer texture prediction (for example, frame-to-frame inter-macroblock texture prediction or texture prediction described with reference to FIG. 4*g*) of macroblocks (pairs of MBAFF-coded frame macroblocks) in the current interlaced picture 1800 based on corresponding macroblocks of the combined picture 1803 (S184).

Although both the layers have the same picture format, the EL encoder 20 separates the base layer picture 1801 on a field attribute basis (S181) and individually enlarges the separated fields (S182) and then combines the enlarged pictures (S183) since, if the picture 1801 combining the even and odd fields is interpolated directly when it has a characteristic that video signals of the even and odd fields greatly vary, the enlarged picture may have a distorted image (for example, an image having spread boundaries) compared to the interlaced picture 1800 having interleaved even and odd fields of the enhanced layer. Accordingly, even when both the layers are interlaced, the EL encoder 20 uses the base layer picture after separating it on a field attribute basis to obtain two fields and individually enlarging the two fields and then combining the enlarged fields according to the present invention.

Of course, instead of using the method illustrated in FIG. 18 always when pictures of both the layers are interlaced, the method may be selectively used depending on video characteristics of the pictures.

FIG. 18 shows, at a picture level, the procedure for separating and enlarging a picture having even and odd fields on a field attribute basis according to the present invention. However, as described above in T_A), the EL encoder 20 can achieve the same results as illustrated in FIG. 18 by performing, at a macroblock level, the procedure illustrated in FIG. 18 which includes the macroblock-based separation and interpolation processes described with reference to FIGS. 16*a* and 16*b* (specifically, separating a pair of frame macroblocks into blocks of even and odd lines and individually enlarging the separated blocks) and the combination and interlayer texture prediction processes (specifically, alternately selecting lines of the enlarged blocks to construct a pair of enlarged blocks and performing texture prediction of a pair of frame macroblocks of the current layer using the constructed pair of enlarged blocks).

T_D). The Case Where Both the Enhanced and Base Layers are Progressive

In this case, a base layer picture is enlarged to the same size as that of an enhanced layer picture and the enlarged picture is used for interlayer texture prediction of the current enhanced layer picture having the same picture format.

Although the above embodiments of texture prediction have been described when the base and enhanced layers have the same temporal resolution, both the layers may have different temporal resolutions, i.e., different picture rates. If pictures of the layers are of different picture scanning types even when the layers have the same temporal resolution, the pictures may contain video signals with different output times even if they are pictures of the same POC (i.e., pictures temporally corresponding to each other). A method for interlayer texture prediction in this case will now be described. In the following description, it is assumed that both the layers initially have the same spatial resolution. If both the layers have different spatial resolutions, methods described below are applied after upsampling each picture of the base layer to make the spatial resolution equal to that of the enhanced layer as described above.

a) The Case Where the Enhanced Layer Includes Progressive Frames, the Base Layer Includes MBAFF Frames, and Temporal Resolution of the Enhanced Layer is Twice as High FIG. 19*a* illustrates an interlayer texture prediction method for this case. As shown, each MBAFF frame of the base layer includes even and odd fields with different output times and thus the EL encoder 20 separates each MBAFF frame into even and odd fields (S191). The EL encoder 20 separates even field components (for example, even lines) and odd field components (for example, odd lines) of each MBAFF frame into an even field and an odd field, respectively. After separating an MBAFF frame into two fields in this manner, the EL encoder 20 interpolates each field in a vertical direction so that it has a resolution twice as high (S192). This interpolation uses one of a number of known methods such as 6-tap filtering, binary-linear filtering, and simple line padding. Once the interpolation is completed, each frame of the enhance layer has a temporally coincident picture in the base layer and thus the EL encoder 20 performs known interlayer texture prediction (for example, frame-to-frame inter-macroblock prediction) on macroblocks of each frame of the enhanced layer (S193).

The above procedure may also be applied to interlayer motion prediction. Here, when separating an MBAFF frame into two fields, the EL encoder 20 copies motion information of each of a pair of field macroblocks in the MBAFF frame as motion information of a macroblock of the same field attribute (parity) to use it for interlayer motion prediction. Using this method can create a temporally coincident picture according to the method described above to perform interlayer motion prediction even when there is no temporally coincident picture in the base layer (in the case of t1, t3, . . . ).

The method described above can be directly applied when the resolution of one of the two layers is twice as high as that of the other as in the example of FIG. 19a and even when it is N (three or more) times as high. For example, when the resolution is three times as high, one of the two separated fields may be additionally copied to construct and use three fields and, when the resolution is four times as high, each of the two separated fields may be copied once more to construct and use four fields. It is apparent that, with any temporal resolution difference, those skilled in the art can perform interlayer prediction simply by applying principles of the present invention without any creative thought. Thus, it is natural that any method for prediction between layers of different temporal resolutions not described in this specification is within the scope of the present invention. The same is true for other cases described below.

Figure 19B:
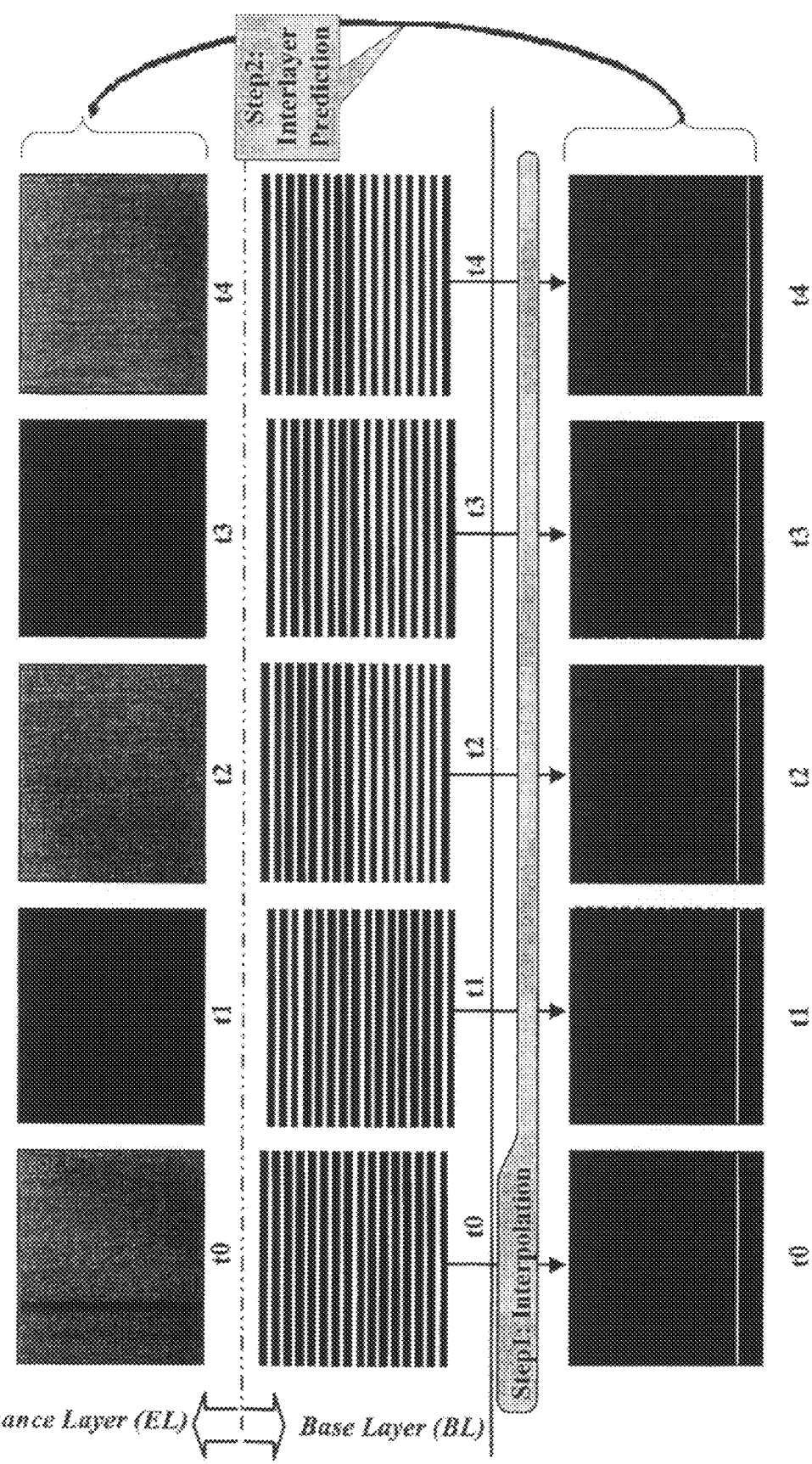
FIG. 19*b* illustrates a procedure in which interlayer prediction is applied when the enhanced layer is a progressive frame sequence and the two layers have different picture types and the same resolution according to an embodiment of the present invention.

If the base layer has been coded into Picture Adaptive Field & Frame (PAFF) rather than MBAFF frames, both the layers may have the same temporal resolution as in FIG. 19b. Thus, in this case, interlayer texture prediction is performed after constructing a picture having the same temporal resolution as that of the current layer by interpolating a frame directly without the process of separating the frame into two fields.

b) The Case Where the Enhanced Layer Includes MBAFF Frames, the Base Layer Includes Progressive Frames, and Temporal Resolution of the Enhanced Layer is Half That of the Base Layer FIG. 20 illustrates an interlayer texture prediction method for this case. As shown, each MBAFF frame of the enhanced layer includes even and odd fields with different output times and thus the EL encoder 20 separates each MBAFF frame into even and odd fields (S201). The EL encoder 20 separates even field components (for example, even lines) and odd field components (for example, odd lines) of each MBAFF frame into an even field and an odd field, respectively. The EL encoder 20 performs sub-sampling of each frame of the base layer in a vertical direction to construct a picture with a resolution reduced by half (S202). This sub-sampling may use line sub-sampling or one of various other known down-sampling methods. In the example of FIG. 20, the EL encoder 20 selects even lines of pictures with even picture indices (pictures of t0, t2, t4, . . . ) to obtain pictures reduced in size by half and selects odd lines of pictures with odd picture indices (pictures of t1, t3, . . . ) to obtain pictures reduced in size by half. The frame separation (S201) and the sub-sampling (S202) may also be performed in reversed order.

Once the two processes S201 and S202 are completed, fields 2001 separated from the frames of the enhanced layer have pictures, which are temporally coincident with the fields 2001 and have the same spatial resolution as that of the fields 2001, in the base layer and thus the EL encoder 20 performs known interlayer texture prediction (for example, frame-to-frame inter-macroblock prediction) on macroblocks in each field (S203).

The above procedure may also be applied to interlayer motion prediction. Here, when obtaining a picture reduced in size from each frame of the base layer through sub-sampling (S202), the EL encoder 20 may obtain motion information of a corresponding macroblock from motion information of each of a pair of vertically adjacent macroblocks according to a suitable method (for example, a method of adopting motion information of a block that has not been completely partitioned) and then may use the obtained motion information for interlayer motion prediction.

Figure 21:
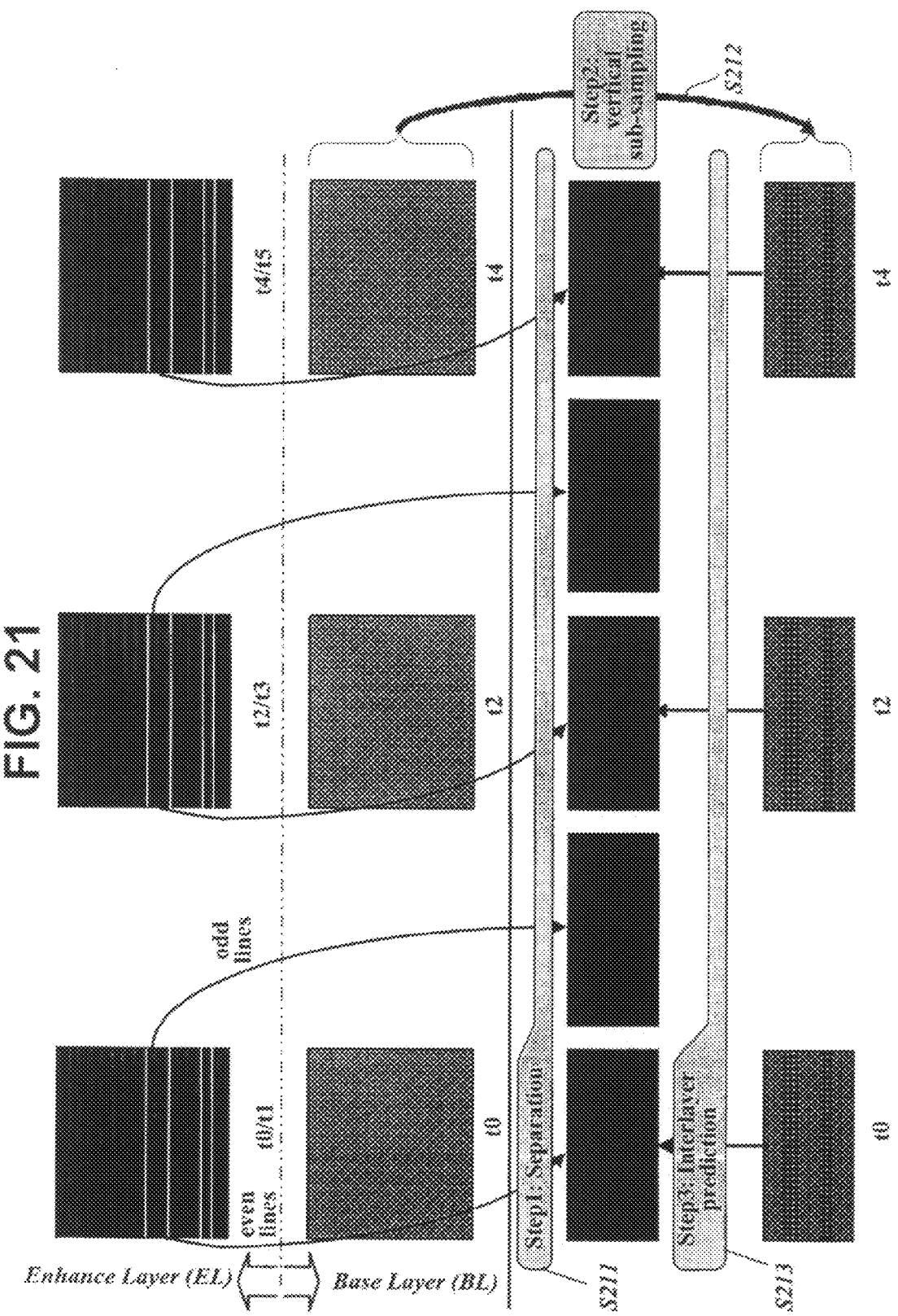
FIG. 21 illustrates a procedure in which interlayer prediction is applied when the base layer is a progressive frame sequence and the two layers have different picture types and the same resolution according to an embodiment of the present invention.

In this case, pictures of the enhanced layer are PAFF-coded to be transmitted since interlayer prediction is performed on each field picture 2001 separated from MBAFF frames.

c) The Case Where the Enhanced Layer Includes MBAFF Frames, the Base Layer Includes Progressive Frames, and Both the Layers Have the Same Temporal Resolution FIG. 21 illustrates an interlayer texture prediction method for this case. As shown, each MBAFF frame of the enhanced layer includes even and odd fields with different output times and thus the EL encoder 20 separates each MBAFF frame into even and odd fields (S211). The EL encoder 20 separates even field components (for example, even lines) and odd field components (for example, odd lines) of each MBAFF frame into an even field and an odd field, respectively. The EL encoder 20 performs sub-sampling of each frame of the base layer in a vertical direction to construct a picture with a resolution reduced by half (S212). This sub-sampling may use line sub-sampling or one of various other known down-sampling methods. The frame separation (S211) and the sub-sampling (S212) may also be performed in reversed order.

The EL encoder 20 may also construct a field (for example, an even field picture) from an MBAFF frame, instead of separating an MBAFF frame into two fields. This is because both the layers have the same temporal resolution and thus only one of the two field pictures separated from one frame (rather than all of the two) has a corresponding frame in the base layer that can be used for interlayer prediction.

Once the two processes S211 and S212 are completed, the EL encoder 20 performs known interlayer texture prediction (for example, frame-to-frame inter-macroblock prediction) only on even (odd) fields, among fields separated from the frames of the enhanced layer, based on corresponding sub-sampled pictures in the base layer (S213).

Also in this case, interlayer motion prediction may be performed on the separated fields of the enhanced layer, for which interlayer texture prediction is performed, in the same manner as described in the case b).

Although the above descriptions have been given of interlayer prediction operations performed by the EL encoder 20 of FIG. 2a or 2b, all the descriptions of interlayer prediction operations may be commonly applied to an EL decoder which receives decoded information from the base layer and decodes enhanced layer streams. In encoding and decoding procedures, the interlayer prediction operations described above (including operations for separating, enlarging, and combining video signals in pictures or macroblocks) are performed in the same manner while operations subsequent to interlayer prediction are performed in different manners. An example of the difference is that, after performing motion and texture prediction, the encoder codes the predicted information or difference information between the predicted information and actual information in order to transmit it to the decoder, while the decoder obtains actual motion information and texture information by directly applying information, obtained by performing the same interlayer motion and texture prediction as that performed at the encoder, to the current macroblock or by additionally using actually received macroblock coding information. The details and principles of the present invention described above from the encoding viewpoint are directly applied to the decoder that decodes received data streams of the two layers.

However, when the EL encoder transmits the enhanced layer of MBAFF frames in a PAFF fashion after separating the enhanced layer into field sequences and performing interlayer prediction as described with reference to FIGS. 20 and 21, the decoder does not perform the above-described procedure for separating MBAFF frames into field pictures on the currently received layer.

In addition, the decoder then decodes, from a received signal, the flag 'field-base-flag' which identifies whether the EL encoder 20 has performed interlayer texture prediction between macroblocks as shown in FIG. 8d or as shown in FIG. 8h. Based on the decoded flag value, the decoder determines whether the prediction between macroblocks has been performed as shown in FIG. 8d or as shown in FIG. 8h and obtains texture prediction information according to the determination. If the flag 'field_base_flag' is not received, the EL decoder assumes that the flag having a value of "0" has been received. That is, the EL decoder assumes that texture prediction between macroblocks has been performed according to the method as shown in FIG. 8d and obtains prediction information of the current pair of macroblocks to reconstruct the current macroblock or pair of macroblocks.

At least one of the limited embodiments of the present invention described above can perform interlayer prediction even when using video signal sources of different formats (or modes). Thus, when coding a plurality of layers, it is possible to increase the data coding rate regardless of the picture types of video signals such as interlaced signals, progressive signals, MBAFF-frame pictures, and field pictures. In addition, when one of the two layers is an interlaced video signal source, an image of the picture for use in prediction can be constructed to be more similar to that of the original image for predictive coding, thereby increasing the data coding rate.

Although this invention has been described with reference to the preferred embodiments, it will be apparent to those skilled in the art that various improvements, modifications, replacements, and additions can be made in the invention without departing from the scope and spirit of the invention. Thus, it is intended that the invention cover the improvements, modifications, replacements, and additions of the invention, provided they come within the scope of the appended claims and their equivalents.

The invention claimed is:

1. A method for decoding a video signal, the method comprising:
    decoding, by a decoder, a field macroblock pair in a base layer, the field macroblock pair being two vertically adjacent field macroblocks in a MacroBlock Adaptive Frame Field frame (MBAFF frame), the MBAFF frame being a frame including macroblocks adaptively decoded as frame macroblock or field macroblock;
    constructing, by the decoder, a frame macroblock pair from the field macroblock pair;
    separating, by the decoder, the frame macroblock pair into even field components and odd field components;
    interpolating, by the decoder, the even field components and odd field components in a vertical and/or horizontal direction;
    interleaving, by the decoder, the interpolated even field components and odd field components;
    obtaining, by the decoder, a reference image by using the interleaved even field components and odd field components; and
    obtaining, by the decoder, texture prediction information of a current block in an enhanced layer by using the reference image.

2. The method according to claim 1, wherein the frame macroblock pair is constructed by alternately selecting lines of top and bottom macroblocks of the field macroblock pair sequentially line by line and arranging the selected lines in the selected order.

3. The method according to claim 1, further comprising:
    decoding the current block in the enhanced layer by using the texture prediction information.

4. The method according to claim 1, wherein the method includes selecting one field macroblock of the field macroblock pair and interpolating the selected field macroblock in a vertical direction to construct the frame macroblock pair if the field macroblock pair are composed of an intra-mode field macroblock and an inter-mode field macroblock.

5. The method according to claim 1, wherein the field macroblock pair are coded in an intra mode.

6. The method according to claim 3, wherein the current block in the enhanced layer is included in a MacroBlock Adaptive Frame Field frame (MBAFF frame) of the enhanced layer.

* * * * *